United States Patent
Hamasaki et al.

(10) Patent No.: US 6,856,623 B2
(45) Date of Patent: Feb. 15, 2005

(54) COMMUNICATION SYSTEM, METHOD OF PROCESSING MESSAGE IN COMMUNICATION SYSTEM, AND STATION-SIDE UNIT AND SUBSCRIBER-SIDE UNIT

(75) Inventors: Motoshi Hamasaki, Kawasaki (JP); Hiroshi Murakawa, Yokohama (JP); Masanobu Edasawa, Yokohama (JP); Hisayoshi Kuraya, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/034,928

(22) Filed: Dec. 28, 2001

(65) Prior Publication Data

US 2002/0057688 A1 May 16, 2002

Related U.S. Application Data

(63) Continuation of application No. PCT/JP99/03751, filed on Jul. 12, 1999.

(51) Int. Cl.$^7$ .............................................. H04L 12/28
(52) U.S. Cl. ...................................................... 370/390
(58) Field of Search .................................. 370/390, 389; 345/418, 419, 619

(56) References Cited

U.S. PATENT DOCUMENTS

| | | | | |
|---|---|---|---|---|
| 5,659,793 A | * | 8/1997 | Escobar et al. | 345/629 |
| 5,926,647 A | * | 7/1999 | Adams et al. | 345/600 |
| 6,227,974 B1 | * | 5/2001 | Eilat et al. | 345/419 |
| 6,418,558 B1 | * | 7/2002 | Roberts et al. | 725/129 |
| 6,473,438 B1 | * | 10/2002 | Cioffi et al. | 370/468 |
| 6,510,515 B1 | * | 1/2003 | Raith | 713/163 |
| 6,579,184 B1 | * | 6/2003 | Tanskanen | 463/41 |

FOREIGN PATENT DOCUMENTS

| | | |
|---|---|---|
| EP | 0 921 655 | 6/1999 |
| JP | 62-171347 | 7/1987 |
| JP | 09-284421 | 10/1997 |
| JP | 10-336176 | 12/1998 |

* cited by examiner

Primary Examiner—Phu K. Nguyen
(74) Attorney, Agent, or Firm—Katten Muchin Zavis Rosenman

(57) ABSTRACT

There is provided a communication system (1) such as an ATM-PON including a station-side unit (2) having a point-to-multipoint message generating unit (2A) and a group designation message generating unit (2B) and subscriber-side units (4-1 to 4-N: N is a natural number) each having a point-to-multipoint message processing unit (4A) and a state control unit (4B). The station-side unit (2) sends a group designating message to some of the subscriber-side units (4-i:i=1 to N), thereby to designate some of the plurality of the subscriber-side units as a component constituting a group of units which are to receive a point-to-multipoint message, and only the subscriber-side units (4-i) controls to bring the reception and the processing on the point-to-multipoint message to a valid status. With this arrangement, only specified components constituting a group of units can be made to receive the point-to-multipoint message. Thus, it becomes possible to avoid unexpected erroneous operation which can be caused if information specific to a vendor of some of the subscriber-side units (4-i) is sent to all of the subscriber-side units. Moreover, it becomes possible to provide information to the specified components constituting a group of units within a very short period of time.

26 Claims, 60 Drawing Sheets

FIG. 4

PLOAM CELL HEADER

| Octet1 | Octet2 | Octet3 | Octet4 | Octet5 |
|---|---|---|---|---|
| 00000000 | 00000000 | 00000000 | 00011101 | 01110110 |
| (PHYSICAL LAYER) OAM CELL FOR USE IN ATM-PON | | | | HEC=VARID CODE 01110110 |

FIG.5A

| BYTE | CONTENTS | |
|------|----------|---|
| 40 | xxxxxxxx | INDIVIDUAL PON ID OR BROADCAST TYPE PON ID = 0x40 |
| 41 | 01111zzz | COMMON MESSAGE ID, E.G., 0x78 |
| 42 | 0000000g | LSB IS UTILIZED AS A GROUPING FLAG |
| 43 | Vendor ID1 | VENDOR ID OF ONU |
| 44 | Vendor ID2 | VENDOR ID OF ONU |
| 45 | Vendor ID3 | VENDOR ID OF ONU |
| 46 | Vendor ID4 | VENDOR ID OF ONU |
| 47 | Unspesified | DON'T CARE |
| 48 | Unspesified | DON'T CARE |
| 49 | Unspesified | DON'T CARE |
| 50 | Unspesified | DON'T CARE |
| 51 | Unspesified | DON'T CARE |

FIG.5B

| | MODE INTO WHICH CURRENT STATE IS CHANGED |
|---|---|
| 0 | CHANGE INTO AWAITING MODE |
| 1 | CHANGE INTO RECEIVING ALLOWABLE MODE |

FIG. 6

REPLY MESSAGE

| BYTE | CONTENTS | |
|---|---|---|
| 7 | xxxxxxxx | INDIVIDUAL PON-ID |
| 8 | 01111zzz | COMMON MESSAGE ID, E.G., 0x78 |
| 9 | 00000001 | SUB MESSAGE ID INDICATIVE OF VENDOR ACKNOWLEDGE |
| 10 | DATA 1 | AREA OF FORTY-SECOND BYTE OF DOWNSTREAM MESSAGE |
| 11 | DATA 1 | AREA OF FORTY-THIRD BYTE OF DOWNSTREAM MESSAGE |
| 12 | DATA 1 | AREA OF FORTY-FOURTH BYTE OF DOWNSTREAM MESSAGE |
| 13 | DATA 1 | AREA OF FORTY-FIFTH BYTE OF DOWNSTREAM MESSAGE |
| 14 | DATA 1 | AREA OF FORTY-SIXTH BYTE OF DOWNSTREAM MESSAGE |
| 15 | DATA 1 | AREA OF FORTY-SEVENTH BYTE OF DOWNSTREAM MESSAGE |
| 16 | DATA 1 | AREA OF FORTY-EIGHTH BYTE OF DOWNSTREAM MESSAGE |
| 17 | DATA 1 | AREA OF FORTY-NINTH BYTE OF DOWNSTREAM MESSAGE |
| 18 | DATA 1 | AREA OF FIFTIETH BYTE OF DOWNSTREAM MESSAGE |

FIG. 7

DISCONNECT REQUEST MESSAGE

| BYTE | CONTENTS | |
|------|----------|---|
| 7 | xxxxxxxx | INDIVIDUAL PON-ID ← 113 |
| 8 | 01111zzz | COMMON MESSAGE ID, E.G., 0x78 ← 112 |
| 9 | 00000010 | SUB MESSAGE ID INDICATIVE OF DISCONNECT ← 116 |
| 10 | Unspesified | DON'T CARE |
| 11 | Unspesified | DON'T CARE |
| 12 | Unspesified | DON'T CARE |
| 13 | Unspesified | DON'T CARE |
| 14 | Unspesified | DON'T CARE |
| 15 | Unspesified | DON'T CARE |
| 16 | Unspesified | DON'T CARE |
| 17 | Unspesified | DON'T CARE |
| 18 | Unspesified | DON'T CARE |

(Bytes 10–18 bracketed as 111)

FIG. 8A

CONNECTION REQUEST MESSAGE

| BYTE | CONTENTS | |
|---|---|---|
| 7 | xxxxxxxx | INDIVIDUAL PON-ID ← 113 |
| 8 | 01111zzz | COMMON MESSAGE ID, E.G., 0x78 ← 112 |
| 9 | 00000011 | SUB MESSAGE ID INDICATIVE OF REQUEST ← 116 |
| 10 | 0000000p | p REPRESENTS ALL UNITS CONSTITUTING GROUP OR INDIVIDUAL UNIT ← 118 |
| 11 | Unspesified | DON'T CARE |
| 12 | Unspesified | DON'T CARE |
| 13 | Unspesified | DON'T CARE |
| 14 | Unspesified | DON'T CARE |
| 15 | Unspesified | DON'T CARE |
| 16 | Unspesified | DON'T CARE |
| 17 | Unspesified | DON'T CARE |
| 18 | Unspesified | DON'T CARE |

(bracket: 111)

FIG. 8B

| p | CONTENTS |
|---|---|
| 0 | REQUEST OF CONNECTION TO ALL UNITS CONSTITUTING VENDOR GROUP |
| 1 | REQUEST OF CONNECTION TO INDIVIDUAL UNIT |

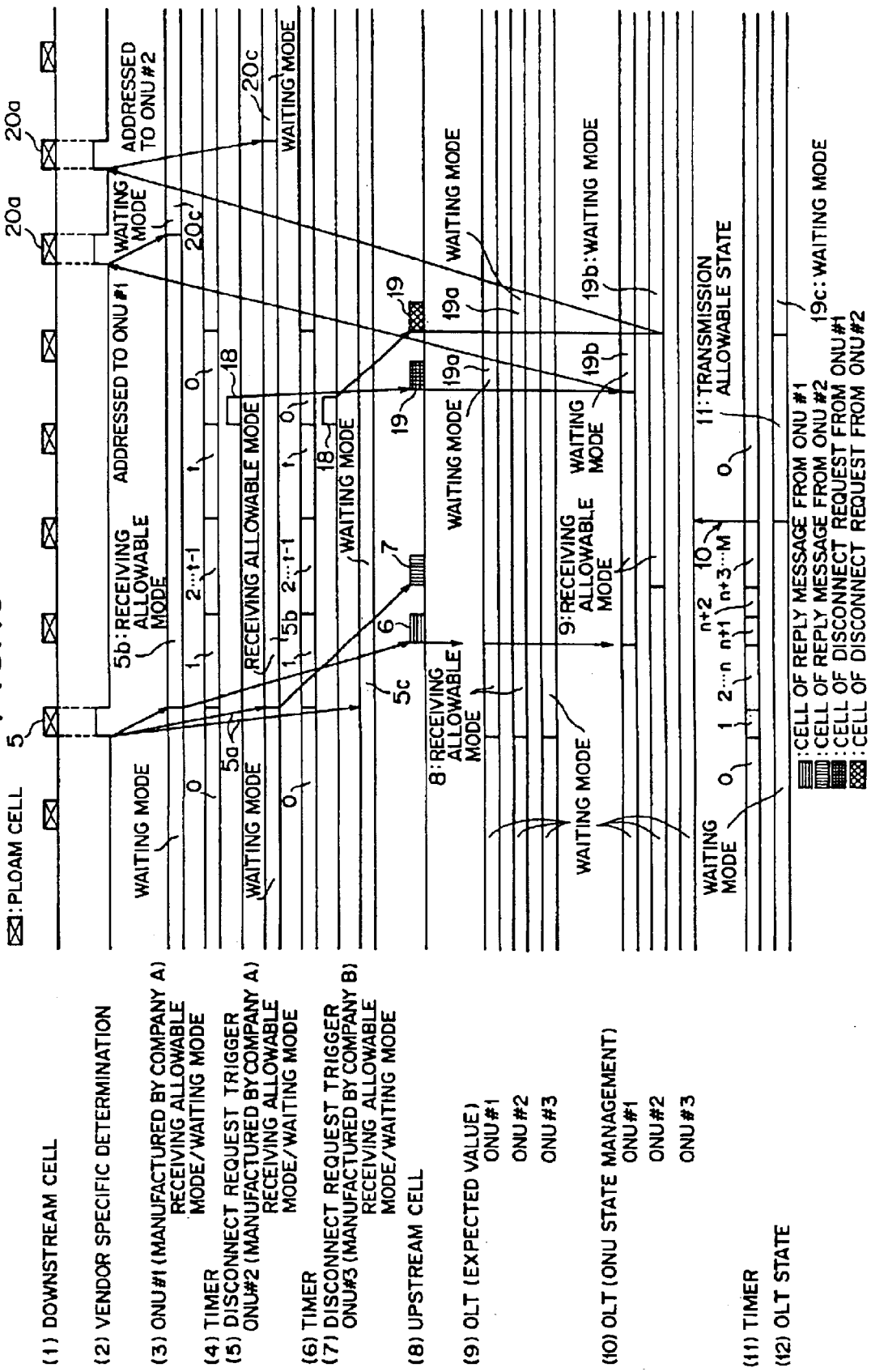

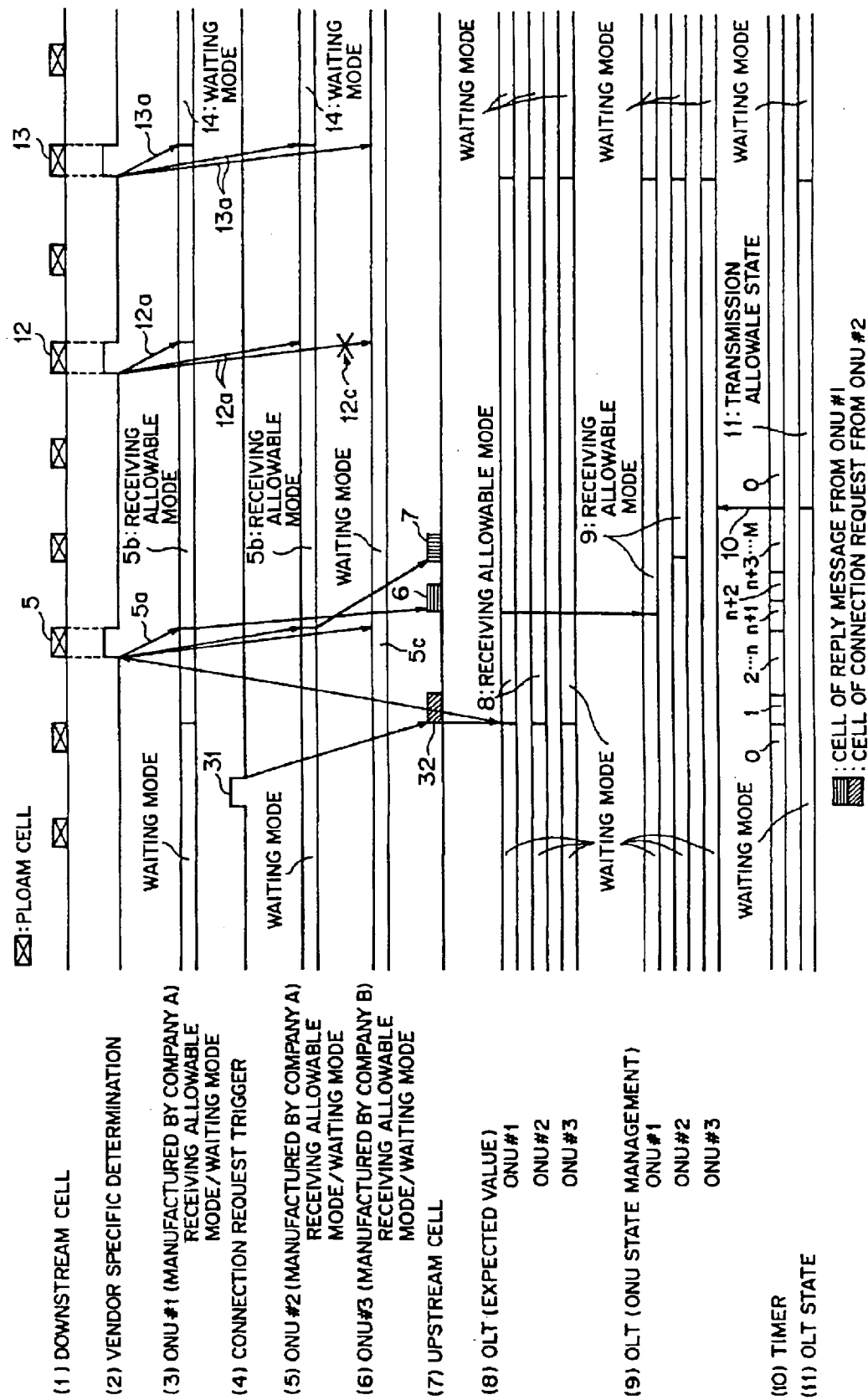

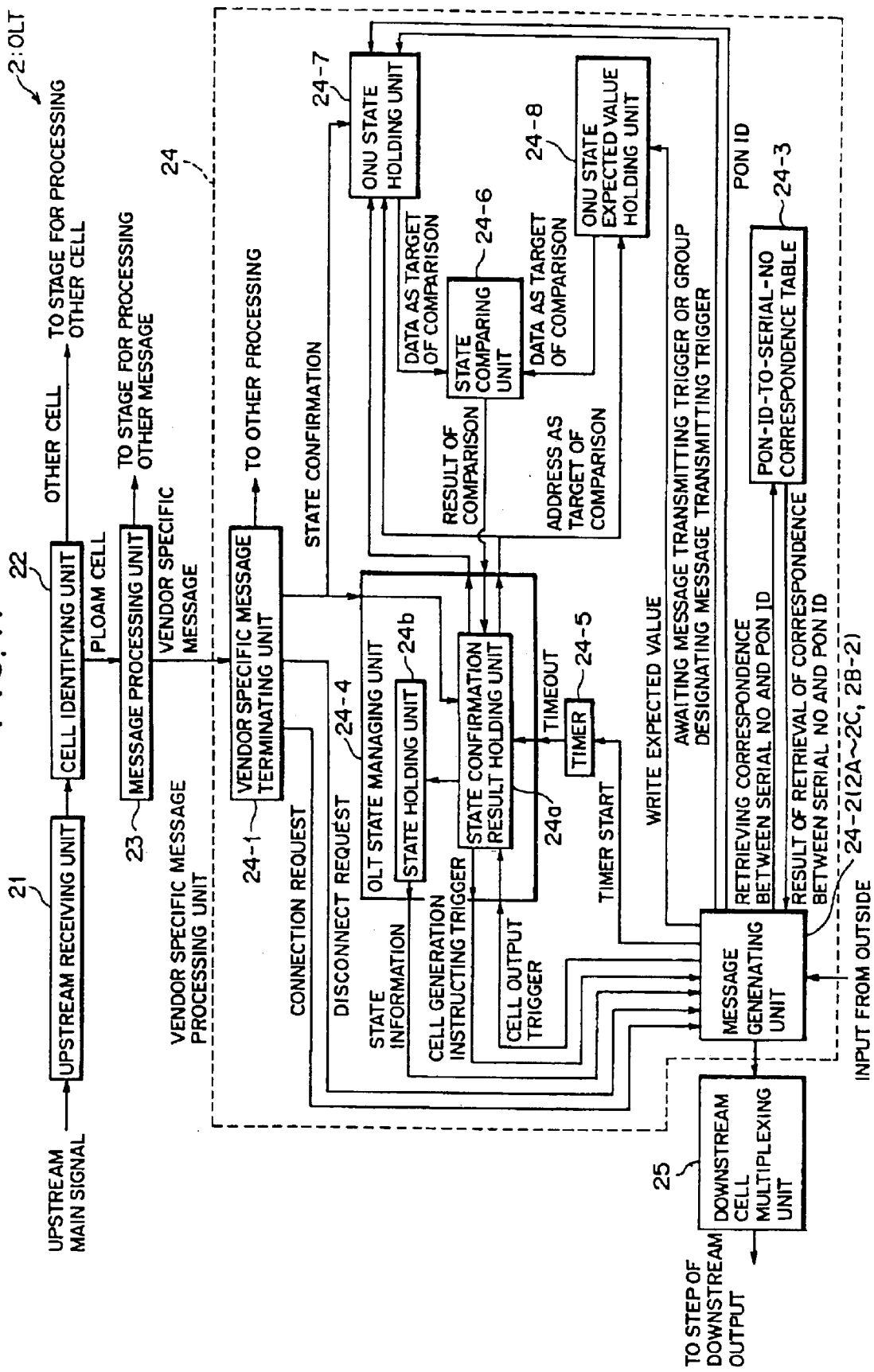

FIG. 18A

| BYTE | CONTENTS | |
|---|---|---|
| 40 | xxxxxxxx | INDIVIDUAL PON-ID OR BROADCAST TYPE PON ID=0x40 — 113 |
| 41 | 01111zzz | COMMON MESSAGE ID, E.G., 0x78 — 112 |
| 42 | 0000001g | LSB IS UTILIZED AS A GROUPING FLAG — 114 |
| 43 | Serial No1-1 | SERIAL NO.(1) INHERENT IN VENDOR OF ONU |
| 44 | Serial No1-2 | SERIAL NO.(1) INHERENT IN VENDOR OF ONU |
| 45 | Serial No1-3 | SERIAL NO.(1) INHERENT IN VENDOR OF ONU |
| 46 | Serial No1-4 | SERIAL NO.(1) INHERENT IN VENDOR OF ONU |
| 47 | Serial No2-1 | SERIAL NO.(2) INHERENT IN VENDOR OF ONU |
| 48 | Serial No2-2 | SERIAL NO.(2) INHERENT IN VENDOR OF ONU |
| 49 | Serial No2-3 | SERIAL NO.(2) INHERENT IN VENDOR OF ONU |
| 50 | Serial No2-4 | SERIAL NO.(2) INHERENT IN VENDOR OF ONU |
| 51 | Unspesified | DON'T CARE |

(Bytes 43–50 grouped as 119; overall 111)

FIG. 18B

| g | MODE INTO WHICH CURRENT STATE IS CHANGED |
|---|---|
| 0 | CHANGE INTO AWAITING MODE |
| 1 | CHANGE INTO RECEIVING ALLOWABLE MODE |

| aa | KIND OF MESSAGE |
|---|---|
| 11 | ACT MESSAGE |
| 10<br>01 | MONITORING REPLY REQUEST MESSAGE |
| 00 | DACT MESSAGE |

FIG. 36

| | | |
|---|---|---|
| 40 | 01000000 | ~113 |
| 41 | 01111000 | ~112 |
| 42 | xxxxxxaa | ~120 |
| 43 | VGID | ~121 |
| 44 | VID1 | |
| 45 | VID2 | |
| 46 | VID3· | |
| 47 | VID4 | |
| 48 | unspecified | |
| 49 | unspecified | |
| 50 | unspecified | |
| 51 | unspecified | |

91a(92a) points to the top of the block. Rows 44–47 are grouped as 122. Rows 40–51 are grouped as 111.

FIG. 40

**91b(92b): ACT / DACT MESSAGE
(MONITORING REPLY REQUEST MESSAGE)**

| | | |
|---|---|---|
| 40 | 01000000 | 113 |
| 41 | 01111000 | 112 |
| 42 | xxxxxxaa | 120 |
| 43 | VGID | 121 |
| 44 | g7  g6  g5  g4  g3  g2  g1  g0 | |
| 45 | g15 g14 g13 g12 g11 g10 g9  g8 | |
| 46 | g23 g22 g21 g20 g19 g18 g17 g16 | |
| 47 | g31 g30 g29 g28 g27 g26 g25 g24 | 123 |
| 48 | g39 g38 g37 g36 g35 g34 g33 g32 | |
| 49 | g47 g46 g45 g44 g43 g42 g41 g40 | |
| 50 | g55 g54 g53 g52 g51 g50 g49 g48 | |
| 51 | g63 g62 g61 g60 g59 g58 g57 g56 | |

91c(92c): ACT/DACT MESSAGE
(MONITORING REPLY REQUEST MESSAGE)

| | | |
|---|---|---|
| 40 | 01000000 OR PON-ID | 113 |
| 41 | 01111000 | 112 |
| 42 | xxxxxxaa | 120 |
| 43 | p8p7p6p5p4p3p2p1 | 124 |
| 44 | unspecified | |
| 45 | unspecified | |
| 46 | unspecified | |
| 47 | unspecified | 111 |
| 48 | unspecified | |
| 49 | unspecified | |
| 50 | unspecified | |
| 51 | unspecified | |

FIG. 46

93a: POINT-TO-MULTIPOINT COMMUNICATION VSM

| | | |
|---|---|---|
| 40 | 01000000 | 113 |
| 41 | 01111zzz | 112 |
| 42 | yyyyyyyy | |
| 43 | yyyyyyyy | |
| 44 | yyyyyyyy | |
| 45 | yyyyyyyy | |
| 46 | yyyyyyyy | 126 / 111 |
| 47 | yyyyyyyy | |
| 48 | yyyyyyyy | |
| 49 | yyyyyyyy | |
| 50 | yyyyyyyy | |
| 51 | CRC | 125a |

FIG. 53

91d(92d): ACT/DACT MESSAGE
(MONITORING REPLY REQUEST MESSAGE)

| # | | |
|---|---|---|
| 40 | 01000000 OR PON-ID | 113 |
| 41 | 01111000 | 112 |
| 42 | xxxxxxaa | 120 |
| 43 | p8 p7 p6 p5 p4 p3 p2 p1 | 124 |
| 44 | VID1 | |
| 45 | VID2 | 122 |
| 46 | VID3 | |
| 47 | VID4 | |
| 48 | unspecified | |
| 49 | unspecified | |
| 50 | unspecified | |
| 51 | unspecified | |

FIG. 54

91e(92e): ACT/DACT MESSAGE
(MONITORING REPLY REQUEST MESSAGE)

| # | | | | | | | | | |
|---|---|---|---|---|---|---|---|---|---|
| 40 | 01000000 OR PON-ID | | | | | | | | 113 |
| 41 | 01111000 | | | | | | | | 112 |
| 42 | xxxxxxaa | | | | | | | | 120 |
| 43 | p8 p7 p6 p5 p4 p3 p2 p1 | | | | | | | | 124 |
| 44 | g7 | g6 | g5 | g4 | g3 | g2 | g1 | g0 | |
| 45 | g15 | g14 | g13 | g12 | g11 | g10 | g9 | g8 | |
| 46 | g23 | g22 | g21 | g20 | g19 | g18 | g17 | g16 | |
| 47 | g31 | g30 | g29 | g28 | g27 | g26 | g25 | g24 | 123 |
| 48 | g39 | g38 | g37 | g36 | g35 | g34 | g33 | g32 | |
| 49 | g47 | g46 | g45 | g44 | g43 | g42 | g41 | g40 | |
| 50 | g55 | g54 | g53 | g52 | g51 | g50 | g49 | g48 | |
| 51 | g63 | g62 | g61 | g60 | g59 | g58 | g57 | g56 | |

FIG. 62A

DOWNSTREAM MESSAGE

| BYTE | CONTENTS | DETAIL |
|------|----------|--------|
| 40 | xxxxxxxx | INDIVIDUAL PON ID OR BROADCAST TYPE PON ID=0x40 |
| 41 | 01111zzz | MESSAGE ID OF VENDOR SPECIFIC MESSAGE (LOWER THREE BIT MAY BE ARBITRARILY UTILIZED) |
| 42 | yyyyyyyy | |
| 43 | yyyyyyyy | |
| 44 | yyyyyyyy | |
| 45 | yyyyyyyy | 111: |
| 46 | yyyyyyyy | MESSAGE FIELD ALLOWED TO BE UTILIZED ARBITRARILY BY EACH VENDOR (TEN BYTES) |
| 47 | yyyyyyyy | |
| 48 | yyyyyyyy | |
| 49 | yyyyyyyy | |
| 50 | yyyyyyyy | |
| 51 | yyyyyyyy | |

FIG. 62B

UPSTREAM MESSAGE

| BYTE | CONTENTS | DETAIL |
|------|----------|--------|
| 7 | xxxxxxxx | INDIVIDUAL PON ID |
| 8 | 01111zzz | MESSAGE ID OF VENDOR SPECIFIC MESSAGE (LOWER THREE BITS MAY BE ARBITRARILY UTILIZED) |
| 9 | yyyyyyyy | |
| 10 | yyyyyyyy | |
| 11 | yyyyyyyy | |
| 12 | yyyyyyyy | |
| 13 | yyyyyyyy | 111: |
| 14 | yyyyyyyy | MESSAGE FIELD ALLOWED TO BE UTILIZED ARBITRARILY BY EACH VENDOR (TEN BYTES) |
| 15 | yyyyyyyy | |
| 16 | yyyyyyyy | |
| 17 | yyyyyyyy | |
| 18 | yyyyyyyy | |

US 6,856,623 B2

1

COMMUNICATION SYSTEM, METHOD OF PROCESSING MESSAGE IN COMMUNICATION SYSTEM, AND STATION-SIDE UNIT AND SUBSCRIBER-SIDE UNIT

This is a cont. of appl. No. PCT/JP99/03751, filed Jul. 12, 1999.

TECHNICAL FIELD

The present invention relates to a communication system suitable for use in an ATM-PON (Asynchronous Transfer Mode-based Passive Optical Network), for example. The present invention also relates to a method of processing a message in the communication system, and a station-side unit and a subscriber-side unit.

BACKGROUND ART

Since the recent communication network is developed to have a large amount of information and the communication network comes to have-variety of forms, a system of FTTH (Fiber to The Home) is going to be realized, whereby optical fiber networks are built up to the neighborhood of each home so that a great amount of information is handled and transmitted at a high speed. FIG. 61 is a diagram showing one mode of communication network, or an ATM-PON 100, for example. Recently, with regard to the ATM-PON 100, a recommendation [G.983] is established by an institution of ITU-T.

As shown in FIG. 61, in ordinary case, the ATM-PON (communication system) 100 is arranged to include a single unit of station-side unit (OLT: Optical Line Termination) 101 and N sets of subscriber-side units (N is an integer larger than one. In accordance with the recommendation [G.983], N is 64 at maximum) (ONU: Optical Network Unit) 103 connected to (accommodated in ) the station-side unit by way of a passive device 102 such as an optical coupler. Thus, the communication network is arranged as a one-to-N connection topology. Although not illustrated in FIG. 61, each ONU 103 accommodates terminals of respective homes and the OLT 101 is housed within a station of an ATM switching system or the like. Thus, an optical communication is effected up to the ONU 103 through the optical fibers.

In the network of the ATM-PON 100, an ATM cell on the downstream sent from the OLT 101 is branched by the passive device 102 in a passive manner, whereby identical ATM cells are distributed to all of the ONUs 103 (in a point-to-multipoint communication fashion). Conversely, an ATM cell on the upstream sent from one of the ONU 103 is transmitted through the passive device 102 and received by the OLT 101 in a time series fashion. When such an upstream transmission is carried out, however, if a plurality of ATM cells are sent from any of the ONUs 103 at the same timing, collision will be brought about between cells. Therefore, the OLT 101 controls (ranging time control) each of the ONUs 103 so that the timings when cells are sent therefrom are shifted from one another.

The ATM-PON 100 transmits and receives a management cell known as a PLOAM (Physical Layer Operation, Administration and Maintenance) cell between the OLT 101 and ONUs 103, whereby various kinds of communication control such as the aforesaid ranging time control, maintenance and administration are carried out.

That is, since the PLOAM cell is arranged to contain desired control information such as the ranging time information and information (message) regarding the maintenance and administration, various communication control

2 and management information can be exchanged between the OLT 101 and the ONUs 103. In this case, the units of OLT 101 and ONUs 103 may be manufactured by an identical vendor. Conversely, as shown in FIG. 61, these units may be manufactured by different vendors (company A, company B, and soon). In any case, the above-described minimum requirement in function is supported in accordance with the recommendation [G.983].

Meanwhile, the above recommendation [G.983] contains a regulation regarding away of using the aforesaid messages. One of the massages is a message specific to a vendor (VSM: Vendor Specific Message). However, how to utilize the VSM is not specified in the recommendation [G.983]. In other words, the message specific to the vendor is allowed to utilize (define) freely depending on the vendor. For this reason, it is considered to carry out an information supplying operation such as a software download (SWDL) in which a desired software is supplied from the OLT 101 to the ONU 103 by using the VSM, for example.

In more concretely, according to the recommendation [G.983], the VSM has a format shown in FIGS. 62A and 62B [in this case, FIG. 62A shows a format of the VSM for use in downstream transmission (OLT 101 to ONU 103) while FIG. 62B shows a format of the VSM for use in upstream transmission (ONU 103 to OLT 101)]. The VSM cell (total 53 bytes) for the downstream transmission has a field of forty-second to fifty-first byte (ten bytes in total) from the head thereof as a message field 111 which can be utilized freely by each vendor. The VSM cell for the upstream transmission similarly has a field of ninth to eighteenth byte (ten bytes in total) as a message field 111 which can be utilized freely by each vendor. The VSM cell for the downstream transmission and the VSM cell for the upstream transmission have a message ID field 112 at the forty-first byte and eighth byte, respectively. A value of "01111zzz" [lower three bits (z) can take an arbitrary number] is attached on the field so as to indicate that the subject message is a message of VSM.

In other words, according to the recommendation [G.983], eight kinds of message IDs of from "01111000(0× $78_H$)" to "011111111(0×7f$_H$)" are prepared as the message ID for the VSM.

The OLT 101 attaches a PON-ID (identification information specific to each of the ONUs 103) or a PON-ID(= 01000000(0×40H)) indicative of a broadcast type communication (point-to-multipoint communication) to a downstream VSM message at fortieth byte (PON-ID field 113), whereby a specified one (single unit) of the ONUs 103 or all of the ONUs 103 are brought into a message receiving mode.

As for example shown in FIG. 63, if the PON-ID indicative of the broadcast type communication is attached to the downstream VSM (PLOAM cell) (see reference ①) all of the ONUs 103 receive the VSM. Conversely, if the PON-ID having a unit-specifying function is attached to the downstream cell, only an ONU 103 having the PON-ID stored therein can receive the VSM, and other ONUs 103 (i.e., ONU 103 having a different PON-ID) will discard the received VSM (see references ② to ④).

According to the arrangement of the ATM-PON 100 shown in FIG. 61, a main signal generated from the OLT 101 is distributed through the passive device 101 in a passive manner. Therefore, it is physically impossible to distribute the signal (message) from the OLT 101 to a selected one of ONUs 103. Accordingly, all of the ONUs 103 once receive the same signal and each of the units 103 determines whether the received signal shall be discarded or not depending on whether or not the PON-ID attached to the received signal (at the PON-ID field 113) is coincident with its own identification number. In this way, the signal can be selectively received.

Meanwhile, according to the recommendation [G.983], the following is forcibly recommended. That is, when the OLT 2 assigns an individual PON-ID number to each of the ONUs 103, the ONU 103 sends to the OLT 101 a serial number (Serial Number) ONU message 109 as shown in FIG. 64 by using the upstream PLOAM cell.

In this case, as shown in FIG. 64, when the message is formed into a PLOAM cell, the serial number ONU message 109 comes to have a format which is defined in such a manner that a PON-ID field 113 is mapped at a seventh byte from the head of the cell (second byte from the payload), a message ID field 112 is mapped at eighth byte of the head of the cell, a vendor ID field 110a is mapped at tenth to thirteenth bytes from the head of the cell, and a vendor serial number (Vendor Serial Number) field 110b is mapped at fourteenth to seventeenth bytes from the head of the cell. The format of the cell has a fixed value (00000000) mapped on a field at a ninth byte from the head of the cell. However, this field has no particular function. Also, a field extending from a eighteenth byte from the head of the cell is an unspecified byte.

The ONU 103 settles the vendor ID in the vendor ID field 110a and a serial number for each vendor in the vendor serial number field 110b. Thus, a serial number information specific to each ONU 103 composed of the vendor ID of its own unit and the serial number for each vendor is stored in the serial number field 110, and the OLT 2 is informed of the serial number.

At this time, a fixed value of "01000000" (0x40$_H$) is settled in the PON-ID field 113 (after the individual PON-ID has been assigned to each unit, the PON-ID is settled). Further, a value of (00000011) indicating that the message itself is the serial number ONU message 109 is stored in the message ID field 112.

If the OLT 101 receives the serial number ONU message 109 from each of the ONUs 103 and holds therein information indicative of the correspondence between the serial number involved in the message 109 and the PON-ID to be assigned to each ONU 103, it becomes possible to assign the individual PON-ID to each ONU 103, freely, and also it becomes possible to specify the vendor of the ONU 103 based on the individual PON-ID assigned to the ONU 103.

In the above-arrangement of the ATM-PON 100, however, when a message is sent to the ONU 103, the OLT 101 suffers from a restriction in the manner of transmission. That is, as described above, a message is allowed send to all of the ONUs 103 as a broadcast type communication, or alternatively, a message is allowed to send to only a single unit of ONU 103 (point-to-point communication). Therefore, the arrangement will encounter the following difficulties.

(1) According to the recommendation [G.983], it is not guaranteed that the VSM can be exchanged among units in a compatible fashion whichever vendor the units are manufactured by. For this reason, if a VSM is sent to the units in a broadcast communication manner, an erroneous operation can be caused at a high possibility in an ONU 103 of which vendor is different from that of the OLT 101 upon receiving the VSM.

(2) When it is requested that a VSM is exclusively sent to ONUs 103 of which vendor is a particular one, such as when a software such as the aforesaid SWDL is distributed to the ONUs 103 which are manufactured by an identical vendor and commonly necessitate the software, there is no choice in the way of communication but the point-to-point communication due to the difficulty identified by the above Reference (1). In this case, the PLOAM cell (VSM) having the same contents shall be transmitted repeatedly by a number of times corresponding to the number of ONUs 103 as a target of transmission. Therefore, the number of output messages from the OLT 101 is increased, a heavy load is imposed on the OLT 101 and the ONUs 103, it takes a lot of time to download the message, and steep rise will be caused in the network traffic.

In other words, according to the arrangement of conventional ATM-PON 100, the PLOAM cell (message) can be transmitted only in manners of broadcast type communication and point-to-point communication. Therefore, it is impossible to send a VSM to a particular plural number of ONUs 103 exclusively in a manner of point-to-multipoint communication. Thus, the above-described difficulties are caused.

The present invention is made in view of the above aspect. Therefore, it is an object of the present invention to provide a communication system in which a station-side unit can send a message only to a particular plural number of subscriber-side units in a manner of point-to-multipoint communication. Also, an object of the present invention is to provide a method of processing the message in the communication system and a station-side unit and a subscriber-side unit for use in the communication system.

DISCLOSURE OF THE INVENTION

According to the present invention, in order to attain the above object, there is provided a communication system including a plurality of subscriber-side units manufactured by respective desired vendors and a station-side unit manufactured by a desired vendor accommodating the subscriber-side units, the station-side unit being capable of carrying out a point-to-multipoint communication with all of the subscriber-side units by sending a message in a manner of point-to-multipoint communication, wherein the station-side unit and the subscriber-side unit are composed of the following components.

The station-side unit is composed of:

(1) a point-to-multipoint message generating unit for generating a point-to-multipoint message; and (2) a group designating message generating unit for generating a group designating message to designate some of the subscriber-side units as a component constituting a group of units which are to receive the point-to-multipoint message.

The subscriber-side unit is composed of:

(1) a point-to-multipoint message processing unit for receiving and processing the point-to-multipoint communication message from the station-side unit; and (2) a state control unit for controling, in response to a reception of the group designating message from the station-side unit, a status of the reception and the processing for the point-to-multipoint message in the point-to-multipoint message processing unit to a valid status.

According to the present:invention, there is proposed a method of processing a message for use in a communication system including a plurality of subscriber-side units manufactured by respective desired vendors and a station-side unit manufactured by a desired vendor accommodating the subscriber-side units, the station-side unit being capable of carrying out a point-to-multipoint communication with all of the subscriber-side units by sending a message in a manner of point-to-multipoint communication, wherein the station-side unit designates some of the subscriber-side units out of the subscriber-side units as a component constituting a group of units which are to receive the point-to-multipoint message, and only the subscriber-side units designated as the component constituting the group of units are allowed to receive and process the message sent from the station-side unit in the manner of point-to-multipoint communication.

In this case, the station-side unit may designate the subscriber-side units manufactured by an identical vendor as a component constituting the group of units. Also, the station-side unit may designate some of the subscriber-side units manufactured by an identical vendor as a component constituting the group of units.

According to the present invention, there is provided a station-side unit for use in the aforesaid communication system including a point-to-multipoint message generating unit capable of generating the message in a manner of point-to-multipoint communication, and a group designating message generating unit for generating a group designating message to designate some of the subscriber-side units as a component constituting a group of units which are to receive the point-to-multipoint message.

If each of the subscriber-side units is assigned with vendor identification information, the group designating message generating unit may be arranged to include a first vendor group designating message generating unit for generating a vendor group designating message having the vendor identification information addressed to the subscriber-side units manufactured by an identical vendor as the group designating message, whereby the subscriber-side units are designated as a component constituting the group of units.

If each of the subscriber-side units is assigned with unit identification information specific to each vendor, the group designating message generating unit may be arranged to include a second vendor group designating message generating unit for sending a vendor group designating message attached with the unit identification information addressed to only designated ones of the subscriber-side units manufactured by an identical vendor as the group designating message, so that some of the subscriber-side units are designated as a component constituting the group of units.

The present station-side unit may be arrange to include a group designation canceling unit for generating a group canceling message which cancels the designation of the grouping effected on an arbitrary subscriber-side unit.

The group designation canceling unit may be arranged so that, after the group of units is designated, if the station-side unit receives no reply message on the designation from the subscriber-side unit for a predetermined period of time, then the group canceling message addressed to at least the subscriber-side unit is generated. The group designation canceling unit may also be arranged so that, when a group designation canceling request is received from the subscriber-side unit, then the group canceling message is sent to at least the subscriber-side unit which has requested the group designation canceling.

Further, the group designation message generating unit may be arranged in such a manner that, when a group designation request is received from the subscriber-side unit, then the group designation message generating unit generates the group designating message so that at least the subscriber-side unit having requested the group designation is designated as a component constituting the group of units.

The group designation message generating unit may be arranged to include a group identification information assignment message generating unit for generating an assignment message to the subscriber-side units to be designated as a component constituting the group of units as a group designating message, whereby the subscriber-side units are assigned with the same group identification information. In this case, it is recommended that the vendor inherent message generating unit is arranged as a group identification information attaching type point-to-multipoint message generating unit which sends a point-to-multipoint message attached with the group identification information to the component constituting the group of units.

In this case, the group identification information assignment message generating unit may be arranged to include a vendor identification information attaching unit for attaching vendor identification information specific to the subscriber-side unit to the assignment message, so that the subscriber-side units manufactured by an identical vendor can be designated as a component constituting the group of units.

The present station-side unit may be arrange to include a point-to-multipoint message number confirmation requesting unit for requesting from the subscriber-side unit to confirm the number of received point-to-multipoint messages.

On the other hand, according to the present invention, there is provided a subscriber-side unit for use in the aforesaid communication system including a point-to-multipoint message processing unit for receiving and processing the point-to-multipoint message from the station-side unit, and a state control unit for effecting control, in response to a fact that the subscriber-side unit receives from the station-side unit a group designating message which designates the subscriber-side unit as a component constituting a group of units which is to receive the point-to-multipoint message, so that the reception and the processing for the point-to-multipoint message in the point-to-multipoint message processing unit are brought to a valid status.

In this case, if each of the subscriber-side units is assigned with vendor identification information, and the station-side unit is arranged to generate a vendor group designating message having the vendor identification information to the subscriber-side units so that the subscriber-side units manufactured by an identical vendor are designated as a component constituting the group of units, then the state control unit maybe arranged to include a first vendor identification information comparing determining unit for comparing the vendor identification information given to the vendor group designating message sent from the station-side unit with the vendor identification information assigned to its own subscriber-side unit, thereby to determine whether or not the two pieces of vendor identification information are coincident with each other, and if the first vendor identification information comparing determining unit determines that the two pieces of vendor identification information are coincident with each other, then the reception and the processing for the point-to-multipoint message handled by the point-to-multipoint message processing unit are brought to a valid status.

Further, if each of the subscriber-side units is assigned with unit identification information specific to each vendor, and the station-side unit is arranged to generate a vendor group designating message having a plurality of the unit identification information to the subscriber-side units manufactured by an identical vendor so that specific ones of the subscriber-side units are designated as a component constituting the group of units, then the state control unit may be arranged to include a unit identification information determining unit for determining whether or not the unit identification information attached to the vendor group designating message sent from the station-side unit contains the unit identification information assigned to its own subscriber-side unit, and if the unit identification information determining unit determines that the unit identification information assigned to its own subscriber-side unit is contained, then the reception and the processing on the point-to-multipoint message handled by the point-to-multipoint message processing unit are brought to a valid status.

The state control unit may include a canceling control unit which is arranged in such a manner that, when the subscriber-side unit receives a group canceling message for canceling the designation on the subscriber-side unit itself as a component constituting a group of units from the station-side unit, then the reception and the processing on the point-to-multipoint message handled by the point-to-multipoint message processing unit are brought to an invalid status.

Further, the subject subscriber-side unit may be arranged so that the state control unit includes a reply message returning unit which returns a reply message to the station-side unit when the state control unit controls the point-to-multipoint message processing unit so as to bring the reception and the processing on the point-to-multipoint message to a valid status. The subscriber-side unit may be arranged to include a group designation cancellation requesting unit for requesting cancellation of the designation on the subscriber-side unit itself as a component constituting a group of units from the station-side unit. The subscriber-side unit may also be arranged to include a group designation requesting unit for requesting the designation on the subscriber-side unit itself as a component constituting a group of units from the station-side unit.

If a station-side unit arranged to generate an assigning message for assigning identical group identification information to subscriber-side units to be designated as a component constituting a group of units, and also generates a point-to-multipoint message having the group identification information addressed to the group of units, the state control unit may be arranged to include a group identification information holding unit for holding the group identification information assigned by the assigning message sent from the station-side unit, and a group identification information comparing determining unit for comparing the group identification information attached to the point-to-multipoint message sent from the station-side unit with group identification information held in the group identification information holding unit, thereby to determine whether or not the two pieces of information are coincident with each other, and also the state control may be arranged to carry out control in such a manner that, if the group identification information comparing determining unit determines that the two pieces of information are coincident with each other, then the reception and the processing on the point-to-multipoint message handled by the point-to-multipoint message processing unit are brought to a valid status.

If a station-side unit is arranged to attach vendor identification information specific to the subscriber-side unit to the assignment message so that the subscriber-side units manufactured by an identical vendor can be designated as a component constituting the group of units, then the subscriber-side unit may be arranged to include a second vendor identification information comparing determining unit for comparing the vendor identification information given to the assignment message with the vendor identification information assigned to its own subscriber-side unit, thereby to determine whether the two pieces of vendor identification information are coincident with each other or not, and if the second vendor identification information comparing determining unit determines that the two pieces of vendor identification information are coincident with each other, then the group identification information holding unit holds the group identification information.

Furthermore, the subject subscriber-side unit may be arranged to include a message counting unit for counting a number of point-to-multipoint messages received by the point-to-multipoint message processing unit, and a received message number notifying unit for notifying the station-side unit of the counting result yielded by the message counting unit when a confirmation request on the received number of the point-to-multipoint messages is received from the station-side unit.

According to the above-described present invention, in a communication system, the station-side unit is allowed to send a point-to-multipoint message to specified components constituting a group of units (some of a plurality of the subscriber-side units selected from all of the subscriber-side units) exclusively so that the units receive and process the point-to-multipoint message. Therefore, the following advantages can be obtained.

(1) The station-side unit can send the point-to-multipoint message to the specific subscriber-side units which are capable of receiving and processing the point-to-multipoint message satisfactorily. Therefore, it becomes possible to avoid unexpected erroneous operation which can be caused when, for example, a point-to-multipoint message specific to a certain kind of vendor is sent to a subscriber-side unit manufactured by a different kind of vendor.

(2) The station-side unit can send a point-to-multipoint message having identical contents to each of the subscriber-side units constituting the group of units by a single shot of point-to-multipoint message transmission. Therefore, the station-side unit and the subscriber-side unit become free from a heavy processing task, the network traffic can be prevented from being increased, and each of the subscriber-side units constituting the group of units can be supplied with necessary information in a very short period of time.

In this case, if the subscriber-side units manufactured by an identical vendor are designated as a component constituting the group of units, it becomes possible to avoid more reliably unexpected erroneous operation which can be caused in the subscriber-side unit. Also in this case, when a subscriber-side unit constituting the group of units is designated, if the unit is designated by the vendor group designation message having vendor identification information which is assigned in advance to each of the subscriber-side units, then the designation of the group of units can be achieved by a single shot of vendor group designation message transmission. Therefore, the station-side unit and the subscriber-side unit become free from a heavy processing task, and the network traffic or the like can be prevented from being increased.

If some of the subscriber-side units selected from units manufactured by an identical vendor are designated as a component constituting the group of units, then only the some subscriber-side units selected from units manufactured by the identical vendor can be forced to receive the point-to-multipoint message. Therefore, it becomes possible to arrange more flexibly the scheme of information supply to the subscriber-side units by means of the point-to-multipoint message.

Also in this case, when a subscriber-side unit constituting the group of units is designated, if the unit is designated by the vendor group designation message having unit identification information specific to each vendor, then the designation of the group of units can be achieved by a single shot of vendor group designation message transmission. Therefore, the station-side unit and the subscriber-side unit become free from a heavy processing task, and the network traffic or the like can be prevented from being increased.

Any unit group designation on the subscriber-side units is allowed to be canceled. Thus, unnecessary unit group designation may be removed properly, with the result that the unit group designation becomes more reliable and the communication resources can be more effectively utilized.

For example, if the aforesaid unit group designation is effected and thereafter no confirmation message on the designation is received from the corresponding subscriber-side unit for a predetermined period of time, then at least the subscriber-side unit may be released from the designation on the group of the units. In this way, if the station-side unit fails to confirm that the subscriber-side unit is designated as a component constituting the group of units, the station-side unit releases the subscriber-side unit from the designation as a component constituting the group of units. Accordingly, great contribution that the unit group designation becomes more reliable can be expected.

The designation and cancel of the aforesaid unit group can be effected in accordance with a request made by the subscriber-side unit. Therefore, the system will be more comfortably managed.

When a subscriber-side unit is designated as a component constituting the group of units, the same group identification information is assigned to each of the subscriber-side units to be designated. Therefore, any subscriber-side unit can be arbitrarily designated as a component constituting an identical group of units. Accordingly, unit group designation can be effected with flexibility.

Also in this case, subscriber-side units manufactured by the same vendor can be designated as a component constituting an identical group of units. Thus, it becomes possible to make only the subscriber-side units manufactured by the same vendor receive a point-to-multipoint message. Therefore, it becomes possible to prevent unexpected erroneous operation brought about in the subscriber-side unit.

If the station-side unit requests from the subscriber-side unit that a number of received point-to-multipoint messages is to be confirmed, the subscriber-side unit returns information indicative of the number of received point-to-multipoint messages to the station-side unit. Therefore, the station-side unit can confirm the state of information supply to the subscriber-side unit by means of point-to-multipoint messages.

BRIEF DESCRIPTION OF THE DRAWINGS

FIG. 4 is a diagram showing a header format of a PLOAM cell;

FIGS. 5A and 5B are each diagram for explaining a format of a vendor group control message utilized in the first embodiment;

FIG. 6 is a diagram for explaining a format of a reply message utilized in the first embodiment;

FIG. 7 is a diagram for explaining a format of a network cut requesting message utilized in the first embodiment;

FIGS. 8A and 8B are each diagram for explaining a format of a connection requesting message utilized in the first embodiment;

FIG. 15 is a timing chart for explaining an operation (when a release requesting message is sent from the ONU) of the ATM-PON shown in FIG. 1;

FIG. 16 is a timing chart for explaining an operation (when a connection requesting message is sent from the ONU) of the ATM-PON shown in FIG. 1;

FIG. 17 is a block diagram showing an arrangement of a first modification of the OLT shown in FIGS. 1 and 2;

FIGS. 18A and 18B are each diagram for explaining a format of a vendor group control message utilized in the first modification;

FIG. 36 is a diagram for explaining a format of an Act/Dact message (monitoring reply requesting message) utilized in a first modification of the second embodiment;

FIG. 40 is a diagram for explaining a format of an Act/Dact message (monitoring reply requesting message) utilized in a second modification of the second embodiment;

FIG. 45 is a diagram for explaining a format of an Act/Dact message (monitoring reply requesting message) utilized in the third modification of the second embodiment;

FIG. 46 is a diagram for explaining a format of a point-to-multipoint VSM utilized in the third modification of the second embodiment;

FIGS. 53 and 54 are each diagram for explaining a format of another Act/Dact message (monitoring reply requesting message);

FIG. 62A is a diagram for explaining a format of a downstream VSM;

FIG. 62B is a diagram for explaining a format of a upstream VSM;

BEST MODE FOR CARRYING OUT THE INVENTION

Embodiments of the present invention will be hereinafter described with reference to drawings.

Figure 1:
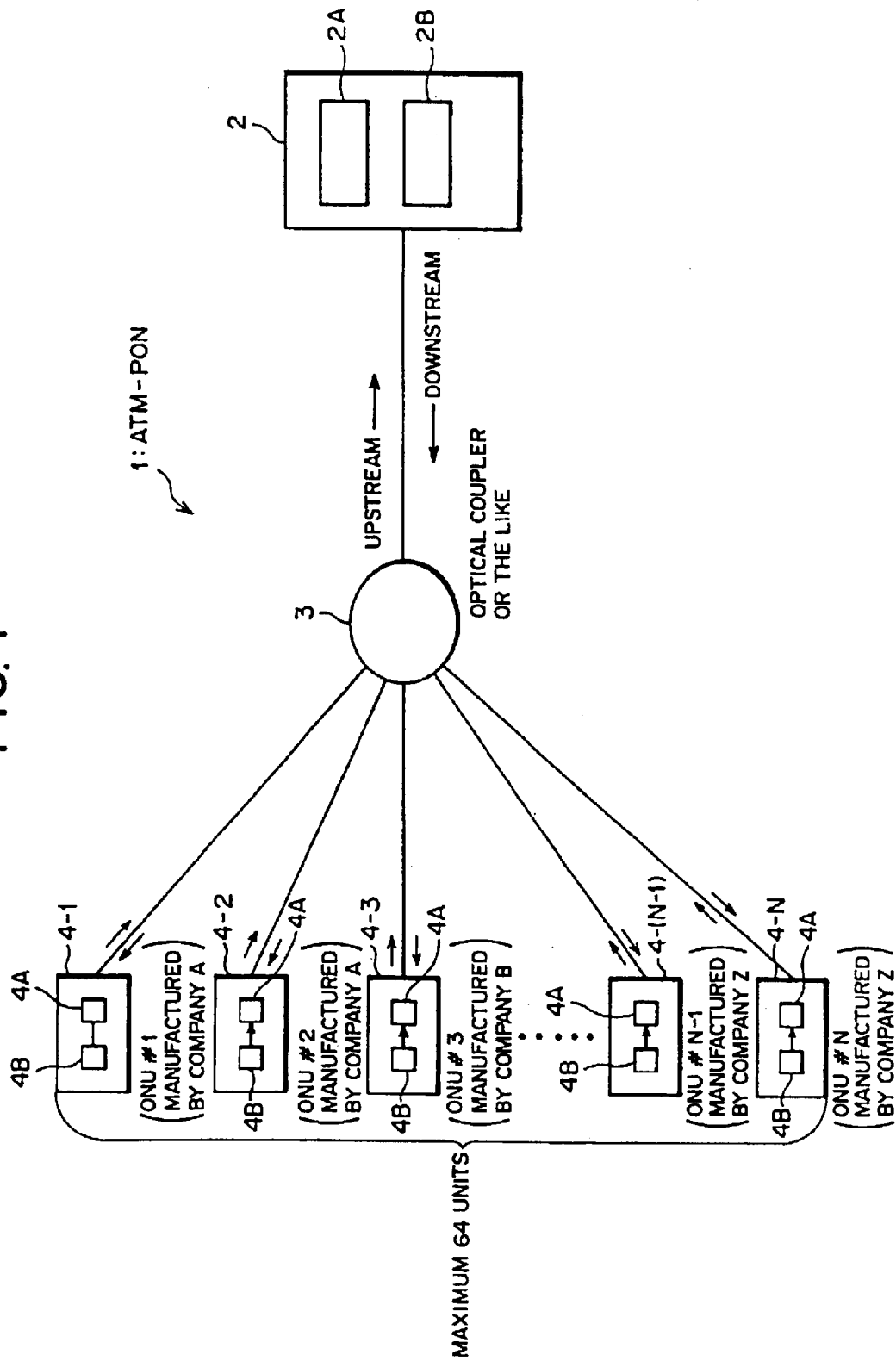
FIG. 1 is a block diagram showing an arrangement of an ATM-PON (communication system) as a first embodiment of the present invention.
Figure 61:
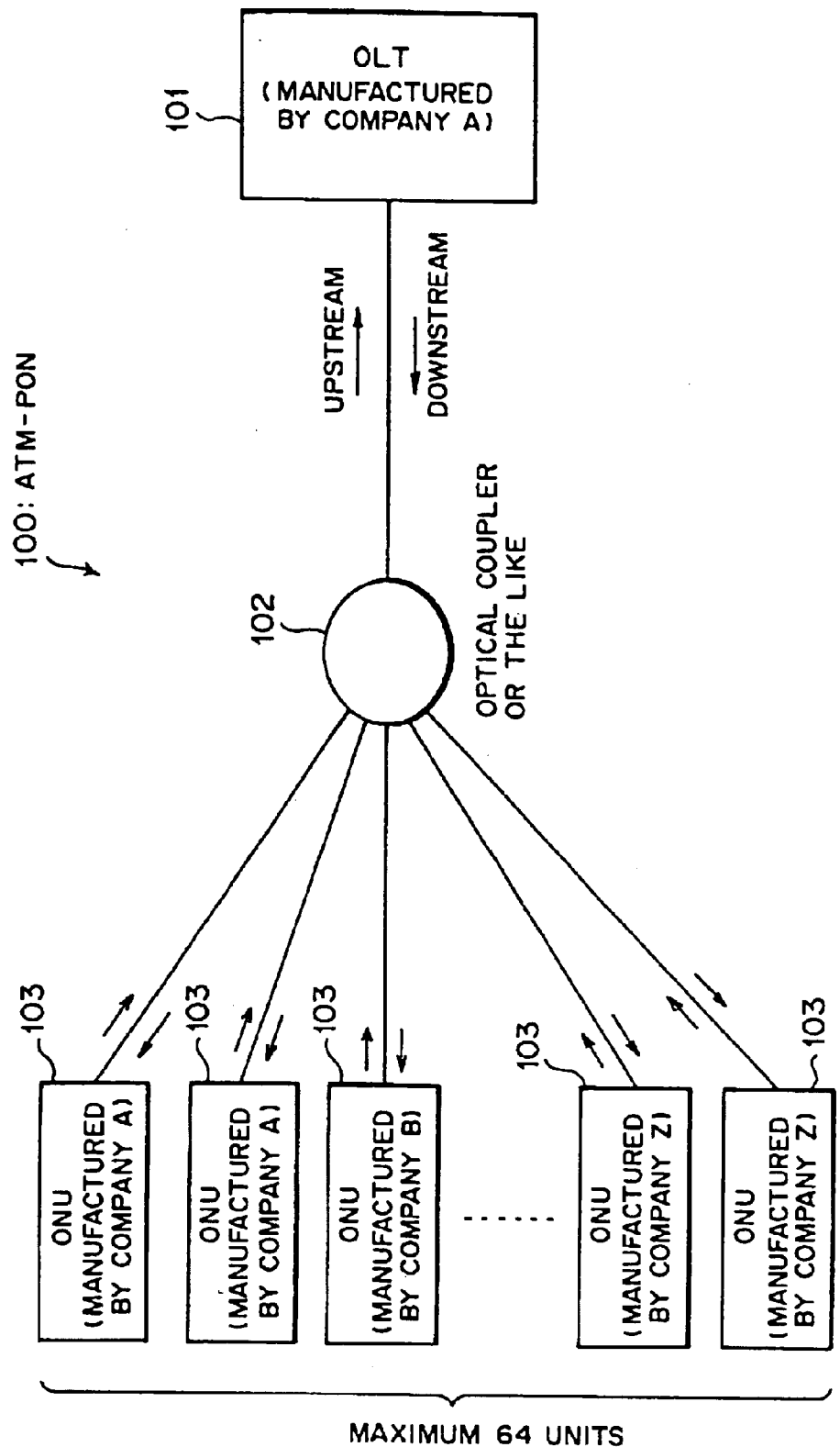
FIG. 61 is a block diagram showing one example of a conventional ATM-PON.
Figure 63:
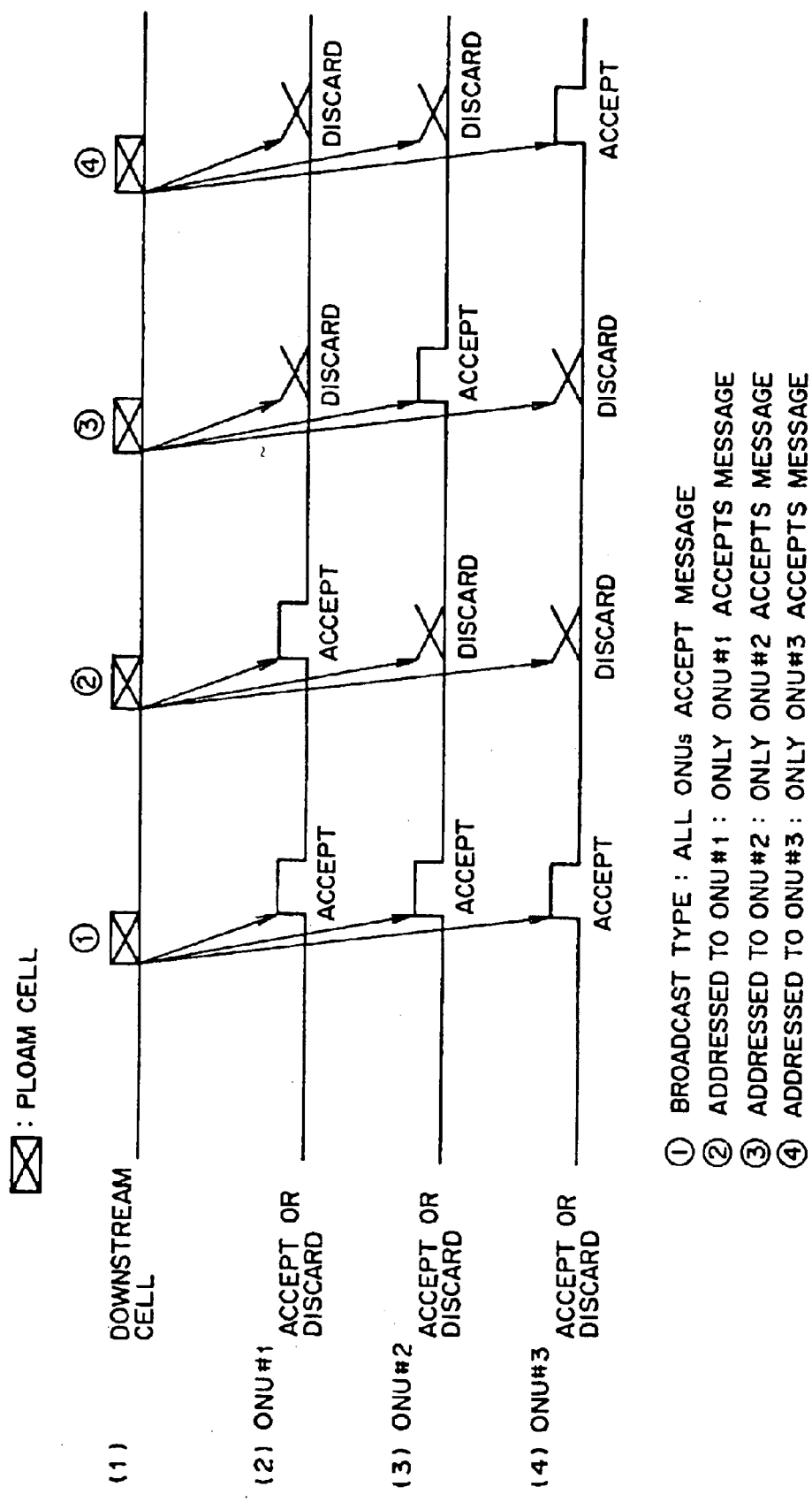
FIG. 63 is a timing chart for explaining an operation of an ATM-PON shown in FIG. 61.

FIG. 1 is a block diagram showing an arrangement of an ATM-PON (communication system) as a first embodiment of the present invention. As shown in FIG. 1, similarly to the ATM-PON 100 described with reference to FIG. 61, an ATM-PON 1 is arranged to include a single unit of station-side unit (OLT) 2 and N subscriber-side units (ONU#1 to #N) 4-1 to 4-N (N is an integer equal to or larger than 2. According to the recommendation [G.983], the maximum allowable number is 64) connected (accommodated) to the station-side unit through a passive device 3 such as a photo-coupler.

Also in this case, all of the ONUs 4-$i$ (where i=1 to N) are manufactured by the same vendor or some of them may be manufactured by a different vendor. In the present embodiment, as shown in FIG. 1, it is assumed that the OLT 2 and two units of ONUs 4-1 and 4-2 are manufactured by a common vendor (company A) and remaining units of ONUs 4-3 to 4-N are manufactured by vendors (company B, company Z and so on) different from the vendor (company A) of the OLT2. Further,each of the ONUs 4-$i$ is assigned with vendor identification information (vendor ID) specific to each vendor in accordance with the regulation of the recommendation [G.983].

Figure 2:
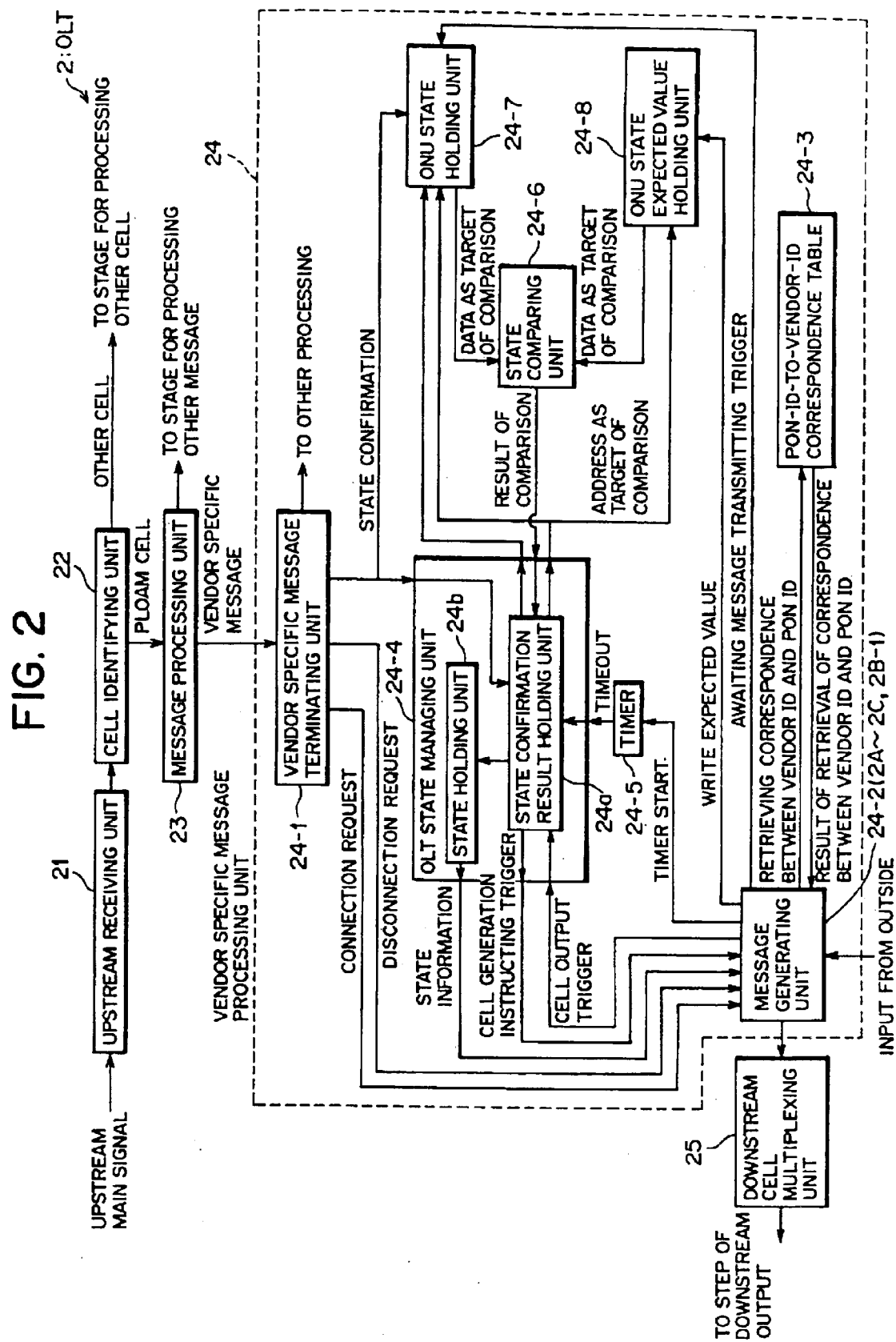
FIG. 2 is a block diagram showing an arrangement of an OLT (station-side unit) for use in the ATM-PON shown in FIG. 1.

As for example shown in FIG. 2, the OLT 2 of the present embodiment includes an upstream receiving unit 21, a cell identifying unit 22, a message processing unit 23, a VSM processing unit 24 and a downstream cell multiplexing unit 25. As for example shown in FIG. 3, the ONU 4-$i$ includes a cell identifying unit 41, a message identifying unit 42, a message terminating unit 43, an upstream message processing unit 44 and a VSM processing unit 45.

In the OLT 2, the upstream receiving unit 21 is a unit for receiving an upstream cell (such as a user cell and PLOAM) from the ONU 4-$i$. The cell identifying unit 22 is a unit for identifying whether the upstream cell received by the cell receiving unit 21 is a PLOAM cell or other type of cell. In more concretely, the received cell has a value shown in FIG. 4 settled (attached) at its header [five bytes (octet: octet 1-5)]. Owing to the value, the unit can identify that the cell is a PLOAM cell. The received cell identified to be a PLOAM cell is sent to the message processing unit 23, and a cell identified to be other type of cell is sent to a cell processing unit (not shown) for carrying out processing corresponding to the cell.

The message processing unit 23 is a unit which refers to the message ID attached to a part of a message field of the PLOAM cell transferred from the cell identifying unit 22 [in the present embodiment, at the message ID field (the third byte (eighth byte from the head portion))], and identifies whether the message sent from the ONU 4-i is a VSM [message ID=01111zzz: z of the lower three bits can take an arbitrary value (or $0\times78_H$ to $0\times7f_H$)] or other type of message, based on the PLOAM cell. If the cell is identified to be a VSM, then the message is sent to the VSM processing unit 24, while if the message is identified to be other type of message, then the message is sent to a message processing unit (not shown) for carrying out processing corresponding to the message.

The VSM processing unit 24 is a unit for carrying out processing corresponding to the VSM sent from the message processing unit 23 or processing corresponding to a setting effected from the outside terminal such as a microcomputer (system CPU). In the present embodiment, as shown in FIG. 2, for example, this unit is arranged to include a VSM terminating unit 24-1, a message generating unit 24-2, a PON-ID-to-vendor-ID correspondence table 24-3, an OLT state management unit 24-4, a timer unit 24-5, a state comparing unit 24-6, an ONU state holding unit 24-7 and an ONU state expected value holding unit 24-8.

The VSM terminating unit 24-1 is a unit for terminating the VSM sent from the message processing unit 23 and recognizing the contents (e.g., various kinds of messages such as a reply from the ONU 4-i, network connection request, disconnection request which will be described later on). In accordance with the result of recognition thereof, the message generating unit 24-2 is subjected to management in its message generation, and the OLT state management unit 24-4 is also subjected to management in its state (state of the OLT 2)(state control: whether or not message is allowable to send to the ONU 4-i or whether or not the state is placed in an awaiting state).

In the case of the present embodiment, the term "connection" means logical connections (logical connections) specified by a VPI (Virtual Path Identifier)/VCI (Virtual Channel Identifier) set at the header of the ATM cell.

The message generating unit 24-2 is fundamentally serves as a unit for generating a VSM (downstream message) having a fundamental format, which is described with reference to FIG. 62A, in accordance with an instruction from the aforesaid system CPU (external input). Also in this case, if a certain VSM is requested to be received only by a single unit of ONU 4-i, an individual PON-ID assigned to the ONU 4-i is attached to the message at the PON-ID field 113. If the message is requested to be delivered to all ONUs 4-i, a PON-ID ($0\times40_H$) indicative of a broadcast type communication is attached to the message at the PON-ID field 113. In this way, a VSM for a particular unit or a VSM for all of the ONUs 4-i can be generated.

In the present embodiment, an ordinary VSM can be generated only when the state information held in the state holding unit 24b of the OLT state management unit, which will be described later on, is placed in a "transmission allowable state". If the state information is placed in an "awaiting state", a desired VSM is allowable to send to specified ONUs 4-i of the all ONUs 4-i manufactured by a certain vendor (e.g., to the ONUs 4-1 and 4-2 manufactured by company A shown in FIG. 1) by a single shot of transmission (in a point-to-multipoint communication manner). In this way, a VSM (VG control message) is generated, whereby a vendor group (VG) obliged to receive a VSM is designated or the designation thereof can be cancelled.

In more concretely, as for example shown in FIG. 5A, the VG control message can be generated by using a message field (ten bytes amount from forty-second byte to fifty-first byte from the head of the PLOAM cell) which is allowed to be utilized freely by each vendor.

That is, when the subject message is formed into a PLOAM cell, the following pieces of information (message contents) are generated as pieces of information to be mapped (set) on ① an area of forty-first byte, ② an area of forty-second byte, and ③ an area of forty-third to forty-sixth bytes from the head portion of the cell. Various types of VSMs including the subject VG control message are formed into a PLOAM cell in the downstream cell multiplexing unit 24-2.

① the area of forty-first byte (message ID field 112): a message ID common to all of the ONUs 4-i indicating that the message is a VSM. According to the recommendation [G.983], eight kinds of numerals, or $0\times78_H$ to $0\times7f_H$ are prepared as values which can be freely utilized as the message ID by each vendor. Therefore, in the present embodiment, one of them [e.g., $0\times78_H$ ("01111000")] is defined as the message ID indicating that the message is a VG control message.

② the area of forty-second byte (grouping flag field 114): an identifier indicating that the subject message is either the VG control message for group designation or the VG control message for group cancellation [grouping flag (GF): g=1 (designation)/0 (cancellation), see FIG. 5B]. A VG control message for VG designation (GF=1) is hereinafter sometimes referred to as "VG designation message" while a VG control message for VG cancellation (GF=0) is hereinafter sometimes referred to as "VG canceling message" or "awaiting message".

③ the area of forty-third to forty-sixth bytes (vendor ID field 115): a vendor ID of an ONU as a target of group designation and group cancellation.

④ The remaining forty-seventh to fifty-first bytes are not specified (Unspecified) and hence arbitrary information can be written (Don't care).

When the VG control message comes to have the broadcast type PON-ID ($0\times40_H$) settled in the fortieth byte (PON-ID field 113) of the message formed into the PLOAM cell, similarly to the other type of VSMs, this VG control message is broadcasted to all of the ONUs 4-i. When each of the ONUs 4-i determines that the VG control message sent from the OLT 2 is a message addressed to the unit itself (i.e., the vendor ID of its own unit is attached to the vendor ID field 115), the unit controls its own state in accordance with the setting of the grouping flag (GF).

For example, if the VG control message addressed to its own unit is a VG designation message in the mode of GF=1, the unit changes its operation mode into one (receiving allowable state) in which the unit can receive and process a VSM [attached with the broadcast type PON-ID ($0\times40_H$) settled in the PON-ID field 113] which is thereafter broadcasted from the OLT 2. Conversely, if the VG control message addressed to its own unit is an awaiting message in the mode of GF=0, the unit changes its operation mode into the awaiting state (in this case, the unit is allowable to receive the VG control message. Meanwhile, if the received VG control message is not addressed to its own unit (i.e., the ID set in the vendor ID filed 115 is different from the vendor ID of its own unit), the ONU 4-*i* is brought into the mode of awaiting state.

That is, according to the ATM-PON 1 of the present embodiment, the OLT 2 can control some of the plurality of ONUs 4-*i* so as to bring them into the receiving allowable mode simultaneously (group designation), or alternatively, bring them into the mode of awaiting state (group designation cancellation).

In this way, only the ONUs 4-*i* manufactured by a certain vendor that has accept the VG designation message satisfactorily are brought into the receiving allowable mode (i.e., a state in which the units are regarded as a component constituting a group of units) in which the VSM sent from the OLT 2 is received. Thereafter, if the OLT 2 creates and transmits a broadcast type VSM, then as described above, the VSM is automatically delivered to only the ONUs 4-*i* manufactured by a certain vendor regarded as a component constituting a group of units.

If it is desired that a unit is additionally designated as a component constituting a group of units, or alternatively, one of the units (single unit) is released from the group designation, then the VG control message may have an individual PON-ID corresponding to the ONU 4-*i* as a target of addition, or partial cancellation settled in the PON-ID field 113. Then, a digit of "1" maybe entered in the LSB of the GF field 114 (for VG designation) or a digit of "0" is entered in the same (for VG cancellation).

That is, the message generating unit 24-2 of the present embodiment has the following four functions.

① A function as a point-to-multipoint message generating unit 2A for generating a VSM (point-to-multipoint message) to all of the ONUs 4-*i*.

② A function as a group designating message generating unit 2B for generating a group designating message to designate some of the ONUs 4-*i* as a component constituting a group of units which are obliged to receive the VSM.

③ A function as a first vendor group designating message generating unit 2B-1 for generating, as the group designating message, a vendor group designating message having a vendor ID to an ONU 4-*i* to be designated so that ONUs 4-1 manufactured by the same vendor are designated as a component constituting the group of units.

④ A function as a group designation canceling unit 2C for generating a group canceling message for canceling the VG designation on the ONU 4-*i* which has been VG-designated.

When the aforesaid VG control message (VG designating message/awaiting message) is generated or transmitted, this message generation or message transmission may not always effected in response to an input from the outside by a maintenance operator. In the present embodiment, this message generation or message transmission is effected when the station-side unit receives a requesting message [connection requesting message (which will be described later on with reference to FIGS. 8A and 8B) disconnection requesting message (which will be described later on with reference to FIG. 7)] from the ONU 4-*i* (thereby for the VSM identifying unit 24-1 to identify the message).

Figure 64:
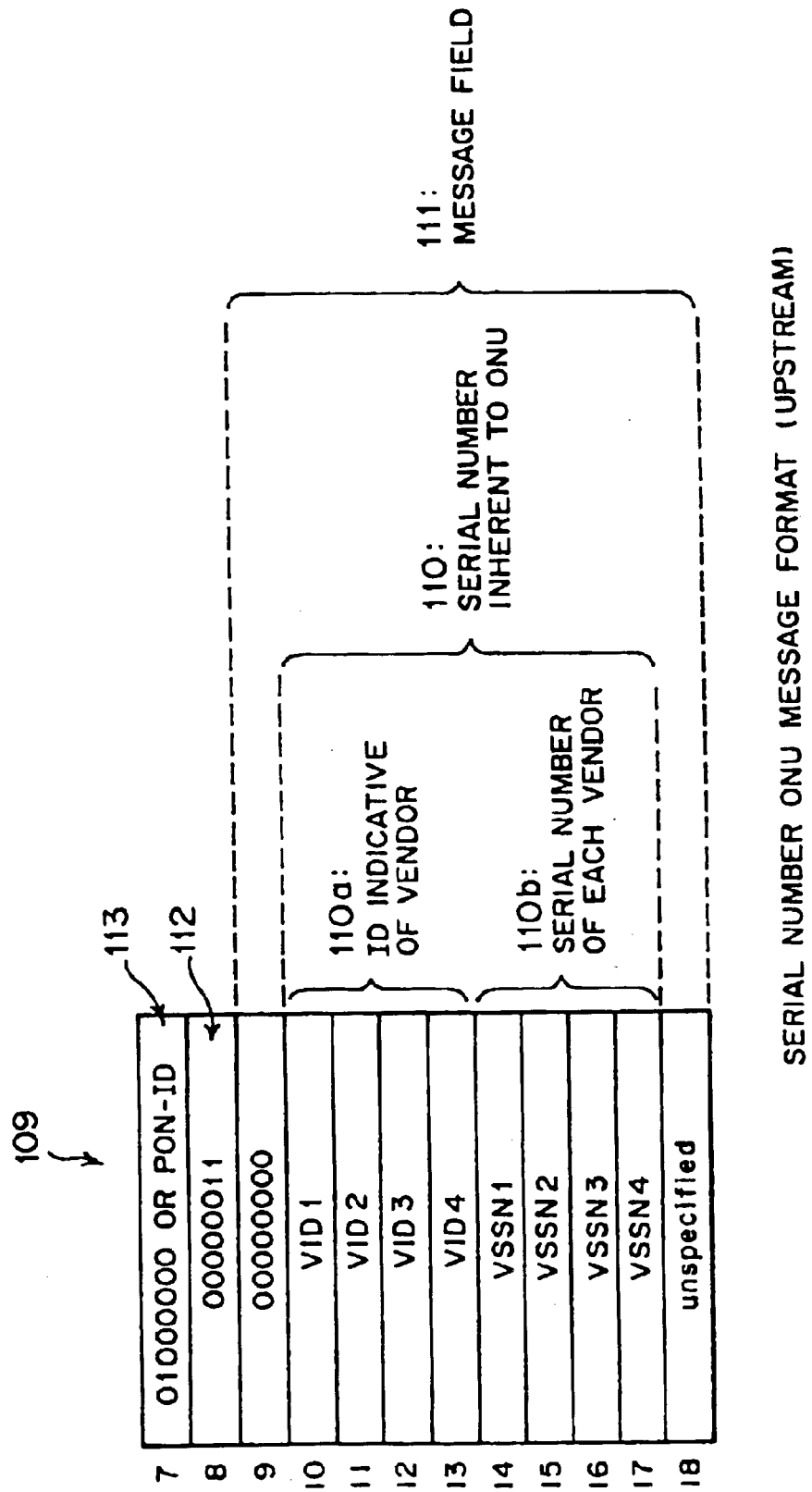
FIG. 64 is a diagram for explaining a format of a serial number ONU message.

In FIG. 2, as described above, the PON-ID-to-serial-number correspondence table 24-3 (hereinafter simply referred to as "correspondence table 24-3") is a unit for holding a serial number notified by a serial number ONU message 109 (see FIG. 64) from the ONU 4-*i* (vendor ID+serial number for each vendor) and an individual PON-ID assigned to each ONU 4-*i* so that the information pieces are paired. In this way, correspondence between each of the individual PON-IDs and the vendor ID is held.

With the above arrangement, the message generating unit 24-2 can search the correspondence table by using the vendor ID attached to the aforesaid VG control message as a key so as to acquire the individual PON-ID of the ONU 4-*i* as a target of VG designation or cancellation. In other words, the message generating unit 24-2 has a function for searching the correspondence table 24-3 for information. At this time, since the message generating function 24-2 searches the correspondence table for an individual PON-ID by using the vendor ID as a key, the correspondence table 24-3 may have only the vendor IDs held therein.

The message generating unit 24-2 carries out information search for finding a write address based on the individual PON- ID acquired by the correspondence table 24-3. Then, the message generating unit writes a state defined by the VG designation message into which the ONU 4-*i* as a target of VG designation is to be changed ("receiving allowable state"=1) as an ONU state expected value, in the corresponding PON-ID address region of the ONU state expected value holding unit 24-8 (in this case this unit is formed of a RAM) at the write address. If information indicative of an initial state or the awaiting state is sent to the subscriber-side unit, "awaiting state" (=0) is written in the corresponding address region as an expected value.

That is, the ONU state expected value holding unit 24-8 holds information (ONU state expected value) indicating which ONU 4-*i* is to change into the VSM receiving allowable state owing to the VG designating message transmission.

The ONU state holding unit (RAM) 24-7 is a unit for holding identifying information (ONU state value) indicating which ONU 4-*i* is actually placed in the VSM receiving allowable state. According to the arrangement of the present embodiment, an ONU 4-*i* placed in the receiving allowable state owing to the VG designation message returns a confirmation message (reply message) to the station-side unit and the station-side unit analyses the individual PON-ID attached to the response VSM [replay message: see FIG. 6] to determine a write address. Then, information of "receiving allowable state" (e.g., represented by 1) is written into the write address. In the initial state, information of "awaiting state" (e.g., represented by 0) is written in all address regions.

The state comparing unit 24-6 is a unit for comparing with each other respective values read from the holding units 24-7 and 24-8 at the same PON ID address regions in accordance with read address (comparing target address: PON-ID address) supplied from the OLT state management unit 24-4 to respective holding units 24-7 and 24-8. Based on the comparison, it is confirmed whether or not the ONU state expected value of each ONU 4-*i* is coincident with actual state of each ONU 4-*i* (receiving allowable mode/awaiting state). In this way, it becomes possible to confirm whether or not the a reply message is satisfactorily received from respective ONUs 4-*i* as a target of VG designation and the operation of the VG designation is satisfactorily achieved.

The holding units 24-7 and 24-8 may be arranged to hold the PON-ID itself as the ONU state value and the ONU state expected value and the state comparing unit 24-6 maybe arranged to confirm the state of the ONU by comparing the PON-IDs with each other. However, as described above, if values are compared with each other by using the PON-ID as an address, necessary memory capacity can be reduced. Moreover, the OLT state managing unit 24-4 can manage addresses with ease.

The result of confirmation (comparison) of each ONU 4-i effected by the state comparing unit 24-4 (i.e., coincident or not) is independently written in a state confirmation result holding unit (RAM) 24a of the OLT state managing unit 24-4 together with the individual PON-ID, for example. The OLT state managing unit 24-4 refers to (examine) the contents held in the state confirmation result holding unit 24a. If it is determined that the states of all ONUs 4-i as a target of VG designation are coincident with respective ONU state expected values (a case that all of the ONUs 4-i are placed in a coincident state at "awaiting state" is excluded), then it is confirmed that the VG designation is accomplished satisfactorily. Thus, information of "transmission allowable state" (e.g., represented by 1) is written in the state holding unit 24a.

In this way, the message generating unit 24-2 can generate an ordinary VSM (other than VG control message). Conversely, if any state of disagreement is brought about, that is, if there is any ONU 4-i as a target of VG designation which sends no reply message satisfactorily in spite of the fact that a predetermined time period (e.g., M seconds) is elapsed till the time of generating and transmitting the VG designation message, then the OLT state managing unit 24-4 supplies to the message generating unit 24-4 a trigger for generating an awaiting message so that the message generating unit generates the awaiting message and sends the same to the ONU 4-i, whereby the ONU 4-i is released from the VG designation. Thereafter, information of the corresponding PON-ID in the respective holding units 24-7 and 24-8 is reset (so as to bring into the awaiting state). Thus states a made coincident with each other and information of "transmission allowable state" is written in the state holding unit 24b.

At this time, the timer unit 24-5 counts the aforesaid predetermined time period. If the timer unit 24-5 has counted the predetermined time period, then the OLT state managing unit 24-4 determines an individual PON-ID of an ONU 4-i which does not send any reply message so far and hence the state comparing unit 24-6 fails to receive the reply message. Subsequently, the determined individual PON-ID is supplied as a read address for use in the respective holding units 24-7 and 24-8 so as to make them compare the states with each other. Thus, it becomes possible to identify the ONU 4-i as a target of VG designation in which state disagreement is brought about (from which the reply message is not received satisfactorily).

The OLT state managing unit 24-4 monitors the state of each ONU 4-i after sending the VG designation message, whereby information delivery (VG designation) becomes more reliable.

However, if all of the ONUs 4-i are placed in the "awaiting state" including the initial state, the OLT state managing unit 24-4 writes information indicative of the "awaiting state" in the state holding unit 24b. At this time, the message generating unit 24-2 is brought into a state in which only the VG control message can be generated. In other words, the OLT state managing unit 24-4 controls its own state to be a state allowable to generate and transmit an ordinary VSM as far as there is an ONU 4-i of which state is changed into the "receiving allowable state" normally. If other states are brought about, the OLT state managing unit 24-4 controls its own state to be a state in which only the VG control message can be generated.

When the CPU operates in accordance with flowcharts (algorism) which will be described with reference to FIGS. 9 to 12, the aforesaid VSM terminating unit 24-1, the message generating unit 24-2, the OLT state managing unit 24-4, the timer unit 24-5 and the state comparing unit 24-6 exert respective functions.

The arrangement of the ONU 4-i will be hereinafter described. As for example shown in FIG. 3, the ONU 4-i of the present embodiment includes a cell identifying unit 41, a message identifying unit 42, a message terminating unit 43, a VSM processing unit 44 and an upstream message processing unit 45.

The cell identifying unit 41 is a unit for identifying the type of cell (downstream signal) transmitted from the OLT 2. In this arrangement, if the received cell is a PLOAM cell, the cell identifying unit 41 transfers the cell to the message identifying unit 42, and if the received cell is one other than a PLOAM cell, the cell identifying unit transfers the cell to a cell processing component (not shown) corresponding to the type of the cell.

The message identifying unit 42 is a unit which refers to the PON-ID field 113 and the message ID field 112 of the PLOAM cell transferred from the cell identifying unit 41 so as to determine whether the message mapped on the PLOAM cell is a VSM having a destination of the unit itself (in more concretely, the PON-ID field 113 has an individual PON-ID of its own unit or a PON-ID of a broadcast type attached thereto, and hence the determination is made by examining whether the upper five bits of the message ID field 112 is a series of digits "01111" or not). If it is determined that the message is a VSM of a destination of the unit itself, the VSM is transferred to the VSM processing unit 44, and if the message is one having a destination other than that of the unit itself, the message is discarded. Thus, the VSM message having a destination other than that of the unit itself is transferred to the message terminating unit 43.

The message terminating unit 43 is a unit for terminating the VSM message having a destination other than that of the unit itself and recognizing the contents of the message. If the message terminating unit recognizes that it is necessary to send any message to the OLT 2, the message terminating unit transfers the contents of the message to the upstream message processing unit 45 so that the upstream message processing unit generates and transmits a necessary message (PLOAM cell) [e.g. the aforesaid serial number ONU message 109 or the like (see FIG. 64)].

The VSM processing unit 44 is a unit for carrying out a terminating processing of the VSM sent from the OLT 2 to the unit itself and generating processing of the VSM to be sent to the OLT 2. In the present embodiment, this unit mainly has the following functions.

① A state control function for bringing the state of the own unit (ONU 4-i) in the "receiving allowable state" or "awaiting state" if the terminated VSM is a VG designating message or an awaiting message addressed to its own unit.

② A function for generating the aforesaid replay message when the unit itself is brought into the "receiving allowable state".

③ A function for generating a connection requesting message (hereinafter sometimes simply referred to as a "connection request") which makes the unit itself be designated as a target ONU 4-i of the VG designation by the OLT 2, or alternatively for generating a disconnection requesting message (hereinafter sometimes simply referred to as "disconnection request" or "disconnectiong request" which makes the unit itself be released from the VG designation by the same.

The upstream message processing unit 45 is a unit which is supplied with various kinds of messages (reply message, connection requesting message, disconnection requesting message, and so on) for the OLT 2 created by the VSM processing unit 44 or the message terminating unit 43, and generates an upstream PLOAM cell having message contents mapped for the OLT 2. The PLOAM cell generated by the upstream message processing unit 45 is transmitted to the OLT 2 through an upstream transmitting unit (not shown).

Figure 3:
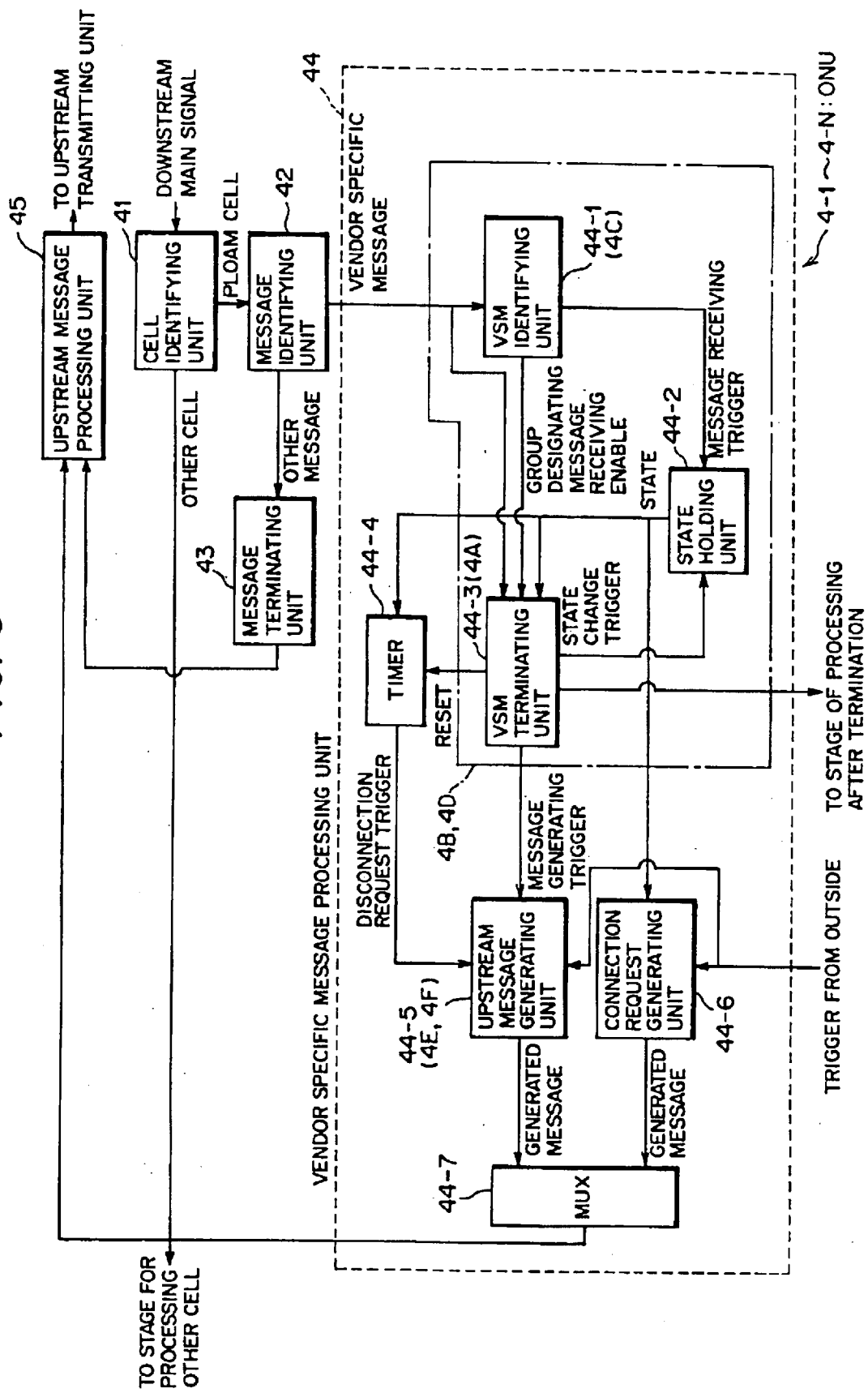
FIG. 3 is a block diagram showing an arrangement of an ONU (subscriber-side unit) for use in the ATM-PON shown in FIG. 1.

As shown in FIG. 3 in order to provide the above-described functions, the VSM processing unit 44 as a main portion of the present embodiment is arranged to include a VSM identifying unit 44-1, a state holding unit 44-2, a VSM terminating unit 44-3, a timer unit 44-4, an upstream message generating unit 44-5, a connection requesting message generating unit 44-6, and a message multiplexing unit (MUX) 4-7.

The message ID identifying unit 44-1 is a unit which refers to the lower three bits of the message ID field 112 of the VSM transferred from the message identifying unit 42, the GF field 114 and the vendor ID field 115 so as to identify whether the VSM is a VG control message addressed to the unit itself (VG designation message/awaiting message) or a VSM other than the VG control message.

In more concretely, if the received VSM has a set of digits "000" in its message ID field 112 at the lower three bits thereof [i.e., message ID="01111000" ($0 \times 78_H$)] and the vendor ID stored in the vendor ID field 112 is coincident with that of its own unit, then the received VSM is identified-as a VG control message addressed to the unit itself. Further, if the GF field 114 has a digit of "1" at its LSB, it is determined that the VG control message is a VG designation message. Conversely, if a digit of "0" is set to the same place, it is determined that the VG control message is an awaiting message.

That is, the VSM identifying unit 44-1 functions as a first vendor identification information comparing determining unit 4C which compares the vendor ID attached to the vendor ID field 115 of the VSM (VG designation message) sent from the OLT2 with the vendor ID assigned to its own unit (ONU 4-i) so as to determine whether or not the two pieces of vendor identification information are coincident with each other.

The state holding unit 44-2 is a unit for holding information about the state of the unit itself (ONU 4-i) (i.e., "receiving allowable state"/"awaiting state"). The VSM terminating unit (44-3) is a unit for terminating the VSM transferred from the message identifying unit 42, identifying the message contents thereof and carries out processing corresponding to the recognizing result. In this case, if information indicative of "receiving allowable state" is stored in the state holding unit 44-2, the unit terminates not only the VG control message but also a message other than the control message. If information indicative of "awaiting state" is stored in the same, only the VG control message is terminated.

The message terminating unit 44-3 also carries out setting (writing) of the information of "receiving allowable state"/ "awaiting state" into the state holding unit 44-2. In more concretely, as described above, if the message ID identifying unit 44-1 identifies that the received VSM is a VG designation message addressed to the unit itself, then the information of "receiving allowable state" is written in the state holding unit 44-2. Conversely, if the received message is identified as an awaiting message, "awaiting state" is written in the state holding unit.

In this way, as described above, if the ONU 4-i receives the VG designation message, then the unit is brought into a state in which a VSM other than the VG control message can be terminated (received and processed). If the ONU 4-i receives the awaiting message, then the unit is brought into a state in which only the VG control message can be terminated. If the ONU 4-i receives neither the VG designation message nor the awaiting message, the unit is placed in the "awaiting state".

That is, the VSM terminating unit 44-3 can function as a point-to-multipoint message processing unit 4A for receiving and processing the VSM sent from the OLT2. Also, the VSM terminating unit 44-3 can function as a state control unit 4B (canceling control unit 4D) together with the VSM identifying unit 44-1 and the state holding unit 44-2 in which when a VG designation message for making the unit itself be designated as a component constituting the VG is received from the OLT 2, then the reception and the processing on the VSM are brought to an invalid status while when an awaiting message is received, then the reception and the processing on the VSM are brought to an invalid status.

When the subject VSM terminating unit 44-3 terminates the VG designation message and writes information indicative of "receiving allowable state", then the VSM terminating unit 44-3 sends a generating trigger of the aforesaid reply message to the upstream message generating unit 44-5 so that the OLT 2 is notified of the information writing.

Furthermore, the timer unit 44-4 is a unit for counting a predetermined period of time (e.g., t seconds) till information indicative of "receiving allowable state" is written in the state holding unit 44-2. If the VSM terminating unit 44-3 does not carry out the terminating processing on the VSM, i.e., no VSM message is received from the OLT 2, by the timing point when the timer unit 44-4 has counted the predetermined period of time, then the timer unit sends a generating trigger of a disconnection request to the upstream message generating unit 44-5 so that a release is requested from the OLT 2 (to request sending an awaiting message addressed to the own unit).

The upstream message generating unit 44-5 is a unit for generating an upstream VSM for the OLT 2. When the upstream message generating unit 44-5 receives the generating trigger of the aforesaid reply message from the VSM terminating unit 44-3, the upstream message generating unit 44-5 generates a reply message based on a format shown in FIG. 6. When the upstream message generating unit 44-5 receives a generating trigger of the aforesaid disconnection request from the timer unit 44-4, the upstream message generating unit 44-5 generates a disconnection requesting message based on a format shown in FIG. 7.

As shown in FIG. 6, the reply message is created so as to have the following information included.

① Individual PON-ID of the information piece itself as information to be mapped on the seventh byte (PON-ID field 113) when the information piece itself is formed into a PLOAM cell.

② A message ID (e.g., $0 \times 78_H$) common to respective vendors indicating that the information piece itself is a VSM as information to be mapped on the eighth byte (message ID field 112).

③ A sub message ID (e.g., "00000001") indicating that the information piece itself is a reply message (Vendor Acknowledge) as information to be mapped on the ninth byte (sub message ID field 116).

④ Information (including the vendor ID) corresponding to forty-second to fiftieth byte (byte) (see FIG. 4A) of the VG designation message received as information to be mapped on the tenth to eighteenth byte (data field 117).

As described above, information corresponding to forty-second to fiftieth byte of the received VG designation message is given to the data field 117 of the reply message. This is because the OLT 2 is made capable of confirming that the reply message is a VG designation message transmitted from the OLT 2 and the operation of VG designation becomes more reliable.

On the other hand, the disconnection requesting message shown in FIG. 7 is created so as to have the following information included.

① Individual PON-ID of the information piece itself as information to be mapped on the seventh byte (PON-ID field 113) when the information piece itself is formed into a PLOAM cell.

② A message ID (e.g., $0 \times 78_H$) common to respective vendors indicating that the information piece itself is a VSM as information to be mapped on the eighth byte (message ID field 112).

③ A sub message ID (e.g., "00000010") indicating that the information piece itself is a disconnection requesting message (DISCONNECT) as information to be mapped on the ninth byte (sub message ID field 116).

④ The remaining area of tenth to eighteenth is not defined (Unspecified) and hence arbitrarily utilized (Don't care).

The disconnection cut requesting message may be generated in response to a trigger applied from the outside (such as a maintenance engineer).

That is, the upstream message generating unit 44-5 functions as a reply message returning unit 4E in which when the VSM terminating unit 44-3 controls to bring the reception and processing on the VSM into a valid status and writes information of "receiving allowable state" in the state holding unit 44-2 in response to the control, then the upstream message generating unit 44-5 sends a reply message to the OLT 2. The upstream message generating unit 44-5 also functions as a group designation cancellation requesting unit 4F which requests a network cut (VG designation cancellation) on the unit itself (ONU 4-i) from the OLT 2.

The connection request message generating unit (group designation requesting unit) 44-6 is a unit for generating a connection request message based on a format shown in FIG. 8A so as to request a VG designation on the unit itself (ONU 4-i) (to send a VG designation message to the unit itself) from the OLT 2, in response to the trigger applied from the outside (maintenance engineer or the like). The connection request message generating unit 44-6 generates a message containing the following information.

① Individual PON-ID of the information piece itself as information to be mapped on the seventh byte (PON-ID field 113) when the information piece itself is formed into a PLOAM cell.

② A message ID (e.g., $0 \times 78_H$) common to respective vendors indicating that the information piece itself is a VSM as information to be mapped on the eighth byte (message ID field 112).

③ A sub message ID (e.g., "00000011") indicating that the information piece itself is a connection requesting message (Request) as information to be mapped on the ninth byte (sub message ID field 116).

④ A connection target flag (e.g., 0000000p) indicating whether the VG designation targets (connection targets) are all ONUs 4-i manufactured by the same vendor or individually selected ONUs 4-i to which the subject message has been sent, as information to be mapped on the tenth byte (connection target information field 118).

⑤ The remaining area of eleventh to eighteenth is not defined (Unspecified) and hence arbitrarily utilized (Don't care).

In this case, as shown in FIG. 8B, if the connection targets are all ONUs 4-i manufactured by the same vendor, a flag of p=1 is set while if the connection targets are individually selected ONUs 4-i, the flag of p=0 is set, for example. Meanwhile, such kind of flag may be set in the network cut request message described with reference to FIG. 7 so as to divide the ONUs 4-i as targets of network cut depending on the classification of all ONUs 4-i manufactured by the same vendor and ONUs 4-i having requested the network cut.

The message multiplexing unit (MUX) 4-7 is a unit for multiplexing the various kinds of messages generated by the respective message generating units 44-5 and 44-6 and transferring the multiplexed message to the upstream message processing unit 45.

Also in the ONU 4-i, the above-described message identifying unit 42, the VSM identifying unit 44-1, the VSM terminating unit 44-3, the timer unit 44-4, the upstream message generating unit 44-5, the connection request message generating unit 44-6 and so on are implemented by the CPU operated in accordance with the flowchart (algorism) which will be described later on with reference to FIG. 12.

Operations of the ATM-PON 1 of the present embodiment arranged as described above will be hereinafter described in detail with reference to flowcharts shown in FIGS. 9 to 12 and timing charts shown in FIGS. 13 to 16.

(1) Description of Fundamental Operation

Initially, description will be made on a case in which two sets of ONUs 4-1 and 4-2 manufactured by Company A are designated from all of ONUs 4-i shown in FIG. 1 as a component of VG. In the case of OLT 2, an instruction is inputted (trigger is generated) from the outside to the message generating unit 24-2 so as to request generation of a VG designation message having contents (i.e., attached with a vendor ID of Company A) which makes the ONUs 4-1 and 4-2 be allowed to receive the message.

Figure 9:
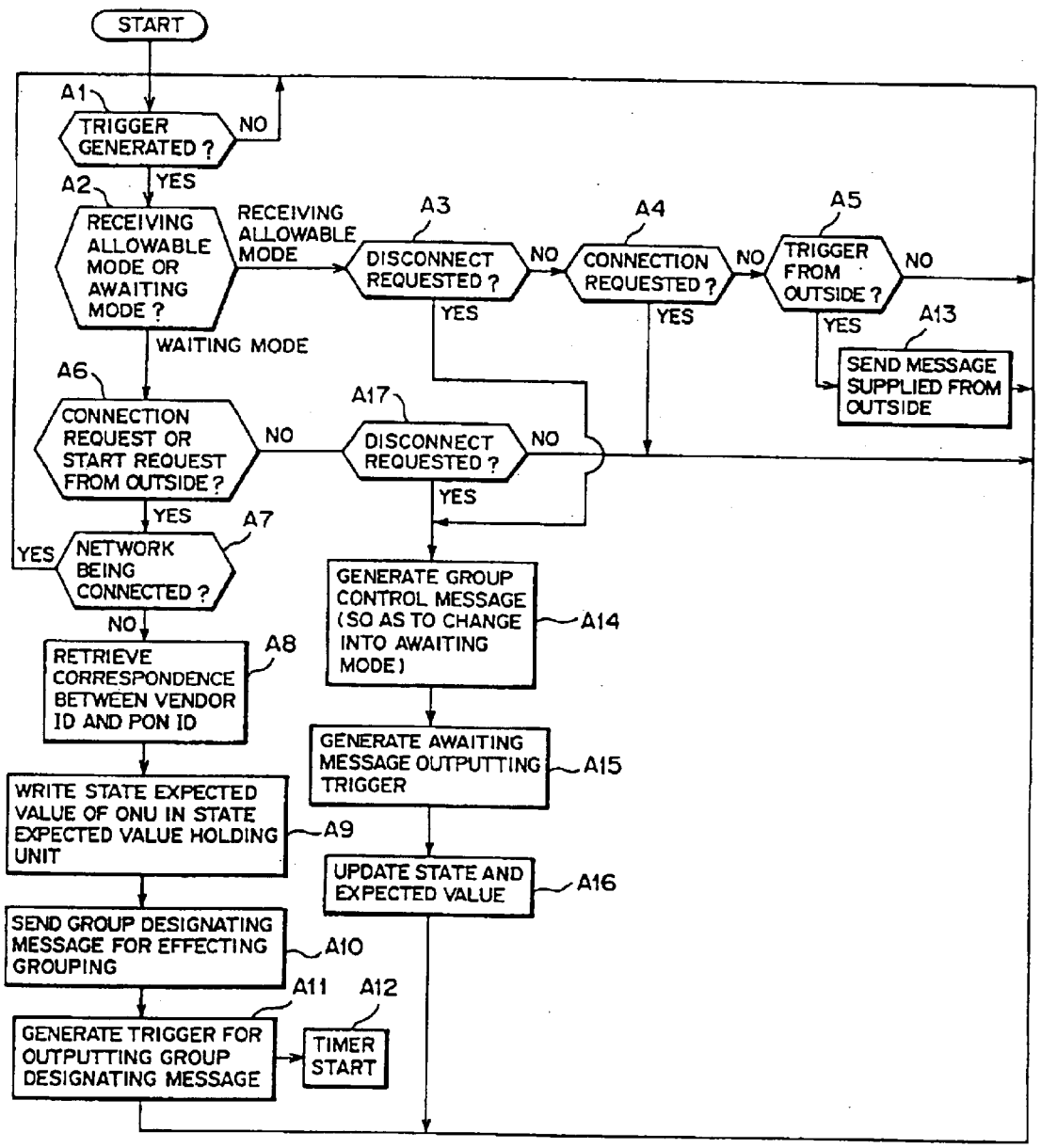
FIG. 9 is a flowchart for explaining an operation of a transmission system of the OLT shown in FIGS. 1 and 2.

At this time, as shown in FIG. 9, the message generating unit 24-2 monitors the generation of a trigger (NO route of step A1). When a trigger is generated in the above manner (i.e., YES route is determined at step A1), the message generating unit 24-2 refers to the contents held in the state holding unit 24b of the OLT state managing unit 24-4 to confirm whether the state of the own unit (OLT 2) is "transmission allowable state" or "awaiting state" (step A2).

If the above processing begins with the initial state, the OLT 2 should be placed in the "awaiting state". Thus, it is confirmed whether the generated trigger comes from the connection request issued from the ONU 4-i or a starting request for VG designation made by an input from the outside ("awaiting" route at step A2 to step A6). In the case discussed above, the generated trigger is made by an input from the outside. Therefore, it is further confirmed whether the connection to the ONUs 4-1 and 4-2 as a target of VG designation is established (i.e., the VG designation message has been already sent and the timer unit 24-5 has been already started) or not (YES route of step A6 to step A7).

As described above, the connection to the ONUs 4-1 and 4-2 is not established in the initial state (and hence the branch of NO is selected at step A7), the processing proceeds to the next step in which the message generating unit 24-2 searches the correspondence table 24-3 (step A8) so as to acquire individual PON-IDs of the ONUs 4-1 and 4-2 corresponding to the vendor ID of the VG designation target (Company A). Then, the ONU state expected value ["1" ("receiving allowable state")] is written in an address region of the ONU state expected value holding unit 24-8 which is designated by the individual PON-ID (step A9; see reference numeral 8 in FIG. 13).

At this time, the message generating unit 24-2 generates a VG designation message for designating the ONUs 4-1 and 4-2 as a component constituting the group of units (VG designation) based on the aforesaid format described with reference to FIGS. 5A and 5B. That is, a VSM for VG designation is created so that a broadcast type PON-ID ($0 \times 40_H$) is written in the PON-ID field 113, a message ID ($0 \times 78_H$) indicating that this message is a VSM message is written in the message ID field 112, a digit of "1" is written in the LSB (GF) in the GF field 114 and that the vendor ID of Company A is written in the vendor ID field 115, respectively. Then, the message arranged as described above is sent to the downstream cell multiplexing unit 25 (Step A10).

Figure 13:
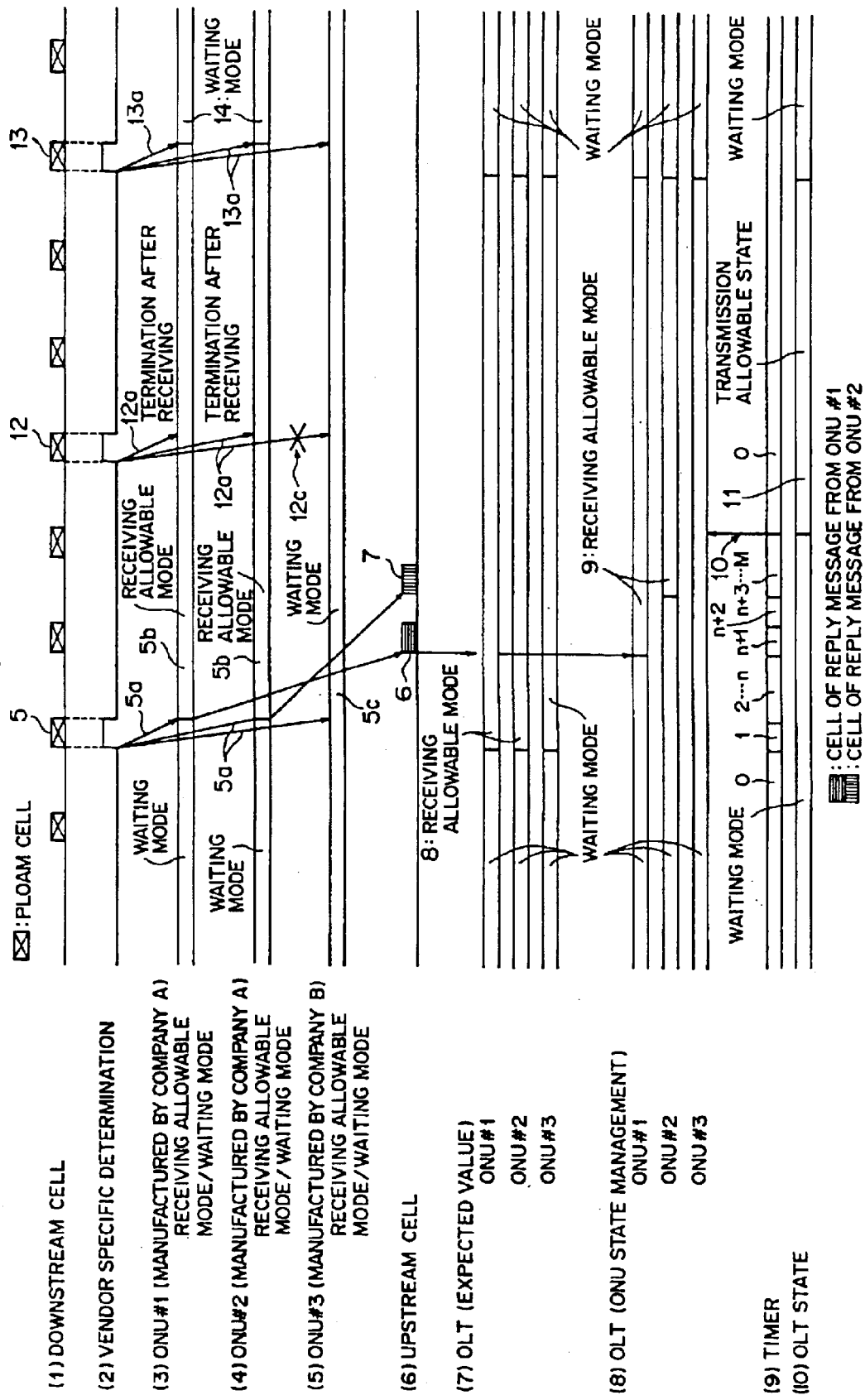
FIG. 13 is a timing chart for explaining a fundamental operation (VG designation) of the ATM-PON shown in FIG. 1.

In this way, the VG designation message for designating the ONUs 4-1 and 4-2 as a component of the group (VG designation) is sent from the downstream cell multiplexing unit 25 to the downstream as a downstream PLOAM cell (see reference numeral 5 in FIG. 13), and delivered to all ONUs 4-i (see reference numeral 5a in FIG. 13). At this time, the message generating unit 24-2 responds to the generation and sending of the VG designation message as a trigger (step A11) and makes the timer unit 24-5 start counting (step A12). However, the timing when the timer unit 24-5 starts counting may not always the timing shown in FIG. 9, but the timer unit 24-5 may start counting at any arbitrary timing after the above step A7 so long as the timer unit 24-5 counts a time period which takes the processing delay of generation and sending of the VG designation message into consideration.

On the other hand, each of the ONUs 4-i monitors the received cell to determine whether the received cell is a PLOAM cell or not, by observing the header thereof (see FIG. 4). If it is determined that the received cell is a PLOAM cell, then as shown in FIG. 12, the message identifying unit 42 confirms whether the VSM is mapped on the PLOAM cell (message ID=$0 \times 78_H$) (step D1).

If it is determined that the VSM is mapped as a result of confirmation (it is determined that YES is selected at step D1), then the VSM identifying unit 44-1 in the VSM processing unit 44 confirms whether or not the VSM is a VG control message for VG designation (GF=1) for the unit itself having a vendor ID of the unit itself (ONU 4-i) attached thereto (step D2 to D4). At this time, if the timer unit 44-4 has already started, the VSM identifying unit 44-1 cancels the counting operation and resets the timer to its original state (step D18).

As described above, the VG designation message sent with the downstream PLOAM has the vendor ID of Company A and identification of GF=1 attached thereto. Therefore, the VG designation message is accepted by the VSM terminating unit 44-3 of the respective ONUs 4-1 and 4-2 manufactured by Company A (terminated: respective YES routes at steps D2 to D4). The VSM terminating unit 44-3 applies a trigger for generating a reply message to the upstream message generating unit 44-5 (step D5). Also, the VSM terminating unit 44-3 writes information of "receiving allowable state" in the state holding unit 44-2 (step D6; see reference numeral 5b in FIG. 13), and makes the timer unit 44-4 start time counting (step D19).

In this way, as described with reference to FIG. 6, the upstream message generating unit 44-5 of each of the ONUs 4-1 and 4-2 generates a reply message addressed to the OLT 2 so as to notify the OLT 2 that the status of the unit itself (ONUs 4-1 and 4-2) is brought to the "receiving allowable state" (step D7). Each of the reply messages is formed into a PLOAM cell by the upstream message processing unit 45 and transmitted to the OLT 2 (see reference numerals 6 and 7 in FIG. 13).

On the other hand, in the ONUs 4-i other than the ONUs 4-1 and 4-2, the VSM identifying unit 44-1 determines that the vendor ID attached to the received VG designation message is not coincident with the vendor ID assigned to the unit itself (the branch of NO is selected at step D3). Thus, the VSM terminating unit 44-3 discards the message and writes information indicative of "awaiting state" in the state holding unit 44-2 ("awaiting state" is maintained: see step D8 and reference numeral 5c in FIG. 13).

Thus, the ONUs 4-1 and 4-2 are designated as a component constituting the group (VG designation), and only the ONUs 4-1 and 4-2 are allowed to receive the VSM of a type other than the VG control message from the OLT 2 (and terminate the message).

If the received VSM is not a VG control message (NO route is selected at step D2), the VSM terminating unit 44-3 confirms which information of "receiving allowable state" and "awaiting state" is held in the state holding unit 44-2 (step D9). If information of "receiving allowable state" is held, the received VSM is terminated and the processing proceeds to a step after the terminating processing (processing proceeds from "receiving allowable" route of step D9 to step D10). If information of "awaiting state" is held, the received VSM is discarded (processing proceeds from "awaiting state" route of step D9 to step D11).

Figure 10:
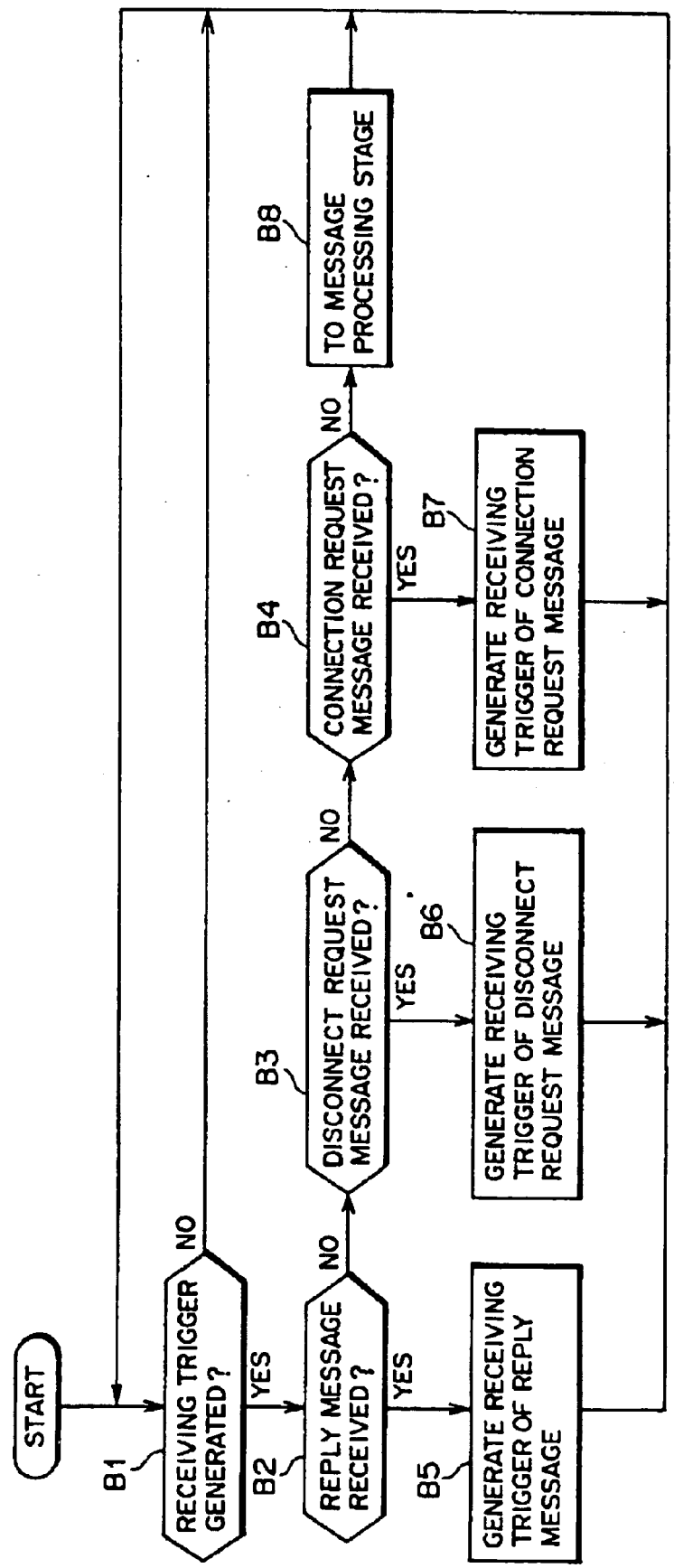
FIG. 10 is a flowchart for explaining an operation of a receiving system of the OLT shown in FIGS. 1 and 2.

In the OLT 2, as shown in FIG. 10, the VSM terminating unit 24-1 monitors whether the receiving trigger of the VSM is generated (VSM is received) or not (NO route of step B1). If a VSM is received (YES route is selected at step B1), then the VSM terminating unit 24-1 refers to the message ID field of the VSM to confirm which of message of a reply message, a network cut request message or a connection request message the message is (steps B2 to B4).

If it is determined that the received VSM is a reply message as a result of confirmation (YES route is selected at step B2), then the VSM terminating unit 24-1 generates a receiving trigger of the reply message to the OLT state managing unit 24-4 (step B5). If it is determined that the received message is a disconnection request message (NO route is selected at step B2 and YES route is selected at step B3), then a receiving trigger of the disconnection request message is generated (step B6). And if it is determined that the received message is a connection request message (NO route is selected at steps B2 and B3 and YES route is selected at step B4), then a receiving trigger of the connection request message is generated (step B7). If the received VSM is any message other than the above-described three kinds of messages, the VSM terminating unit 24-1 sends the contents of the message to the aforesaid other message processing unit (not shown) (from NO route of steps B2 to B4 to step B8).

If the reply message transmitted from each of the ONUs 4-1 and 4-2 is satisfactorily received, then YES route is selected at the aforesaid step B2. Therefore, the VSM terminating unit 24-1 generates the receiving triggers of the reply messages to the OLT state managing unit 24-4 so that the receiving trigger number corresponds to the received reply message number.

Figure 11:
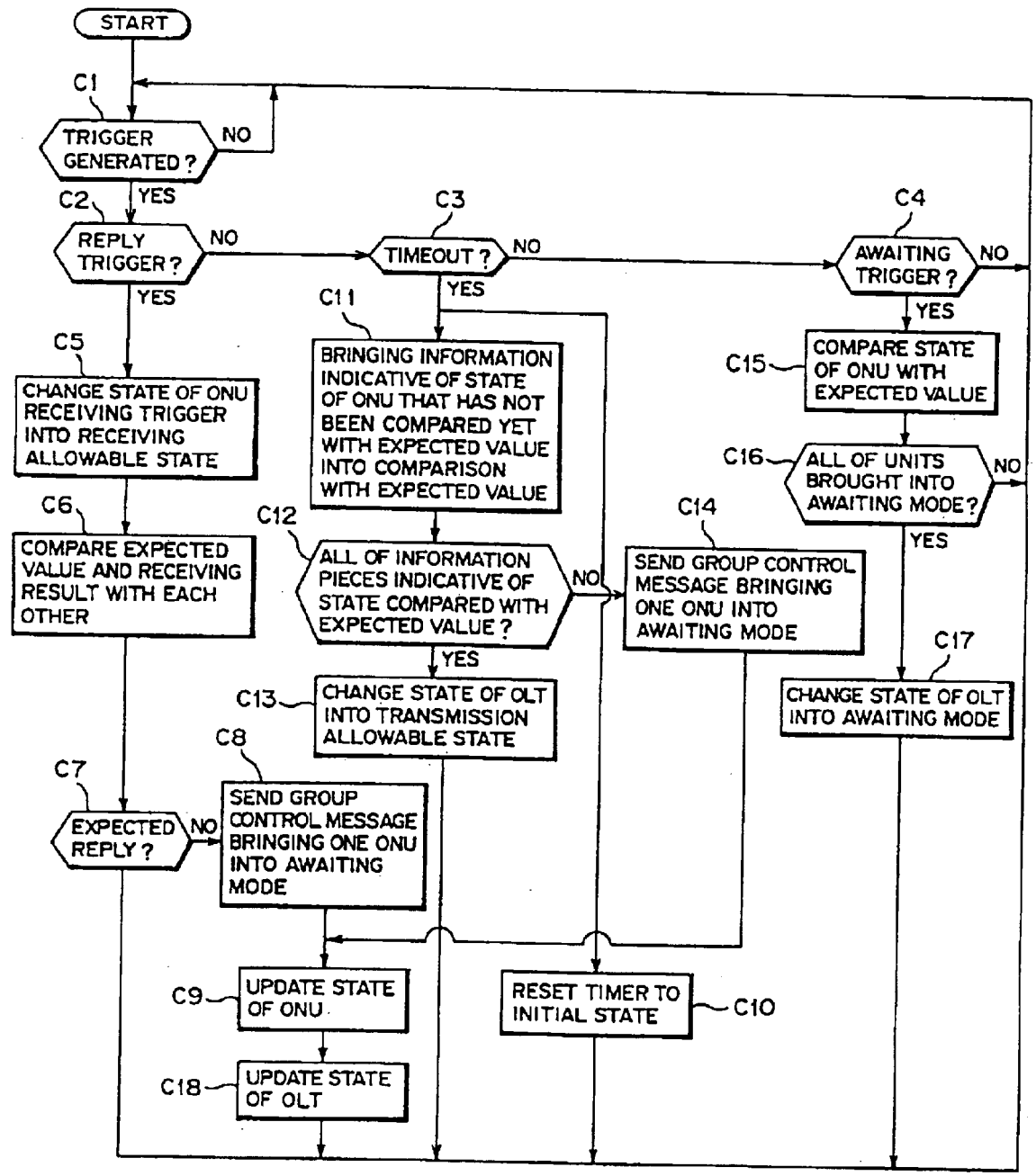
FIG. 11 is a flowchart for explaining an operation of an OLT state managing unit of the OLT shown in FIGS. 1 and 2.

As shown in FIG. 11, the OLT state managing unit 24-4 monitors whether or not any trigger is received from the VSM terminating unit 24-1 or the timer unit 24-5 (NO route at step C1). As described above, if the state managing unit receives the receiving trigger of the reply message from the VSM terminating unit 24-1 (YES route of steps C1 and C2), the state managing unit writes information of "receiving allowable state" in an address region of the ONU state holding unit 24-7 designated by an individual PON-ID which is attached to the received reply message (update: step C5, see reference numeral 9 in FIG. 13).

In this way, information of "receiving allowable state" is written in each address region of the ONU state holding unit 24-7 indicated by the individual PON-ID of the ONUs 4-1 and 4-2. Then, the OLT state managing unit 24-4 supplies the individual PON-ID to each of the holding units 24-7 and 24-8 as a read address, whereby the state comparing unit 24-6 compares the ONU state expected value and the ONU state value with each other at every individual PON-ID (step C6).

In this case, the reply message has been successfully received from the ONUs 4-1 and 4-2 (i.e., both of the states indicated by reference numerals 8 and 9 in FIG. 13 are "receiving allowable state" and hence they are coincident with each other). Therefore, the OLT state managing unit 24-4 writes information indicative of "coincidence" as the result of comparison in the state confirming result holding unit 24a. Then, processing proceeds to the next trigger generation monitoring mode (YES route of step C7 to step C1).

Thereafter, if the timer unit 24-5, which has started counting at step A12 in FIG. 9, completes the time counting (M seconds has elapsed) (i.e., YES route is selected at step C3), then a time-out trigger is generated. Then, the OLT state managing unit 24-4 resets the timer unit 24-5 to its initial state (step C10). Thereafter, the state managing unit supplies an individual PON-ID of a unit (other than the ONUs 4-1 and 4-2) on which the state comparison is not effected, to each holding unit 24-7, 24-8 as a read address so that the state comparing unit 24-6 caries out state comparing operation on each unit (step C11; see reference numeral 10 in FIG. 13).

In this case, no reply message is transmitted from each ONU 4-i other than the ONUs 4-1 and 4-2. Therefore, the state comparing operation on each ONU 4-i leads to "coincidence" at "awaiting state" without exception, with the result that all information of state confirmation results held in the state holding unit 24b becomes "coincidence" (YES route is selected at step C12).

In this way, the OLT state managing unit 24-4 writes information indicative of "transmission allowable state" in the state holding unit 24b so that the state of its own unit (OLT 2) into "transmission allowable state" (step C13; see reference numeral 11 in FIG. 13). Thereafter, the OLT 2 (message generating unit 24-2) is brought into a mode in which a VSM other than a VG control message can be generated or transmitted.

If there is any information indicative of "disagreement" as the state confirmation result held in the state confirmation result holding unit 24a, the message generating unit 24-2 is forced to generate an awaiting message attached with the individual PON-ID of the corresponding ONU 4-i, thereby to bring the ONU 4-i into the mode of "awaiting" (from NO route of step C12 to step C14). Further, in each holding unit 24-7 and 24-8, information indicative of ONU state value and ONU state expected value stored at the address region designated by the individual PON-ID are replaced with information indicative of "awaiting state".

Now, description will be made on a case in which after the ONUs 4-1 and 4-2 are placed in the "receiving allowable mode" as described above, a desired software data piece useful for the ONUs 4-1 and 4-2 manufactured by Company A is created and transmitted by the message generating unit 24-2 in response to an instruction inputted from the outside, for example. In this case, in the OLT 2, it is determined that YES route is selected at step A5 in FIG. 9. Thus, the message generating unit 24-2 maps the software data supplied form the outside on a VSM message, attaches a PON-ID ($0 \times 40_H$) indicative of the broadcast type, and transmits the resulting message (step A13).

This VSM is mapped on a PLOAM cell (see reference numeral 12 in FIG. 13) by the downstream cell multiplexing unit 25 and transmitted to the respective ONUs 4-i in a point-to-multipoint communication manner (see reference numeral 12a in FIG. 13). When the VSM is received by the ONUs 4-1 and 4-2 placed in the "receiving allowable state", the route of "receiving allowable" is selected at step D9 described with reference to FIG. 12. Therefore, the message can be accepted satisfactorily (terminated) by the VSM terminating unit 44-3. Conversely, when the message is received by the ONUs 4-1 other than the above couple of units, the route of "awaiting" is selected at step D9. Thus, the message is discarded (see reference numeral 12c in FIG. 13).

As described above, it becomes possible to deliver a piece of software in a manner of download (SWDL) to only the ONUs 4-1 and 4-2 which are made as a component constituting the group. When the software download operation is completed, a network cut request trigger is generated in response to an outside input. Then, YES route is selected at step A3 shown in FIG. 9. Thus, the message generating unit 24-2 generates an awaiting message so that the VG designation is canceled (the ONUs 4-1 and 4-2 are brought into the awaiting state) (step A14).

That is, the message generating unit 24-2 creates a VSM (awaiting message) for VG cancellation in which the PON-ID ($0 \times 40_H$) indicative of the broadcast type is attached at the PON-ID field 113, the message ID ($0 \times 78_H$) indicating that the massage itself is a VSM is attached at the message ID field 112, a digit of "0" is attached at the LSB (GF) of the GF field 114, and the vendor ID of Company A is attached at the vendor ID field 115. Then, the message generating unit sends the created message to the downstream cell multiplexing unit 25.

This awaiting message is formed into a PLOAM cell by the downstream cell multiplexing unit 25, and thereafter transmitted to the ONUs 4-i in a point-to-multipoint communication manner (see reference numerals 13 and 13a in FIG. 13). Similarly to the above-described VG designation message, this awaiting message can be accepted by only the ONUs 4-1 and 4-2 in which the vendor IDs are coincident with each other (i.e., the message is terminated by the VSM terminating unit 44-3, YES route is selected at step D3 and NO route is selected at step D4 shown in FIG. 12). Thus, information indicative of "awaiting state" is written in the state holding unit 44-2, and the subscriber-side unit is placed in the "awaiting state" (see step D12 in FIG. 12 and reference numeral 14 in FIG. 12).

In the ONUs 4-i other than the ONUs 4-1 and 4-2, it is determined that the awaiting message is not addressed to the unit itself (the vendor IDs are not coincident with each other). Thus, the "awaiting state" is maintained (see NO route at step D3 to step D8 shown in FIG. 12).

At this time, as shown in FIG. 9, the OLT 2 generates a trigger (awaiting trigger) indicating that the aforesaid awaiting message is created and outputted (step A15). In response to the awaiting trigger, the OLT state managing unit 24-4 updates the ONU state value and the ONU state expected value of the ONUs 4-1 and 4-2 stored in the respective holding units 24-7 and 24-8 to be "awaiting state" ("0") (step A16).

Thereafter, as shown in FIG. 11, since the awaiting trigger is generated (YES route is selected at step C4), the OLT state managing unit 24-4 forces the state comparing unit 24-6 to compare the ONU state value and ONU state expected value with each other on all of the ONUs 4-$i$ (step C15). Thus, it is confirmed whether all of the units are placed in the "awaiting state" or not (step C16).

If it is confirmed that all of the units are placed in the "awaiting state", the OLT state managing unit 24-4 writes information indicative of "awaiting state" in the state holding unit 24$b$ so that the own unit (OLT 2) is placed in the "awaiting state" (from YES route of step C16 to step C17). However, if there is any ONU 4-$i$ placed in the "receiving allowable state", the OLT 2 maintains the "receiving allowable state" (NO route of step C16).

It is needless to say that the above operations of designation and cancellation can be similarly applied to ONUs 4-$i$ manufactured by a vendor other than Company A (e.g., Company B, Company Z and so on: see FIG. 1).

(2) Description on Case Where OLT 2 Cannot Receive Any Effective Reply Message

Description will be made on a case where after the OLT 2 sent a VG designation message, the OLT 2 cannot receive satisfactorily any effective reply message from the ONU 4-2 of the ONUs 4-1 and 4-2 as a target of VG designation.

That is, when a downstream message (VG designation message) to the ONU 4-2 is transmitted and received thereat, the VG designation message may suffer from a transmission path error or the like to be made invalid in a step of CRC. Alternatively, when an upstream message is sent from the ONU 4-2, the upstream message may suffer from a transmission path error or the like to be made invalid in a step of CRC. In such cases, the OLT 2 will fail to receive an effective reply message (see reference numeral 7' in FIG. 14).

In this case, the ONU state value of the ONU 4-2 held in the ONU state holding unit 24-7 of the OLT 2 is not changed into "receiving allowable state" and hence the held information keeps to be "awaiting state".

Figure 14:
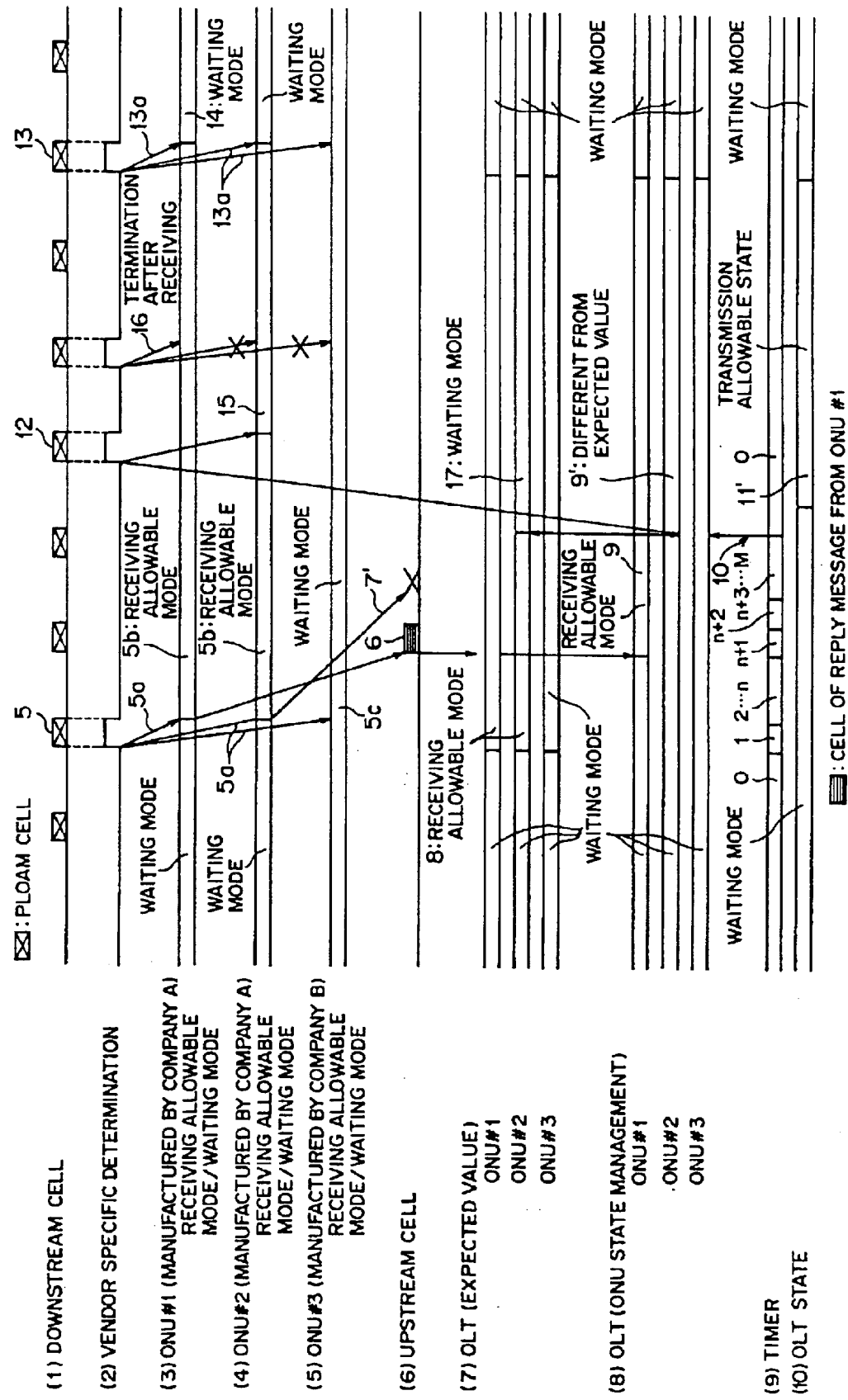
FIG. 14 is a timing chart for explaining an operation (when no reply message is returned from the ONU) of the ATM-PON shown in FIG. 1.

For this reason, if the timer unit 24-5 completes counting of the predetermined time period (YES route of step C3 in FIG. 11; see reference numeral 10 in FIG. 14) and the OLT state managing unit 24-4 forces the state comparing unit 24-6 to compare the pieces of state information with each other on the ONU 4-$i$ which does not undergo the state comparing operation at that time (see step C11 of FIG. 11), it will be determined that the ONU state value and ONU state expected value are different from each other on the ONU 4-2 (NO route is selected at step C12 of FIG. 11) (see reference numeral 9' in FIG. 14).

Accordingly, the OLT state managing unit 24-4 sends to the message generating unit 24-2 an awaiting message generating trigger for bringing the ONU 4-2, which has failed to receive the reply message, into the "awaiting state". The message generating unit 24-2 responds to the awaiting message generating trigger to create and send an awaiting message having an individual PON-ID attached at the PON-ID field 113 (step C14 in FIG. 11), whereby the ONU 4-2 is brought into the "awaiting state" (see reference numeral 15 in FIG. 14) and the ONU state expected value of the ONU 4-2 is changed into "awaiting state" (step C9 of FIG. 11; see reference numeral 17 in FIG. 14).

In this way, the ONU state value and the ONU state expected value become coincident with each other on the all ONUs 4-$i$. Thus, the OLT state managing unit 24-4 writes information of "transmission allowable state" in the state holding unit 24-4 to bring the OLT 2 into the "transmission allowable state" (step C18 of FIG. 11; see reference numeral 11' in FIG. 14).

Thereafter, if the aforesaid software download is effected, for example, the OLT 2 can send a VSM having a desired software mapped thereon to only the ONU 4-1 in which the VG designation is satisfactorily completed (the state of "receiving allowable state" is taken place), and thus the subscriber-side unit can terminate the received message (see reference numeral 16 in FIG. 14). If the software download is completed, the OLT 2 sends the awaiting message for canceling the VG designation (PLOAM cell: see reference numeral 13 in FIG. 14) to the ONU 4-1 (see reference numeral 13$a$ in FIG. 14) so that this unit is placed in the "awaiting state" (see reference numeral 14 in FIG. 14).

(3) Description of Case where Network Cut Request Message is Sent from ONU 4-$i$ Meanwhile, discussion will be made on a case in which the ONUs 4-1 and 4-2 are satisfactorily subjected to the VG designation and the ONUs 4-1 and 4-2 are brought to the mode of "receiving allowable state", and thereafter, these units receive no VSM from the OLT 2 during a predetermined time period (e.g., t seconds) (i.e., the timer unit 44-4 completes the counting of the time period), or alternatively, the disconnection request trigger is applied from the outside. According to the present embodiment, each of the ONUs 4-1 and 4-2 is allowable to send a network cut request to the OLT 2.

Figure 12:
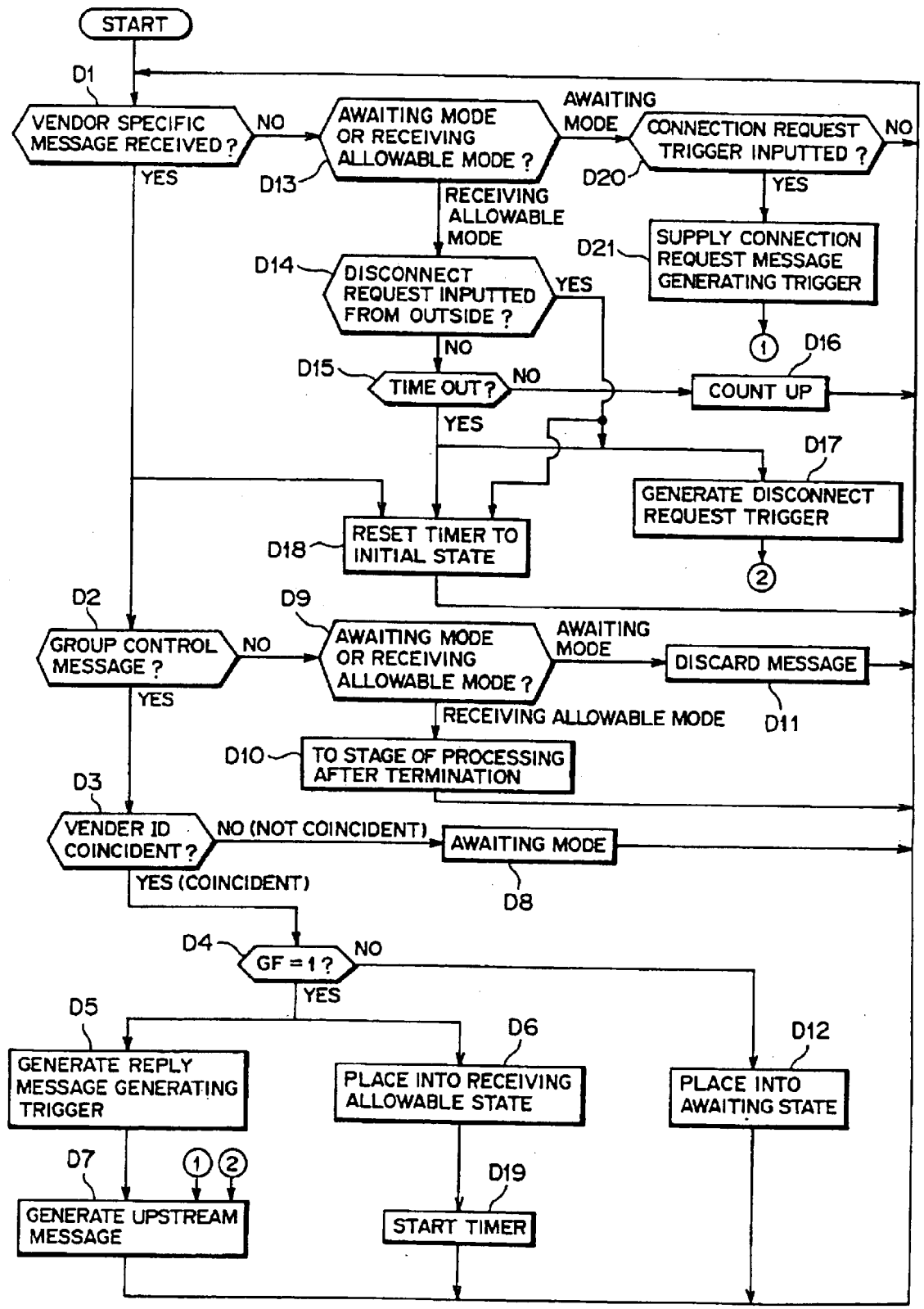
FIG. 12 is a flowchart for explaining an operation of the ONU shown in FIGS. 1 and 3.

That is, as shown in FIG. 12, after being placed in the status of "receiving allowable state", each of the ONUs 4-1 and 4-2 monitors the status to detect that the timer unit 44-4 completes the counting of the predetermined time period without receiving a VSM or that the disconnection request trigger is inputted thereto from the outside during a time period when no VSM is received (NO route at step D1, route of "receiving allowable state" of steps D13, D14 and D15). If these events are not taken place during a time period when no VSM is received (i.e., NO route is selected at steps D14 and D15), then the timer unit 44-4 continues the time counting (step D16).

If, for example, the subscriber-side unit is placed in the status of "receiving allowable state" and no VSM is received during the time period of t seconds and the timer unit 44-4 completes the time counting (YES route is selected at step D15), then the network cut request trigger is generated (step D17; see reference numeral 18 in FIG. 15), and the upstream message generating unit 44-5 generates the network cut request message (see FIG. 7) (step D7). At this time, the timer unit 44-4 is reset (step D18).

In the OLT 2, when each of the network cut requests (PLOAM cell: see reference numeral 19 in FIG. 15) from the ONUs 4-1 and 4-2 is received by the VSM terminating unit 24-1 (terminated), then each disconnection request trigger is given to the message generating unit 24-2 together with the individual PON-ID attached to the disconnection request (YES route at step B3 to step B6 shown in FIG. 10).

Then, as shown in FIG. 9, the message generating unit 24-2 selects YES route at step A3, and generates an awaiting message having an individual PON-ID received from the VSM terminating unit 24-1 attached to the PON-ID field 113 to the ONUs 4-1 and 4-2 (step A14). Then, the message generating unit 24-2 generates an awaiting trigger (step A15), and changes the ONU state value and the ONU state expected value of the ONUs 4-1 and 4-2 into "awaiting state" (step A16; see reference numerals 19a and 19b shown in FIG. 15).

Since the awaiting trigger is generated at the message generating unit 24-2, as shown in FIG. 11, the OLT state managing unit 24-4 selects YES route at step C4 and confirms the status of all ONUs 4-i (step C15 and C16). At this time, there is no ONU 4-i placed in the status of "receiving allowable state" (YES is selected at step C16). Therefore, information of "awaiting state" is written in the state holding unit 24b so that the OLT 2 is brought into the status of "awaiting state" (step C17; see reference numeral 19c shown in FIG. 15).

On the other hand, in the ONUs 4-1 and 4-2, as described above, if the VSM terminating unit 44-3 receives the awaiting message (PLOAM cell: see reference numerals 20a and 20b in FIG. 15) to its own unit created by the message generating unit 24-2 of the OLT 2 (and hence the message is terminated), then information of "awaiting state" is written in the state holding unit 44-2 so that the status of its own unit (ONUs 4-1 and 4-2) is brought to "awaiting state" (YES routes of steps D1 to D3 and from NO route at step D4 to step D12; see reference numeral 20c in FIG. 15).

In the ONU 4-i, if the network cut request trigger does not derive from the time counting completion of the timer 44-4 but from input from the outside (YES is selected at step D14 shown in FIG. 12), the above processing is also executed. In this case, however, the disconnection request for the OLT 2 can be made to contain information for requesting cancellation of all VG designation. In this case, the OLT 2 (message generating unit 24-2) sends an awaiting message not having an individual PON-ID but having a PON-ID of a broadcast type attached thereto. Thus, cancellation of all VG designation can be accomplished.

If the OLT 2 is placed in the "awaiting state" and a network cut request message is received from a certain ONU 4-i, it can be determined that at least the state of the ONU 4-i is an erroneous one. Therefore, the OLT 2 creates and transmits an awaiting message to the ONU 4-i to bring the unit into the "awaiting state" (see "awaiting" route at step A2, NO route at step A6, and from YES route at step A17 to steps A14 to A16).

(4) Description on Case when Connection Request Message is Sent from ONU 4-i

The request of VG designation can be generated from the ONU 4-i. As for example shown in FIG. 12, in the ONU 4-1, if a connection request trigger is inputted from the outside (YES route at step D20; see reference numeral 31 in FIG. 16), this trigger is inputted to the connection request message generating unit 44-6 (see FIG. 3) (step D21), and the connection request message generating unit 44-6 creates a connection request message based on the format described with reference to FIGS. 8A and 8B (step D7)

That is, the connection request message generating unit 44-6 creates a VSM in which the individual PON-ID of the unit itself (ONU 4-1) is attached at the PON-ID field 113, a message ID (e.g., $0x78_H$) common to all vendors indicating that the message is a VSM is attached at the message ID field 112, a sub message ID ("00000011") indicative of a connection request message at the sub message ID field 116, a connection target flag ("00000001") indicating that the VG designation targets (connection targets) are the ONUs 4-1 and 4-2 which are all components manufactured by the same vendor.

When the connection request message (PLOAM cell: see reference numeral 32 in FIG. 16) is accepted by the VSM terminating unit 24-1 of the OLT 2 (terminated), then YES route is selected at step B4 shown in FIG. 10. Thus, the connection request trigger is applied to the message generating unit 24-2 (step B7).

Since the OLT 2 has been placed in the status of "awaiting state" so far, the message generating unit 24-2 selects the "awaiting" route at step A2, YES route at step A6 and NO route at step A7 shown in FIG.9. Then, the message generating unit initially searches the correspondence table 24-3 by using the individual PON-ID attached to the received connection request message as a key for the corresponding vendor ID (vendor ID of Company A) and acquires the same (step A8).

The connection target flag is a series of digits, or "00000001" and which indicates that the targets of VG designation are all ONUs 4-i manufactured by the same vendors. Therefore, the message generating unit 24-2 acquires the individual PON-ID of the ONUs 4-1 and 4-2 manufactured by Company A from the correspondence table 24-3, writes information of "receiving allowable state" in the ONU state expected value holding unit 24-8 as an ONU state expected value of the ONUs 4-1 and 4-2 (step A9), and broadcasts the VG designation message attached with the acquired vendor ID to the subscriber-side units (step A10). In this way, the VG designation message can be delivered with the PLOAM cell (see reference numeral 5a in FIG. 16) to all ONUs 4-i.

Thereafter, the OLT 2 and the ONUs 4-i carry out a processing similar to that described in the aforesaid item (1), whereby the OLT 2 is brought into the mode of "transmission allowable state" (see reference numeral 11 in FIG. 16) and only the ONUs 4-1 and 4-2 manufactured by Company A are brought into the mode of "receiving allowable state" (see reference numeral 5b in FIG. 16). Thus, VG designation is accomplished, with the result that a software can be delivered to the ONUs 4-1 and 4-2 simultaneously.

As described above, according to the ATM-PON 1 of the present embodiment, when the OLT 2 sends the VG designation message (PLOAM cell) to the subscriber-side units, only the ONUs 4-i of all ONUs 4-i which are manufactured by the same vendor are brought into the mode of "receiving allowable state", and other ONUs 4-i are placed in the mode of "awaiting mode", whereby the ONUs 4-i manufactured by the same vendor which are obliged to receive the VSM can be made into a component constituting a group of units. Therefore, the following advantages can be obtained.

(1) It becomes possible for only the ONUs 4-i manufactured by the same vendor as that of the OLT 2 which can satisfactorily terminate (receive and process) the VSM, to receive the VSM. Therefore, ONUs 4-i manufactured by a vendor other than that of OLT 2 can be prevented from terminating the VSM, and hence it becomes possible to prevent reliably an expected erroneous operation from being caused.

(2) If a VG designation message attached with a vendor ID (PLOAM cell) is sent in a broadcast communication manner (PON-ID=$0x40_H$), the ONUs 4-i manufactured by the same vendor can be subjected to the VG designation by a single shot of cell transmission. Therefore, the OLT 2 can be released from a heavy processing load upon carrying out VG designation, and the network traffic can be suppressed to the minimum.

(3) After VG designation is carried out, it becomes possible to deliver a VSM (software data or the like) having the same contents to respective ONUs 4-i constituting the VG by a single shot of VSM transmission. Therefore, it becomes possible to provide information to the ONUs 4-i manufactured by the same vendor without imposing heavy load of processing on the OLY 2 and the ONUs 4-*i* and without increasing the network traffic.

Further, the VG designation can be can be properly canceled in response to a request (disconnection request) sent from the outside or the ONUs 4-*i* to the OLT 2. Therefore, unnecessary VG designation can be properly canceled. Accordingly, great contribution can be expected on improvement in reliability of the VG designation and effective utilization of communication resources [band (logical connection), CPU, memory and so on]. Moreover, the system will be more comfortably managed.

In particular, according to the present invention, after the VG designation is effected, if the station-side unit fails to receive a reply message about the designation from the ONUs 4-*i* subjected to the VG designation for a predetermined period of time (M seconds), then an awaiting message is sent to at least the ONU 4-*i* to bring the unit into the mode of "awaiting state" and cancel the VG designation. Therefore, it becomes possible to remove from the group of VG designation an ONU 4-*i* on which the station-side unit fails to confirm that the VG designation is successfully made. Accordingly, great contribution can be further expected on improvement in reliability of the VG designation and effective utilization of communication resources.

Further, if the station-side unit sends an awaiting message attached with a vendor ID of an ONU 4-*i* as a target of VG cancellation in a broadcast communication manner, the VG cancellation can be effected by a single shot of cell transmission. Therefore, also upon carrying out VG designation, the OLT 2 can be released from a heavy processing load, and the network traffic can be suppressed to the minimum.

Furthermore, The VG designation can be effected also by using the aforesaid connection request message in such a manner that the ONU 4-*i* requests the connection from the OLT 2. Therefore, maintenance operation using the VSM can be started at the initiative of the ONU 4-*i* side, for example, and hence the system will be more comfortably managed.

Further, the above-described VG designation and cancellation can be carried out for a single subscriber-side unit by attaching an individual PON-ID of the ONU 4-*i* to the VG control message. Therefore, a unit can be additionally designated as a component of VG, and a unit can be removed from the unit group. Accordingly, the system will be more comfortably managed.

While in the above example description has been made on a case in which the ONUs 4-*i* manufactured by the same vendor are made into a group or the group designation thereof is canceled, the present invention is not limited thereto. For example, if there is an ONU 4-*i* which is manufactured by a vendor different from that of the OLT 2 but which supports the same VSM processing function as that of an ONU 4-*i* manufactured by the same vendor as that of the OLT 2, the ONU 4-*i* may be designated as a component constituting the same group.

(A1) Description of First Modification of First Embodiment

FIG. 17 is a block diagram showing a first modification of the aforesaid OLT 2. As shown in FIG. 17, an arrangement of the OLT 2 as the first modification is different from the arrangement shown in FIG. 2 in the following point. That is, the message generating unit 24-2 is replaced with a message generating unit 24A-2 in the VSM processing unit 24.

The message generating unit 24A-2 is fundamentally a unit playing the same function (function for generating a VG control message) as that of the aforesaid message generating unit 24-2. In this case, the message generating unit is arranged to generate a VSM for controlling a rearrangement of group (VG rearrangement control message) based on formats shown in FIGS. 18A and 18B, for example, whereby some ONUs 4-*i* of group-formed ONUs 4-*i* manufactured by the same vendor can be further designated as a component constituting a group of units, or alternatively, the group formation thereof is cancelled.

In more concretely, similarly to the aforesaid VG control message (see FIGS. 5A and 5B), the VG rearrangement control message is arranged to include the PON-ID field 113, the message ID field 112 and the GF field 114. Moreover, the rearrangement control message includes a vendor serial number field 119 prepared in an area of from forty-third byte to fiftieth byte from the head portion of the cell when the subject message is formed into a PLOAM cell. The field 119 is utilized for setting therein a vendor serial number (a serial number of ONU 4-*i* specific to each vendor) of a unit as a target of group rearrangement or cancellation thereof. Thus, an ONU 4-*i* having the vendor serial number can be controlled so that this unit is brought into a mode of "receiving allowable state" or "awaiting state".

In the following description, a VG rearrangement control message for rearranging group in which a digit "1" is set at the LSB (g) of the GF field 114 is sometimes referred to as a group rearranging message, and a VG rearrangement control message for canceling the rearranged group in which a digit "0" is set at the same place of the same field is sometimes referred to as a group rearrangement awaiting message or just an awaiting message.

That is, the message generating unit 24A-2 has a function as a second vendor group designation message generating unit 2B-2 for generating a VG designation message for the ONU4-*i* attached with a vendor serial number (unit identifying information) assigned to each ONU 4-*i* by a number of designated ONUs 4-*i* so that some of the ONUs 4-*i* manufactured by the same vendor are designated as a component constituting a group of units.

As described above, when the serial number ONU message 109 is received from the ONU 4-*i*, the aforesaid vendor serial number is held in the correspondence table 24-3.

When the message generating unit 24A-2 creates a VG designation rearranging message,the message generating unit searches the correspondence table 24-3 by using the vendor serial number attached to the VG designation rearranging message and acquires an individual PON-ID of the ONU 4-*i* as a target of VG designation rearrangement. Then, the message generating unit 24A-2 writes information of "receiving allowable state" as an ONU state expected value in an address region of the ONU state expected value holding unit 24-8 designated by the individual PON-ID, and also writes information of "awaiting state" in the ONU state holding unit 24-7 at an address region designated by the same individual PON-ID.

As described above, when the VG designation rearranging message is created, the information of "awaiting state" is written in the ONU state holding unit 24-7. This is because an ONU 4-*i* that should be made to have an ONU state value of "receiving allowable state" is a unit from which a reply message regarding the VG designation rearranging message has been successfully received.

Figure 19:
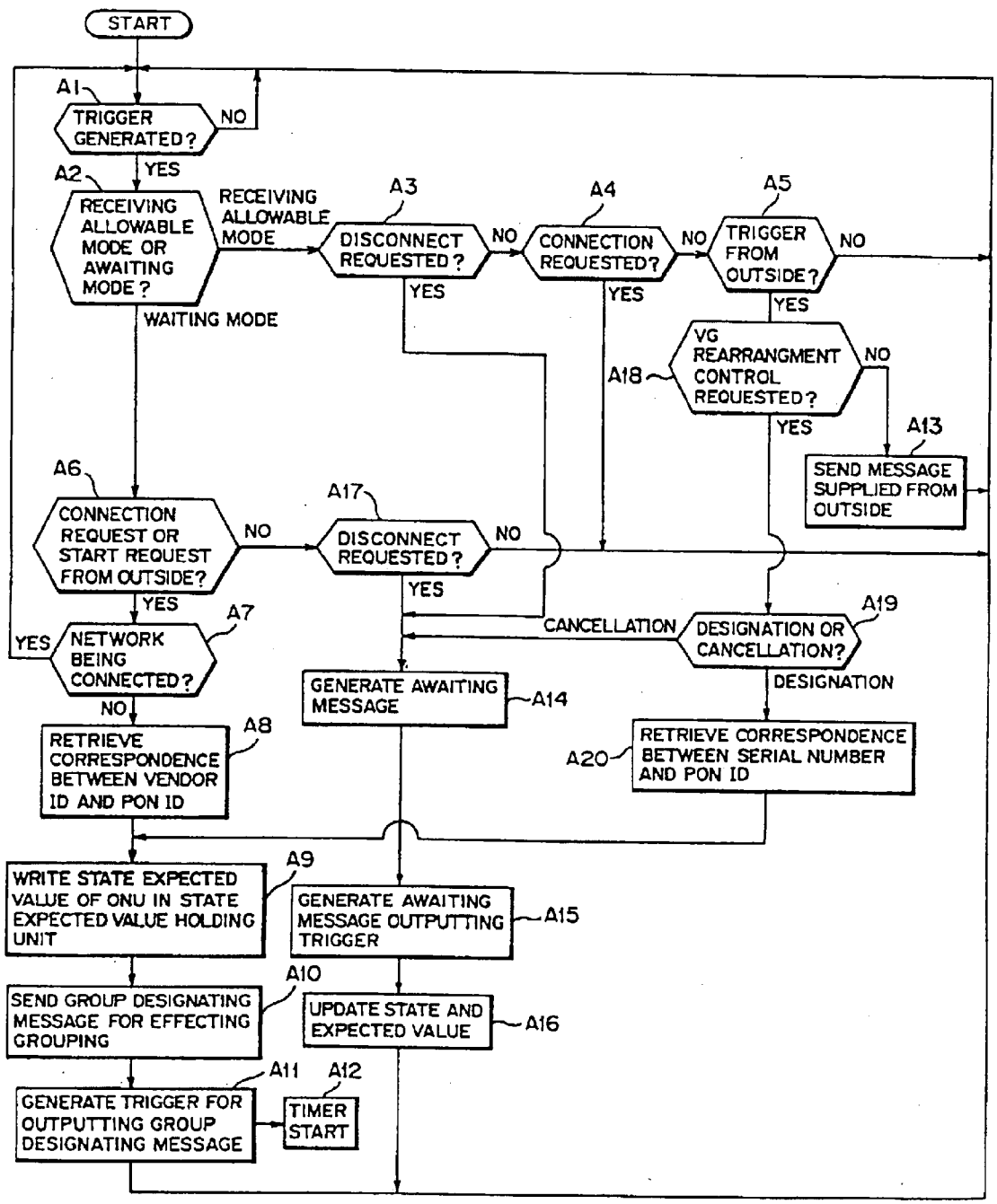
FIG. 19 is a flowchart for explaining an operation of a transmission system of the OLT shown in FIG. 17.

In more concretely, the subject message generating unit 24A-2 generates the VG rearrangement control message in accordance with an operation of a flowchart (algorism) shown in FIG. 19, for example.

That is, when a trigger is generated owing to an input from the outside (YES route is selected at step A5), the message generating unit 24A-2 confirms whether or not the generating trigger is a trigger for generating the VG rearrangement control message (step A18). If it is determined that the generating trigger is not a trigger for generating the VG rearrangement control message (NO route is selected at step A18), then the message inputted from the outside is sent to the downstream cell multiplexing unit 25 (step A13). Conversely, if it is determined that the generating trigger is a trigger for generating the VG rearrangement control message (YES route is selected at step A18), then it is further confirmed whether the trigger is for the group rearrangement or the rearranged group cancellation (step A19).

As a result, if it is confirmed that the trigger is a generating trigger for generating a group rearranging message, then the message generating unit 24A-2 searches for the individual PON-ID of the ONU 4-$i$ as a target of designation by using the vendor serial number of the unit of a target of designation as a key (step A20), and writes information of "receiving allowable state" as the ONU state expected value in an address region of the ONU state expected value holding unit 24-8 designated by the individual PON-ID (step A9).

The following processing is similar to the process of generating the VG designation message. That is, a group rearranging message is created and sent (step A10), a trigger indicating that the group rearranging message has been created is generated (step A11), and the timer unit 24-5 is started (step A12).

Conversely, if it is determined that the generation trigger is a trigger for canceling the group rearrangement, the message generating unit 24A-2 selects a route of cancellation at step A18, creates a group rearrangement canceling message (awaiting message) attached with a serial number of the ONU 4-$i$ as a target of cancellation (step A14), generates an awaiting trigger indicating that the awaiting message is generated (step A15), and changes the information held in the respective holding units 24-7 and 24-8 into information indicative of "awaiting state" (step A16).

In the subject OLT 2, operations (algorism) other than those described above are similar to the algorisms which are described with reference to FIGS. 9 and 10. That is, after the VG rearrangement control message is generated, the VG rearrangement control message is handled in a manner similar to that of the VG control message.

Figure 20:
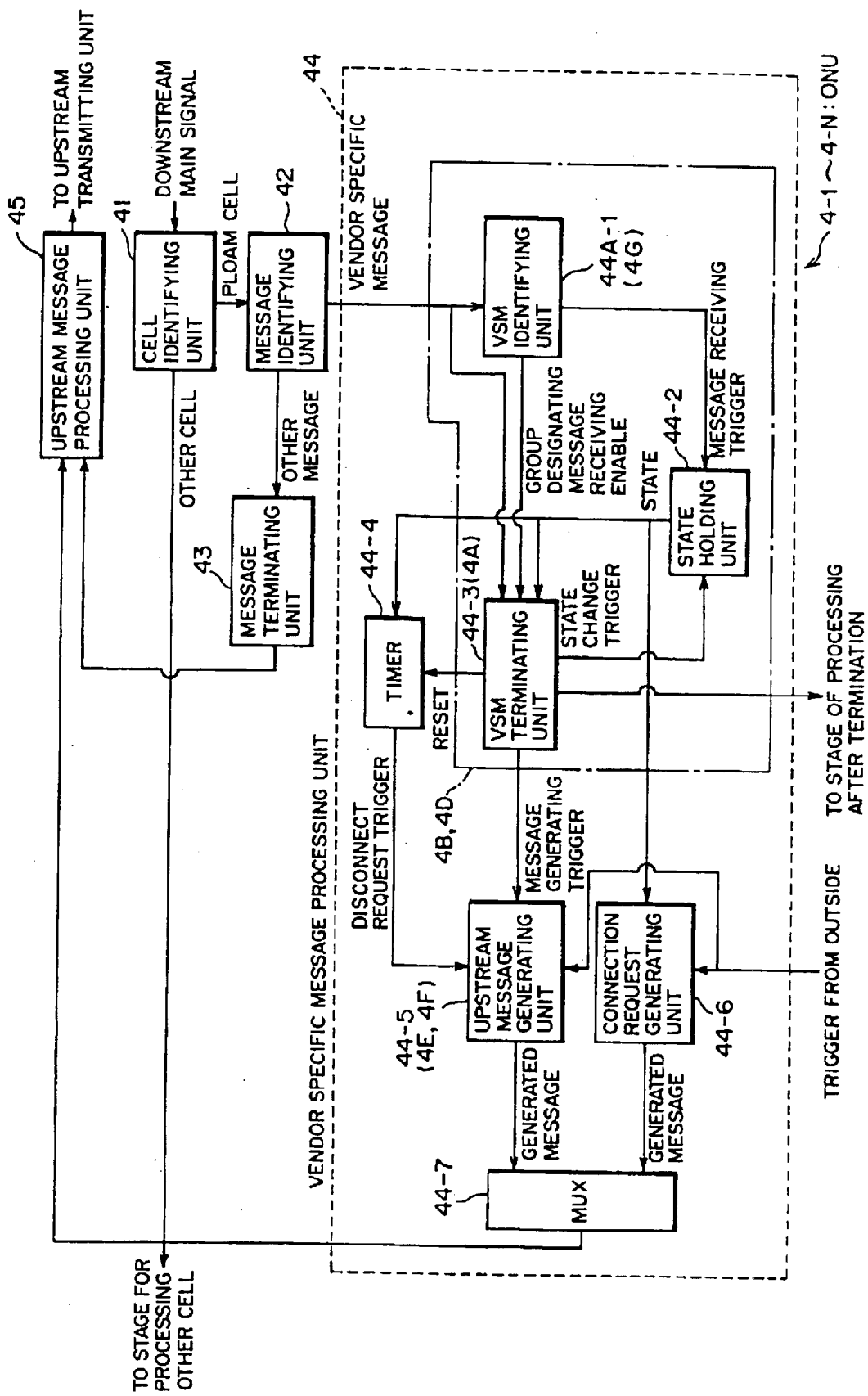
FIG. 20 is a block diagram showing an arrangement of the first modification of the ONU shown in FIGS. 1 and 3.

Meanwhile, as shown in FIG. 20, the ONU 4-$i$ according to the present first modification is provided with a VSM identifying unit 44A-1 in the VSM processing unit 44 instead of the aforesaid VSM identifying unit 44-1, so that the unit can identify the VG rearrangement control message sent from the OLT 2 as described above.

In more concretely, the VSM identifying unit 44A-1 has functions similar to those of the aforesaid VSM 44-1. Further, this identifying unit can determine whether or not a vendor serial number of its own unit (ONU 4-$i$) is contained in the vendor serial numbers set in the vendor serial number field 119 of the VG rearrangement control message sent from the OLT 2. Thus, the identifying unit can determine whether the VG rearrangement control message is for the unit itself or not.

That is, the VSM identifying unit 44A-1 functions as a unit identification information determining unit 4G which determines whether or not the vendor serial number assigned to the unit itself (ONU 4-$i$) is contained in the vendor serial numbers (unit identification information) attached to the VG rearrangement control message sent from the OLT 2.

In the ONU 4-$i$ shown in FIG. 20, if the VSM identifying unit 44A-1 determines that the vendor serial number assigned to the unit itself (ONU 4-$i$) is contained in the vendor serial numbers attached to the VG rearrangement control message, this VG rearrangement control message is terminated by the VSM terminating unit 44-3. Further, if the message is a VG designation rearranging message, then information indicative of "receiving allowable state " is written in the state holding unit 44-2 while if the message is an awaiting message, then information indicative of "awaiting state" is written in the state holding unit 44-2. Thereafter, the unit is brought into a state in which the terminating processing carried out by the VSM terminating unit 44-3 on the received VSM is effective.

Conversely, if it is determined that the vendor serial number assigned to the unit itself (ONU 4-$i$) is not contained in the vendor serial numbers attached to the VG rearrangement control message (i.e., the VG rearrangement control message is not a message for the unit), the VSM terminating unit 44-3 writes information indicative of "awaiting state" in the state holding unit 44-2 regardless of whether the message is for group rearrangement or the group rearrangement cancellation (the value of GF). Thus, the terminating processing on the VSM carried out in the following process is made ineffective.

Figure 21:
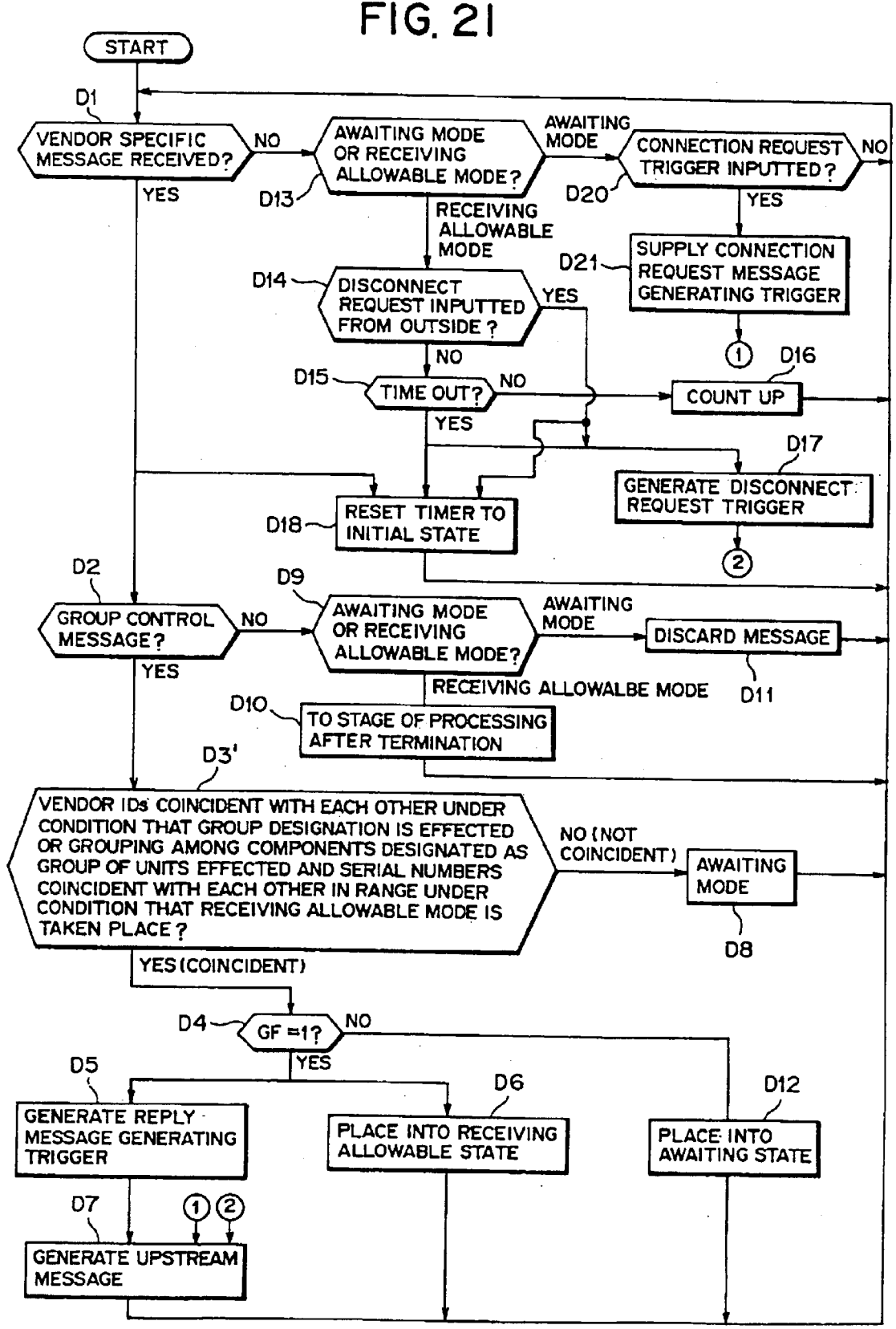
FIG. 21 is a flowchart for explaining an operation of the ONU shown in FIG. 20.

That is, as shown in FIG. 21, the algorism of the ONU 4-$i$ of the present first modification is arranged to include a determining step D3' in which it is determined whether or not the vendor ID attached to the received message is coincident with the vendor ID assigned to its own unit and after the unit is brought into the mode of "receiving allowable state", it is determined whether or not the received VG rearrangement control message contains the vendor serial number of the unit itself (if contained, then it is determined that both of them are coincident wit each other), instead of step D3 shown in FIG. 12.

The processing procedures (steps) other than those described above are similar to the processing procedures described with reference to FIG. 12. That is, also in the ONU 4-$i$, the VG rearrangement control message is handled in a manner similar to that of the VG control message after being identified.

Owing to the above-described arrangement and operation (algorism), the ATM-PON 1 of the subject first modification can execute the following operations.

Now, discussion will be made on the following case. That is, as for example shown in FIG. 22, a VG designation message is sent to the ONUs 4-1 and 4-2 manufactured by the same vendor (Company A) so that these units are made as components of a group (i.e., brought into the mode of "receiving allowable state"), and thereafter, in order to make the ONU 4-2 as a component of a rearranged group, a group rearranging message (broadcast type) attached with the vendor serial number of the ONU 4-2 is delivered in a form of a PLOAM cell (see reference numeral 33) from the OLT 2.

At this time, the OLT 2 should have information of "awaiting state" stored for the ONU 4-1. Therefore, the message generating unit 24A-2 changes the ONU state expected value and the ONU state value of the ONU 4-1 into "awaiting state" (see reference numerals 35 and 36). Further, the ONU state value of the ONU 4-2 and the state of the unit itself (OLT 2) are temporarily changed into "awaiting state" (see reference numerals 37 and 39) so as to await a reply message from the ONU 4-2.

The PLOAM cell (group rearranging message) is delivered to each of the ONUs 4-$i$ in a point-to-multipoint communication manner (see reference numeral 33$a$). In this case, however, only the ONU 4-2 has a vendor serial number that is coincident with the vendor serial number attached to the message. Therefore, the ONU 4-2 selects YES routes at steps D3' and D4 shown in FIG. 21 to maintain the mode of "receiving allowable state", and the ONU 4-1 selects NO route at step D3' shown in FIG. 21 to be placed in the mode of "awaiting state" (reference numeral 33b). Since the ONU 4-3 is placed in the mode of "awaiting state", the aforesaid group rearranging message cannot be terminated (see reference numeral 33c).

Figure 22:
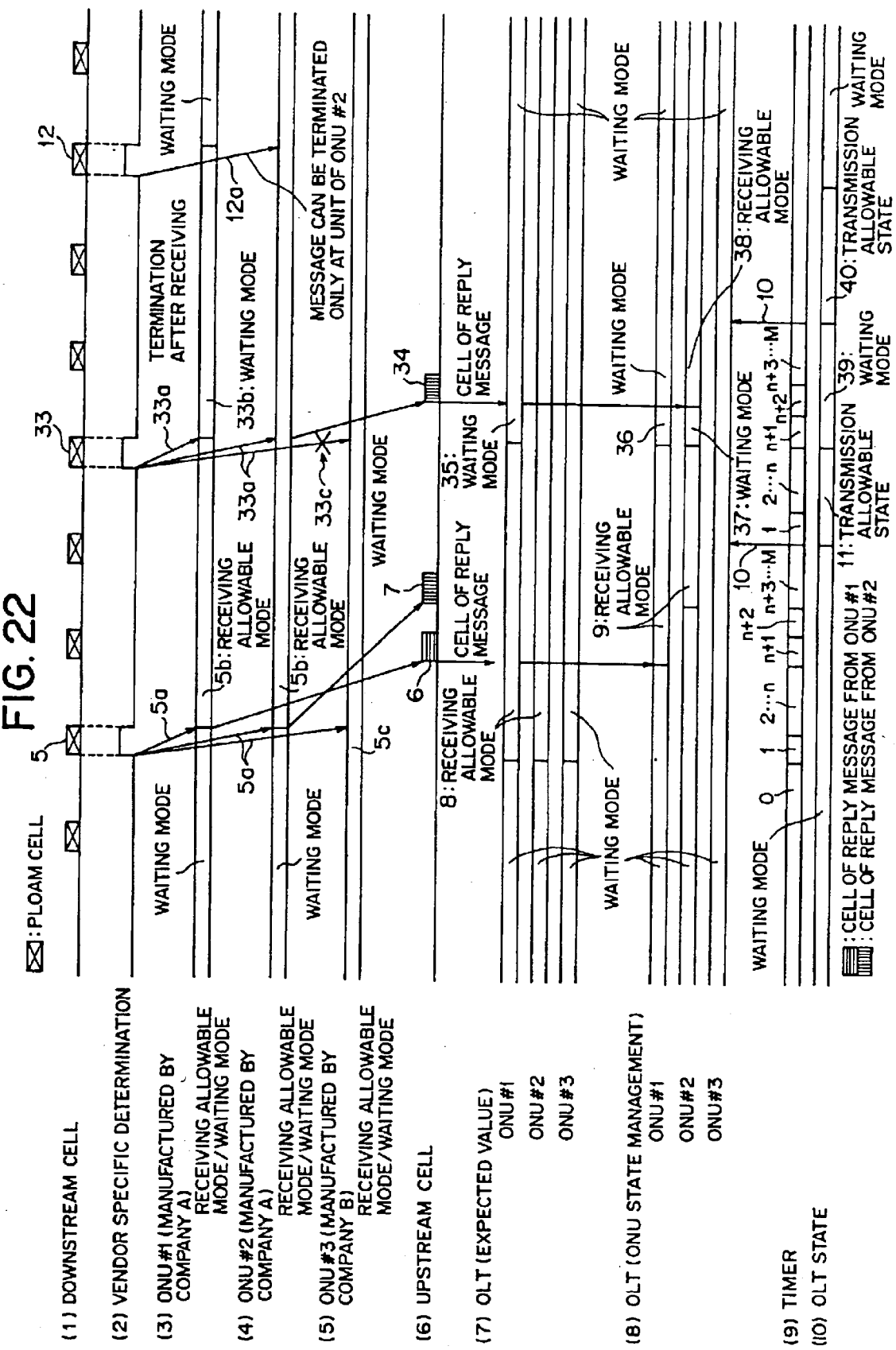
FIG. 22 is a timing chart for explaining an operation of an ATM-PON in the first modification.

At this time, the ONU 4-2 creates a reply message for the aforesaid group rearranging message (see steps D5 and D7 shown in FIG. 21), and sends the reply message to the OLT 2 in a form of PLOAM cell (see reference numeral 34 in FIG. 22). When the OLT 2 receives the reply message, the unit writes information indicative of "receiving allowable state" in an address region of the ONU state expected value holding unit 24-8 designated by the individual PON-ID attached to the message (reference numeral 38 in FIG. 22).

In this way, both of the ONU state value and the ONU state expected value of the individual PON-ID of the ONU 4-2 become "receiving allowable state", and hence both of them are coincident with each other. Then, the timer unit 24-5 completes the counting of the predetermined time period, and comparison between the ONU state value and the ONU state expected value, which are not updated (do not undergo the comparison), is carried out. If all agreements between the values are confirmed, the OLT state managing unit 24-4 writes information of "transmission allowable state" in the state holding unit 24b so that the unit itself (OLT 2) is again brought into the mode of "transmission allowable state" (see reference numeral 40 in FIG. 22).

Thereafter, if the OLT 2 delivers a VSM having a PON-ID of a broadcast type attached thereto for software download to each of the subscriber-side units, then only the ONU 4-2 that is placed in the mode of "receiving allowable state" can receive (i.e., terminate) the message.

While in the present modification description has been made on a case in which only a unit of ONU 4-2 is a target of group rearrangement for convenience of explanation, it is needless to say that a plurality of ONUs 4-i may be a target of group rearrangement by a procedure similar to that described above. Also, when it is requested to cancel the group rearrangement, the OLT 2 can send an awaiting message attached with a vendor serial number of the ONU 4-i as a target of the cancellation to effect the cancellation in a procedure similar to that of the group rearrangement.

As described above, according to the ATM-PON 1 as the subject first modification, some ONUs 4-i can be selected from the ONUs 4-i manufactured by the same vendor, and the selected units can be further subjected to the VG designation, so that only the ONUs 4-i selected from the ONUs 4-i manufactured by the same vendor are made to receive the VSM. Accordingly, information provision to the ONUs 4-i by means of a VSM such as software download can be carried out in a more flexible manner.

Also in this case, if the VG rearrangement control message is attached with a vendor serial number of the ONU 4-i as a target of state control and deliver to the all subscriber-side units, then the group rearrangement and the cancellation thereof can be effected by a single shot of VG rearrangement control message (PLOAM cell) transmission. Accordingly, it becomes possible to decrease the processing load imposed on the OLT 2 and the ONUs 4-i, the network traffic and so on.

(A2) Description of Second Modification of First Embodiment

Figure 23:
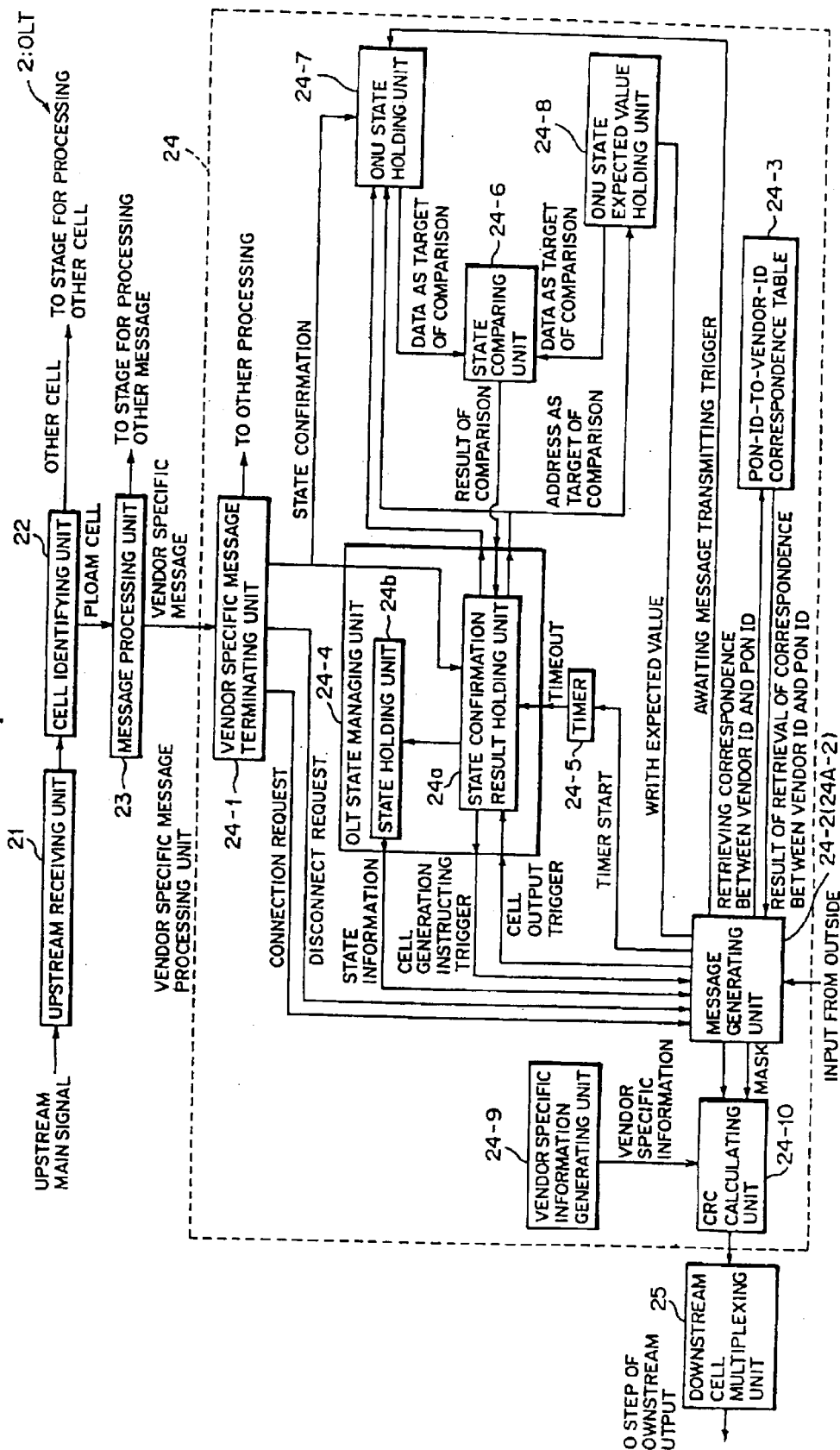
FIG. 23 is a block diagram showing an arrangement of a second modification of the OLT shown in FIGS. 1 and 2.
Figure 24:
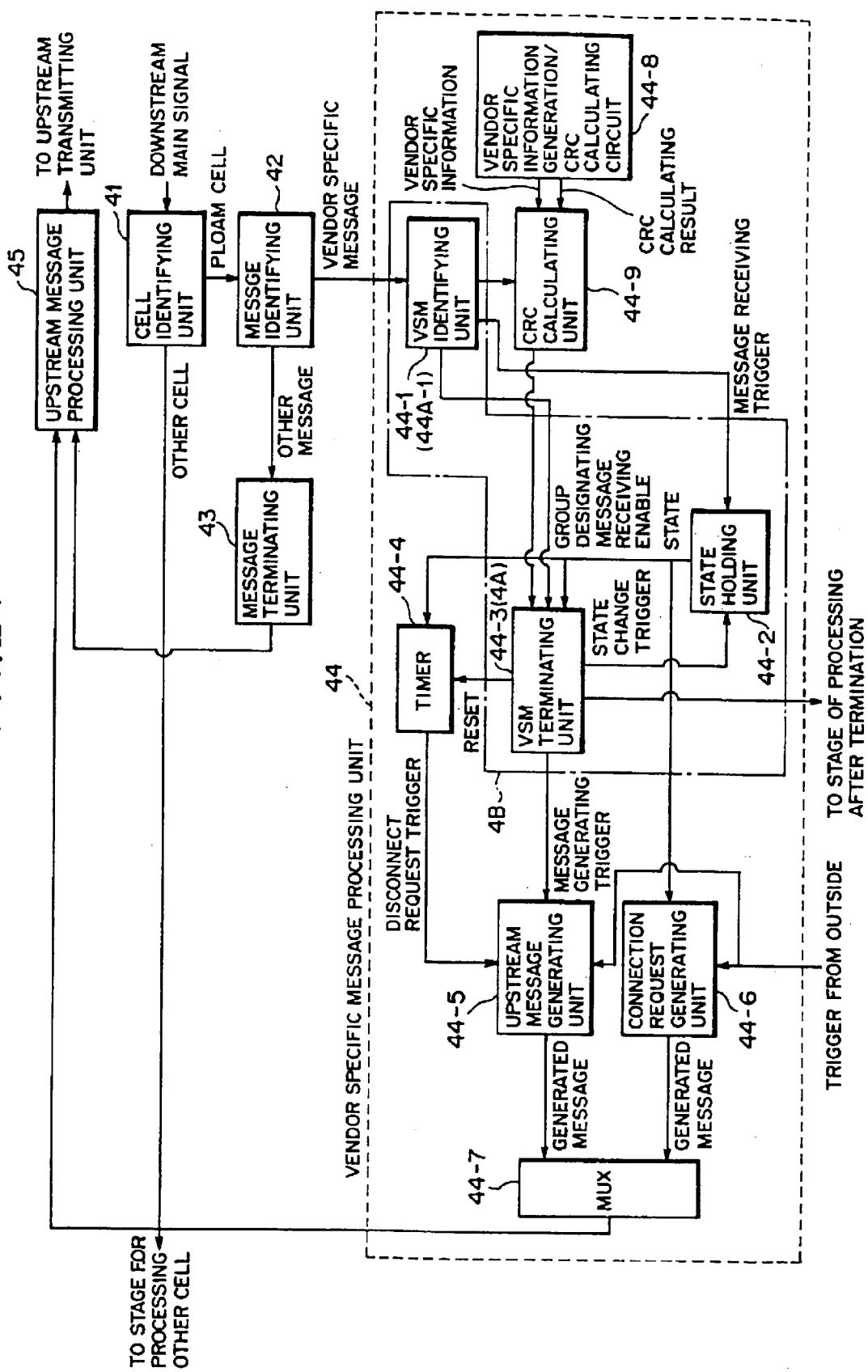
FIG. 24 is a block diagram showing an arrangement of a third modification of the ONU shown in FIGS. 1 and 3.

FIG. 23 is a block diagram showing a second modification of the OLT 2 shown in FIG. 2, and FIG. 24 is a block diagram showing a second modification of the ONU 4-i shown in FIG. 3. The arrangement of OLT 2 shown in FIG. 23 is different from the arrangement of the same shown in FIG. 2 in that the VSM processing unit 24 includes a vendor specific information generating unit 24-9 and a CRC calculating unit 24-10. Also, the arrangement of ONU 4-i shown in FIG. 24 is different from the arrangement of the same shown in FIG. 3 in that the VSM processing unit 44 includes a vendor specific information generation/CRC calculating circuit 44-8 and a CRC calculating unit 44-9.

In the OLT 2, the vendor specific information generating unit 24-9 is a unit for generating information, or vendor specific information such as a pattern based on the vendor ID, a PN pattern decided among respective vendors and so on, for example, which are recognized uniquely to each vendor. The CRC calculating unit 24-10 is a unit for taking an EOR (Exclusive OR) between the vendor specific information generated by the vendor specific information generating unit 24-9 and a message field of a transmission (downstream) VSM generated by the message generating unit 24-2 (an area of from forty-second byte to fifty-first byte except for the PON-ID field 113 and the message ID field 112), and effecting a CRC calculation on the result thereof (message field). The result of the CRC calculation is mapped on an area of fifty-second byte (CRC byte) of the downstream PLOAM cell.

When the transmission VSM is a VG control message, the message generating unit 24-2 supplies a masking signal so as to prevent the CRC calculation from being effected. In other words, the aforesaid CRC calculation is effected on any VSM other than the VG control message.

In the ONU 4-i, the vendor specific information generation/CRC calculating circuit 44-8 is a unit for generating the same information as the vendor specific information generated by the vendor specific information generating unit 24-9 of the OLT 2 and effecting a CRC calculation on the generated vendor specific information.

The CRC calculating unit 44-9 is a unit for effecting CRC calculation on the received VSM. In this case, the unit takes an EOR between the message field of the received VSM and the vendor specific information generated by the vendor specific information generation/CRC calculating circuit 44-8, removes vendor specific information attached to the VSM by the OLT 2 to restore the message field to its original data, takes an EOR between the CRC byte of the received VSM and the CRC calculation result deriving from the vendor specific information generation/CRC calculating circuit 44-8, and thereafter effects the CRC calculation on data stored on an area of from the message field to the CRC byte (forty-second to fifty-first byte).

In the subject second modification, if the VSM identifying unit 44-1 determines that the CRC calculation result is ALL "0", the received VSM is processed as a VSM addressed to the unit itself (terminated by the VSM terminating unit 44-3), and if it is determined that the result is not ALL "0", the received VSM is discarded as a message of which destination is not the unit itself.

Also in the ONU 4-i, the aforesaid CRC calculation is carried out in such a manner that, if the received VSM is a VG control message, the message is masked by the VSM identifying unit 44-1, and hence the calculation is effected on any VSM other than the VG control message.

Figure 25:
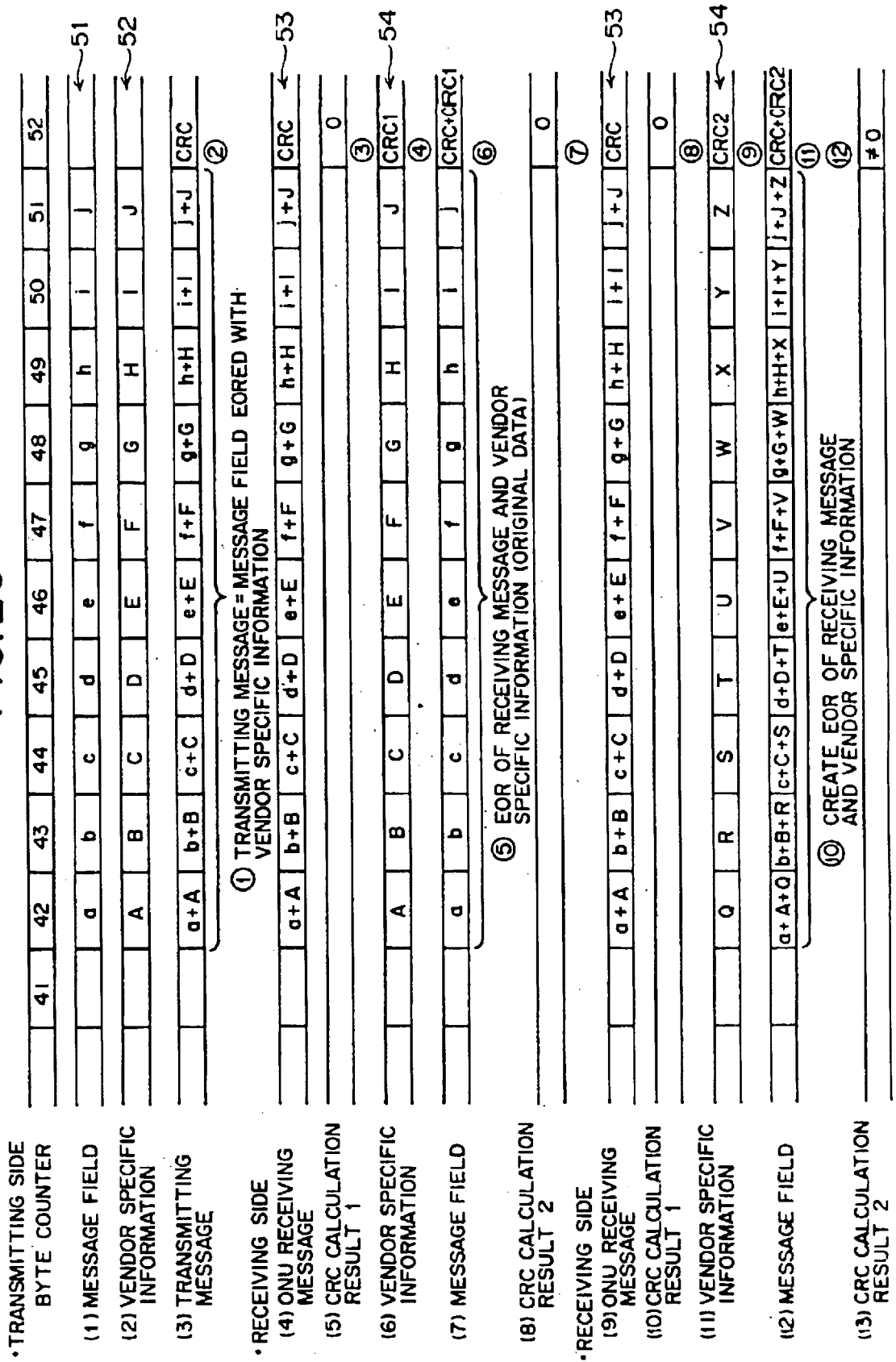
FIG. 25 is a timing chart for explaining an operation of an ATM-PON in the third modification.

With the above arrangement, the ATM-PON 1 of the subject second modification can do the following operations. That is, as for example shown in FIG. 25, the CRC calculating unit 24-10 on the OLT 2 side initially takes an EOR between the message field (a to j: see reference numeral 51) of the transmission VSM generated by the message generating unit 24-2 and the vendor specific information (A to J: see reference numeral 52) generated by the vendor specific information generating unit 24-9 (see ①). Thereafter, the calculating unit effects the CRC calculation on the transmission VSM. The result of the CRC calculation is mapped on the area of fifty-second byte of the PLOAM cell (see ②) and transmitted to the ONU 4-*i* together with the transmission VSM.

On the side of each ONU 4-*i*, the CRC calculating unit 44-9 carries out the CRC calculation (see ③,⑧) on the message field (see reference numeral 53) of the received VSM. If the result of calculation becomes ALL "0", then it is confirmed that the received VSM does not contain any error caused by transmission path error or the like. Thereafter, the calculation unit takes an EOR between the message field and the vendor specific information generated by the vendor specific information generation/CRC calculating circuit 44-8 so that the message field can restore its original form (see ⑤,⑩).

At this time, as for the CRC byte, the EOR is taken with the CRC calculation result (see ④,⑨) of the vendor specific information (see reference numeral 54) of the vendor specific information generation/CRC calculating circuit 44-8 (see ⑥,⑪). Then, the CRC calculating unit 44-9 again effects the CRC calculation on the data written in the message field and the CRC byte. If the result of calculation becomes ALL "0" (see ⑦), it is determined that the vendor specific information utilized on the own unit is correct (i.e., the information is coincident with the vendor information utilized on the OLT 2 side). Thus, the received VSM is terminated by the VSM terminating unit 44-3 as a VSM addressed to the own unit.

Conversely, if the result of calculation does not become ALL "0" (see ⑫), it is determined that the vendor specific information utilized on the own unit is wrong (i.e., the information is different from the vendor information utilized on the OLT 2 side). That is, it is determined that the message is not one addressed to the unit itself, and consequently the received VSM is discarded.

In the ATM-PON 1 of the subject second modification, the OLT 2 multiplexes the vendor specific information with the message field of the transmission VSM and sends the resultant message. The ONU 4-*i* removes the vendor specific information multiplexed with the received VSM and examines the CRC byte. Thus, it is determined whether the received VSM is a message addressed to the own unit or not.

In this way, if the OLT 2 uses the vendor specific information of Company A, for example, it becomes possible to make only the ONU 4-*i* manufactured by Company A receive the VSM. Therefore, if the VG designation is effected by a plurality of times (i.e., grouping is carried out by a plurality of times) by using the aforesaid VG designation message, for example, it becomes possible to make only units constituting a desired group receive a desired VSM.

As for operations other than the above-described operation concerning the CRC calculation, the second modification operates in a manner similar to that of the aforesaid first embodiment or the first modification. Therefore, advantages similar to those of the aforesaid first embodiment or the first modification can be obtained.

(B) Description of Second Embodiment

Figure 26:
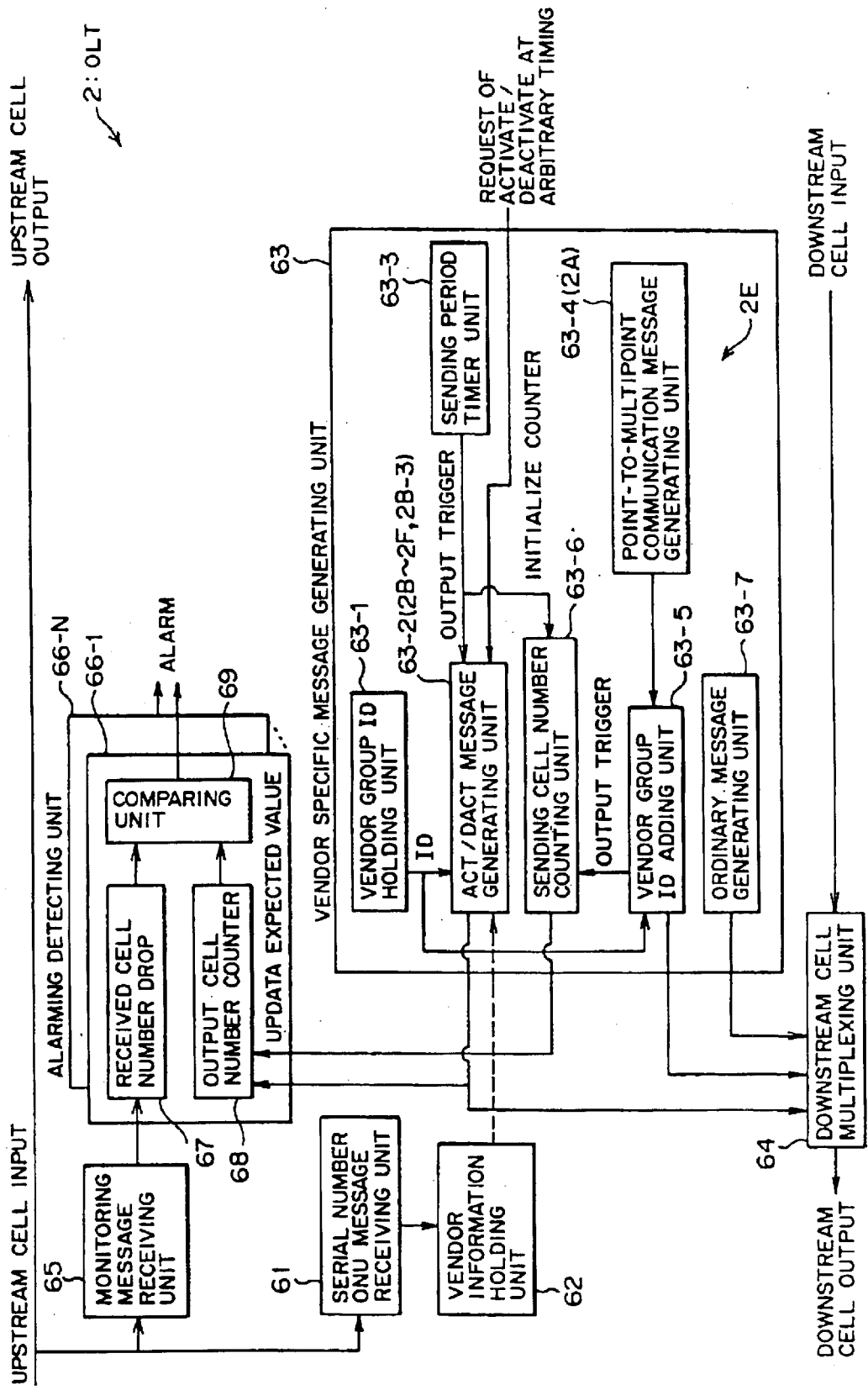
FIG. 26 is a block diagram showing an arrangement of an OLT as a second embodiment of the present invention.

FIG. 26 is a block diagram showing an arrangement of the OLT 2 according to a second embodiment of the present invention. The OLT 2 shown in FIG. 26 is also employed in the ATM-PON 1 shown in FIG. 1. The arrangement of the present second embodiment can be described in terms of its main functions. That is, the arrangement includes a serial number ONU message receiving unit 61, a vendor information holding unit 62, a VSM generating unit 63, a downstream cell multiplexing unit 64, a monitoring message receiving unit 65 and an alarming detecting unit 66-1 to 66-N provided in each of the ONUs 4-*i*.

The serial number (Serial Number) ONU message (Message) receiving unit 61 is a unit for receiving the aforesaid serial number ONU message 109 (see FIG. 64) transmitted from respective ONUs 4-*i* (i=1 to N). The vendor information holding unit 62 is a unit for holding a vendor ID attached to the serial number ONU message received by the serial number ONU message receiving unit 61.

Also in the subject second embodiment, the VSM generating unit 63 serves as a unit for generating a VSM. In this case, however, the unit can further generate a VSM (activate message) for assigning identical vendor group identification information (VGID) to the ONUs 4-*i* manufactured by the same vendor so that the ONUs 4-*i* manufactured by the same vendor of all ONUs 4-*i* are designated as a component constituting a group of units (VG designation). Also, the unit can further generate a VSM (deactivate message) for canceling the assignment of the VGID.

For this reason, as shown in FIG. 26, the subject VSM generating unit 63 is arranged to include a VGID holding unit 63-1, an activate (Activate)/deactivate (Deactivate) message (Message) generating unit 63-2, a sending period timer unit 63-3, a point-to-multipoint communication message generating unit 63-4, a VGID adding unit 63-5, a sending cell number counting unit 63-6, an ordinary message generating unit 63-7 and so on.

The VGID holding unit 63-1 is a unit for holding the aforesaid VGID. This unit is formed of a RAM, for example, so that a plurality of kinds of VGID can be held. The Act/Dact message generating unit 63-2 is a unit for generating an Act/Dact message 91 (or monitoring reply requesting message 92 which will be described later on) based on a format shown in FIG. 27A, for example, in response to an input (Act/Dact request) from the outside by means of a maintenance command.

Figures 27A, 27B:
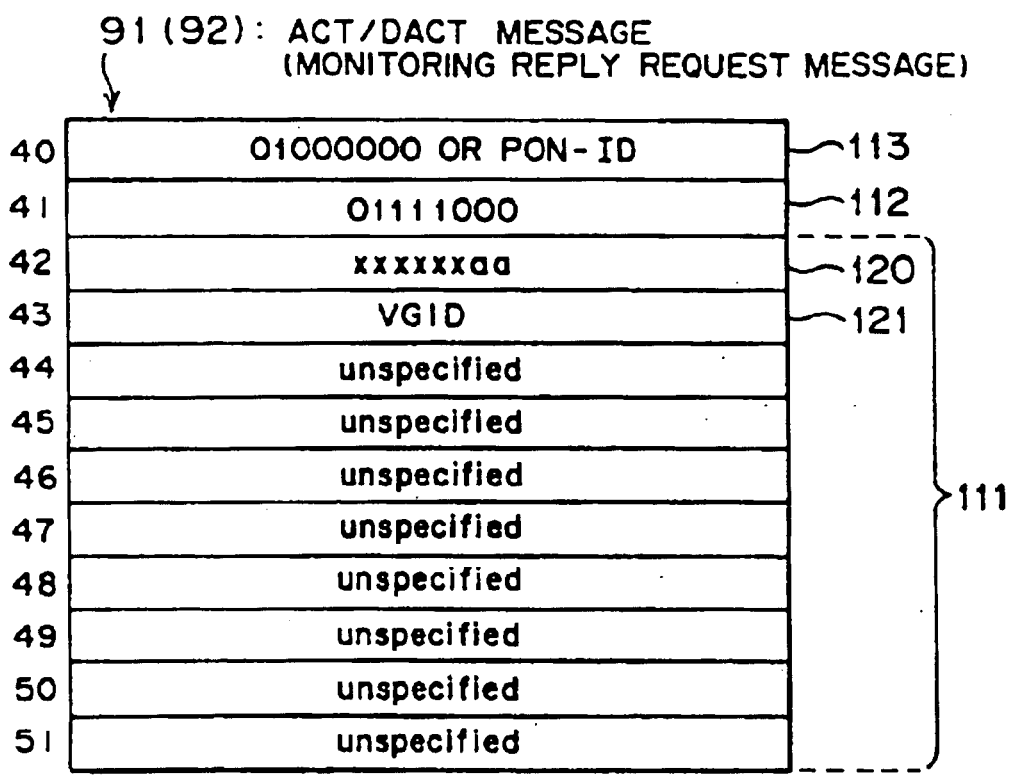
FIGS. 27A and 27B are each diagram for explaining a format of an Act/Dact message (monitoring reply requesting message) utilized in the second embodiment.

That is, as shown in FIG. 27A, the Act/Dact message generating unit 63-2 is arranged based on a format in which an area of fortieth byte (octet) from the head portion of the downstream PLOAM cell is defined as a PON-ID field 113, an aea of forty-first byte is defined as the message ID field 112, an area of forty-second byte is defined as an Act/Dact-ID field 120, an area of forty-third byte is defined as a VGID field 121. Then, various kinds of information pieces as follows are created as information to be mapped on respective fields.

① The area of fortieth byte (PON-ID field 113): broadcast type PON-ID (01000000(0x40$_H$)) or an individual PON-ID.

② The area of forty-first byte (message ID field 112): information indicating that the message itself is a VSM (e.g., also in this case, 01111000 (0x78$_H$)).

③ The area of forty-second byte (Act/Dact-ID field 120): information indicating which of the activate message or deactivate message the message 91 itself is ("xxxxxxaa": as for example shown in FIG. 27B, if aa=11, the message is Act while if aa=00, the message is Dact).

The letters x of the higher six bits may take either 1 or 0. In other words, on the side of ONU 4-*i*, the Act/Dact message 91 is identified by the lower two bits, or aa. However, as shown in FIG. 27B, if aa=10 or aa=01, which status means that the message itself is a monitoring reply requesting message 92. When an ONU 4-*i* receives the message 92, this unit reports the number of VSMs 93 (see FIG. 28: this message is created by a point-to-multipoint message generating unit 63-4)received so far in a point-to-multipoint communication manner to the OLT 2 by means of a monitoring message 94 which will be described later on (see FIG. 29). In this case, the VGID attached to the message at the following forty-third byte (VGID field 121) is neglected in the ONU 4-i.

④ The area of forty-third byte (VGID field 121): a kind of VGID except for a specified VGID (specified value) indicative of total point-to-multipoint communication which will be described later on. This VGID is one that should be assigned to ONUs 4-i as a target of grouping or VGID having been assigned to ONUs 4-i as a target of group canceling (in either of the cases, the information is acquired from the VGID holding unit 63-1).

⑤ The area of from forty-fourth to fifty-first byte: This area is not defined (Unspecified).

That is, the subject Act/Dact message generating unit 63-2 exerts the following functions.

① A function as a group designation message generating unit 2B (group identification information assigning message generating unit 2B-3) for generating an Act message (assigning message) 91 as a group designating message so that ONUs 4-i to be grouped are assigned with the same VGID.

② A function as a group designation canceling unit 2C for generating a Dact message (group canceling message) for canceling the group designation effected on an arbitrary ONU 4-i.

③ A function as a received message number confirmation requesting unit 2D for requesting confirmation on the number of VSMs 93 delivered in a point-to-multipoint communication manner received at an ONU 4-i.

The sending period timer unit 63-3 is a unit for deciding a sending period of the monitoring reply requesting message 92 (hereinafter simply referred to as "reply requesting message 92"). The Act/Dact message generating unit 63-2 generates the reply requesting message 92 in response to a sending trigger which is generated from the sending period timer unit 63-3 at every predetermined period.

The point-to-multipoint message generating unit 63-4 is a unit for generating a point-to-multipoint VSM 93 attached with a broadcast type PON-IN ($0\times 40_H$) at the PON-ID field 113. The VGID adding unit 63-5 is a unit acquiring from the VGID holding unit 63-1, the VGID assigned to the ONU 4-i which is made to receive the VSM by the Act message 91, and attaching the VGID to the point-to-multipoint VSM 93 created by the point-to-multipoint message generating unit 63-4.

Figure 28:
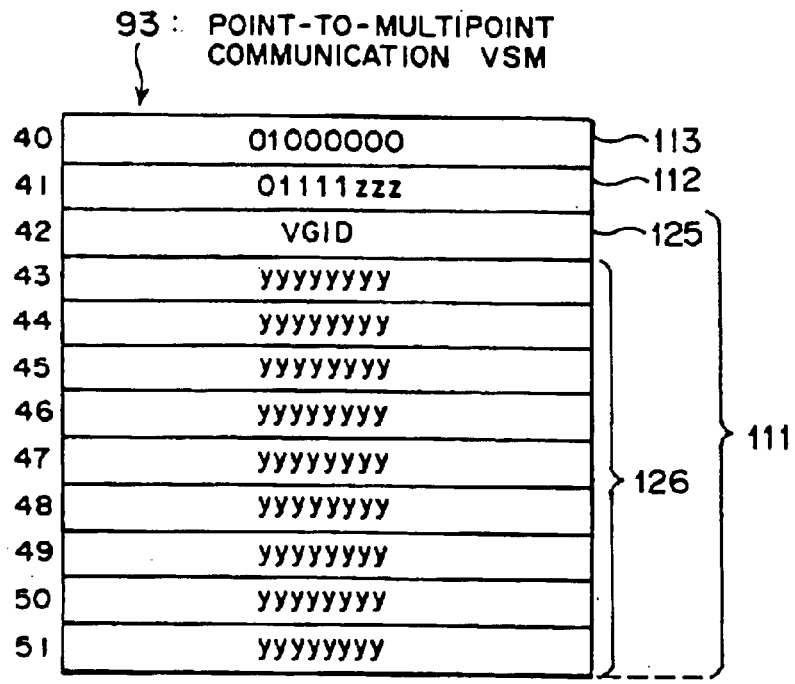
FIG. 28 is a diagram for explaining a format of a point-to-multipoint VSM utilized in the second embodiment.
Figure 29:
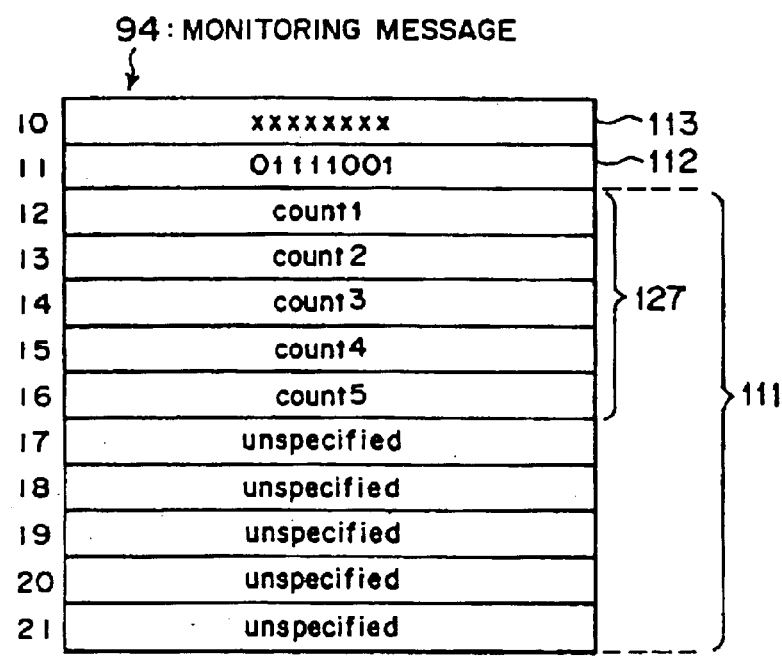
FIG. 29 is a diagram for explaining a format of a monitoring message utilized in the second embodiment.

In more concretely, as shown in FIG. 28, the area of forty-second byte of the downstream PLOAM cell is defined as a VGID field 125, and the aforesaid VGID (VGID assigned to the ONU 4-i to which it is requested to deliver the point-to-multipoint VSM) acquired from the VGID holding unit 63-1 is attached to the cell at the VGID filed 125. However, if it is requested to deliver the point-to-multipoint communication VSM 93 to all ONUs 4-i regardless of the VGID assignment (grouping), then a specific VGID (specific value) indicative of the mode of delivering a message to all subscriber-side units is attached to the cell.

At this time, the downstream PLOAM cell comes to have the broadcast type PON-ID ($0\times 40_H$) set at the area of fortieth byte (PON-ID field 113) and information [01111zzz: z can be arbitrarily selected from 0 or 1, in this case, it is supposed to be 01111001 ($0\times 79_H$)] indicating that the message itself is a VSM set at the area of forty-first byte (message ID field 112).

That is, the aforesaid point-to-multipoint message generating unit 63-4 functions together with the vendor ID attaching unit 63-5 as a group identification information attaching-type VSM generating unit 2E for generating the point-to-multipoint communication VSM 93 having the VGID attached at the VGID field 125 addressed to units constituting the VG group.

On the side of ONU 4-i, if it is determined that the VGID attached to the point-to-multipoint VSM 93 at the VGID field 125 is coincident with the VGID assigned to the unit itself by the Act message 91, then the unit accepts the point-to-multipoint VSM 93 as a message addressed to the unit itself. Thus, processing is effected in accordance with the contents 126 of the message. However, if the aforesaid specific value is attached at the VGID field 125, the ONU 4-i accepts the point-to-multipoint VSM 93 even if the point-to-multipoint message is not coincident with the VGID assigned to the unit itself.

The sending cell number counter unit 63-6 is a unit for counting the number of adding operations of the vendor ID carried out by the vendor ID adding unit 63-5 so as to count the number of the point-to-multipoint messages sent with the downstream PLOAM cell. The counted value is held in the sending cell number holding unit 68 of the alarming detecting unit 66-i of each ONU 4-i as an expected value of the received cell number notified by the ONU 4-i by means of the monitoring message 94. The sending cell number counter unit 63-6 is reset (to its initial condition) at every predetermined period in response to the trigger sent from the sending period timer unit 63-3.

The ordinary message generating unit 63-7 is a unit for generating a downstream message (hereinafter referred to as "ordinary message") other than the VSM which is regulated by the recommendation [G.983] addressed to the ONU 4-i.

The downstream cell multiplexing unit 64 is a unit for multiplexing the Act/Dact message 91 (reply requesting message 92) generated by the aforesaid Act/Dact message generating unit 63-2, the point-to-multipoint VSM 93 generated by the point-to-multipoint message generating unit 63-4, and the ordinary message generated by the ordinary message generating unit 63-7 onto a downstream PLOAM cell and sends the cell to the side of the ONU 4-i.

The monitoring message receiving unit 65 is a unit for receiving the monitoring message 94 (see FIG. 29) returned from the ONU 4-i as a reply for the aforesaid reply requesting message 92. Each alarming detecting unit 66-i is a unit for monitoring whether a point-to-multipoint VSM 93 assigned with a certain VGID and addressed to the ONU 4-i is successfully received by the ONU 4-i or not. To this end, this unit is arranged to include a received cell number extracting unit 67, a sending cell number holding unit 68 and a comparing unit 69.

On the side of each alarming detecting unit 66-i, the received cell number extracting unit 67 extracts information of received cell number (number of received point-to-multipoint VSMs: count 1–5 (see FIG. 29)) attached at a counted number field 127 (area of twelfth to sixteenth byte from the head portion of the upstream PLOAM cell) of the monitoring message 94 received by the monitoring message receiving unit 65. Then, the comparing unit 69 compares the received cell number with the information of the sending cell number which is counted by the sending cell number counter 63-6 and held as an expected value in the sending cell number holding unit 66-1.

If it is determined that both the cell numbers are coincident with each other as a result of comparison, then the alarming detecting unit 66-i determines that the point-tomultipoint VSMs 93 are successfully received by the ONU 4-*i*. Conversely, if it is determined that both the cell numbers are not coincident with each other, then it is determined that the point-to-multipoint VSMs 93 cannot be successfully received by the ONU 4-*i* due to cell loss or the like. Thus, the alarming detecting unit emanates an alarm message.

Now description will be hereinafter made intensively on the message sending processing carried out by the OLT 2 as the second embodiment arranged as described above, with reference to a flowchart shown in FIG. 30.

Initially, it is assumed that a user (maintenance engineer) of the OLT 2 requests a start (activate request) of point-to-multipoint communication for a specified vendor from the OLT 2 at an arbitrary timing (step E1). At this time, the user gives the OLT 2 vendor information to be delivered in a point-to-multipoint communication manner. This activate request is accepted by the Act/Dact message generating unit 63-2. The Act/Dact message generating unit 63-2 confirms whether there is information concerning the ONU 4-*i* stored in each vendor information holding unit 62, thereby to confirm whether the ONU 4-*i* connected to the own unit (OLT 2) is a target of point-to-multipoint communication.

As a result of confirmation, if it is determined that the ONU 4-*i* as a target of point-to-multipoint communication on which the activate request is made is a ONU 4-*i* connected to the own unit (OLT 2), then the Act/Dact message generating unit 63-2 assigns an identical VGID to the ONUs 4-*i* as a target of point-to-multipoint communication (i.e., unit obliged to receive the point-to-multipoint VSM 93) and also the Act/Dact message generating unit 63-2 generates the aforesaid Act message 91 (see FIG. 27A) so that the target units are designated as a component constituting a group.

That is, the Act/Dact message generating unit 63-2 creates a downstream PLOAM cell containing information of the individual PON-ID of the ONU 4-*i* as a target of grouping which is to be mapped on the PON-ID field 113 (area of fortieth byte), information ($0 \times 78_H$) indicating that the message is a VSM which is to be mapped on the message ID field 112 (area of forty-first byte), and information (aa=11) indicating that the message is an Act message 91 which is to be mapped on the lower two bits of the Act/Dact-ID field 120 (area of forty-second byte). Also, the message generating unit accesses the VGID holding unit 63 to acquire an arbitrary unused VGID as information to be mapped on the VGID field 121, and then outputs these information pieces to the downstream cell multiplexing unit 64 as an Act message 91 (step E2).

The downstream cell multiplexing unit 64 maps information (Act message 91) transferred from the Act/Dact message generating unit 63-2 in the above manner on the downstream PLOAM cell and then outputs the cell as an activate cell (Activate Cell: hereinafter sometimes referred to as Act cell (cell) 91) (step E3).

The Act/Dact message generating unit 63-2 confirms whether or not all of the ONUs 4-*i* as a target of point-to-multipoint communication have been completely selected (VGID is assigned) (step E4). If it is determined that the selection has not been completed, then the processing from step E2 is repeated to continue the creation and transmission of the Act cell 91 (NO route is selected at step E4) until it is confirmed that all of the ONUs 4-*i* as a target of point-to-multipoint communication have been completely selected (YES route is selected at step E4). In other words, the OLT 2 of this case designates (selects) the ONUs 4-*i* as a target of point-to-multipoint communication by sending the Act cell 91 to every ONUs 4-*i* as a target of point-to-multipoint communication.

Thereafter, if it is confirmed that all of the ONUs 4-*i* as a target of point-to-multipoint communication have been completely selected (YES route is selected at step E4), then the point-to-multipoint message generating unit 63-4 and the VGID adding unit 63-5 create the point-to-multipoint communication VSM 93 (see FIG. 28). That is, the point-to-multipoint message generating unit 63-4 creates the broadcast type PON-ID ($0 \times 40_H$) as information to be mapped on the PON-ID field 113 (area of fortieth byte) of the downstream POLAM cell and information ($0 \times 79_H$) indication that the message itself is a point-to-multipoint VSM 93 as information to be mapped on the message ID field 112 (area of forty-first byte) of the same downstream cell. The VGID adding unit 63-5 accesses the VGID holding unit 63-1 to acquire the VGID assigned to the ONUs 4-*i* as a target of point-to-multipoint communication as information to be mapped on the VGID field 121 of the downstream PLOAM cell (step E5).

These information pieces are outputted to the downstream cell multiplexing unit 64, and the downstream cell multiplexing unit 64 forms these information pieces into a PLOAM cell and outputted therefrom as a point-to-multipoint communication cell (hereinafter sometimes denoted as point-to-multipoint communication cell (cell) 93) (step E6). The point-to-multipoint message generating unit 63-4 and the VGID adding unit 63-5 confirms whether the step of sending the point-to-multipoint communication cells 93 is completed [there is no information (message) to undergo point-to-multipoint communication] or not (step E7). If there is any information piece left not transmitted, then the processing following step E5 is repeated until all information pieces to be transmitted have been transmitted (until YES route is selected at step E7). In this way, the point-to-multipoint communication cells 93 is created and transmitted (NO route at step E7).

If it is determined that the step of creating and transmitting the point-to-multipoint communication cells 93 is completed (YES route is selected at step E7), the OLT 2 forces the Act/Dact message generating unit 63-2 to generate a Dact message 91 (see FIG. 27A) so that the aforesaid VGID assignment to the ONU 4-*i* (grouping) is canceled.

That is, the Act/Dact message generating unit 63-2 creates a downstream PLOAM cell containing information of the individual PON-ID of the ONU 4-*i* as a target of canceling which is to be mapped on the PON-ID field 113 (area of fortieth byte), information ($0 \times 78_H$) indicating that the message is a VSM which is to be mapped on the message ID field 112 (area of forty-first byte), and information (aa=00) indicating that the message is a Dact message 91 which is to be mapped on the lower two bits of the Act/Dact-ID field 120 (area of forty-second byte). Also, the message generating unit accesses the VGID holding unit 63 to acquire a VGID of the unit as the target of cancellation as information to be mapped on the VGID field 121, and then outputs these information pieces to the downstream cell multiplexing unit 64 (step E8).

The downstream cell multiplexing unit 64 maps information (Dact message 91) created by the Act/Dact message generating unit 63-2 in the above manner on the downstream PLOAM cell and then outputs the cell as a deactivate cell (Deactivate Cell: hereinafter sometimes referred to as Dact cell (cell) 91) (step E9).

The Act/Dact message generating unit 63-2 confirms whether or not all of the ONUs 4-*i* as a target of cancellation of point-to-multipoint communication have been completely selected (VGID assignment is canceled) (i.e., the Dact message has been sent to all of the ONUs 4-*i* as a target of cancellation) (step E10). If it is determined that the cancellation has not been completed, then the processing from step E8 is repeated to continue the creation and transmission of the Dact cell 91 (NO route is selected at step E10) until it is confirmed that all of the ONUs 4-$i$ as a target of point-to-multipoint communication have been completely canceled (YES route is selected at step E10).

In other words, similarly to the case of grouping operation, the OLT 2 cancels the grouping of each the ONU 4-$i$ as a target of point-to-multipoint communication by sending the Dact cell 91 to each ONUs 4-$i$ as a target of point-to-multipoint communication.

Thereafter, if it is confirmed that all of the ONUs 4-$i$ as a target of point-to-multipoint communication have been completely canceled (YES route is selected at step E10), then the point-to-multipoint communication is completed (step E11). At this time, the VGID relieved from the assignment is brought into an unused mode in the VGID holding unit 63-1. As described above, when the transmission of the point-to-multipoint communication cell 93 is completed, the ONUs 4-$i$ as a target of point-to-multipoint communication have been wholly canceled. Thus, it becomes possible to suppress the variety of VGIDs to be prepared in advance, with the result that the VGID holding unit 63-1 can be free from having a large memory capacity.

The cancellation of the grouping of ONUs 4-$i$ as a target of point-to-multipoint communication may not be limited to the above-described manner. That is, the command input into the OLT 2 may be carried out at an arbitrary timing by means of input from the outside such when a maintenance command is inputted. Further, the operation may not be intended to cancel the designation of the units wholly but cancel some of the units partly.

Figure 31:
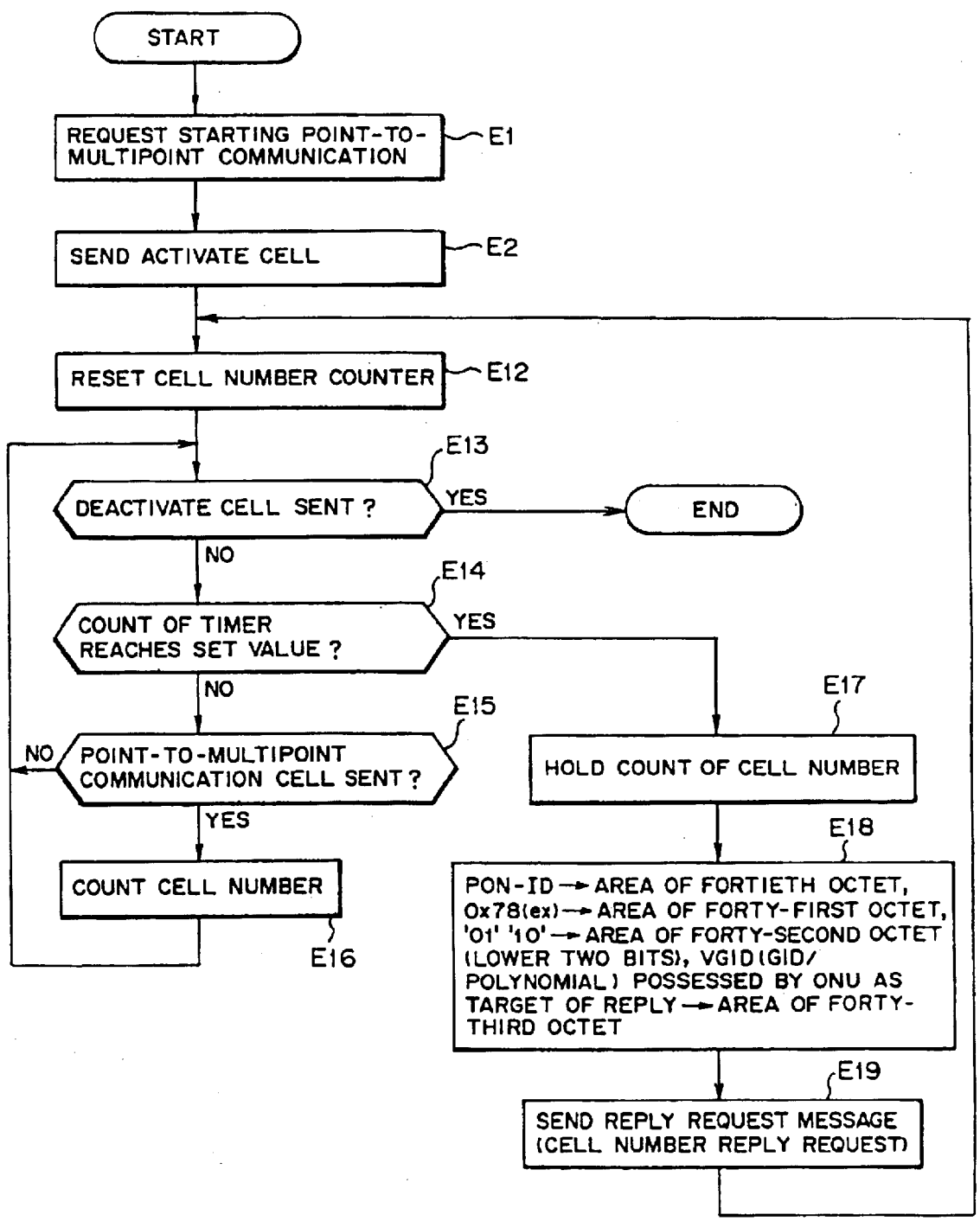

Meanwhile, when the OLT 2 (VSM generating unit 63) carries out the above operation, this unit also carries out an operation in accordance with a flowchart (algorism) shown in FIG. 31 in a parallel manner. That is, as described above, a request command of starting the point-to-multipoint communication is inputted from the outside (step E1), and the Act cell 91 is delivered to the units (step E2). Thereafter, the sending period timer unit 63-3 is energized and the sending cell number counter unit 63-6 is reset to its initial state (step E12).

The sending cell number counter unit 63-6 keeps counting the number of point-to-multipoint communication cell 93 created and transmitted within a sending period (set value) determined by the sending period timer unit 63-3 until the grouping cancellation is accomplished (YES route is selected at step E13) in response to the generation of the Dact message 91 by the Act/Deact message generating unit 63-2 (sending of the Dact cell 91)(NO route at step E14 and from YES route at step E15 to step E16). If the number of point-to-multipoint communication cell 93 is not created, the sending cell number will not be counted (NO route of step E15).

Thereafter, if it is detected that the sending period determined by the sending period timer unit 63-3 has elapsed (YES route is selected at step E14), then the sending cell number counter unit 63-6 forces the sending cell number holding unit 68 of the alarming detecting unit 66-$i$ to hold the count at that time (step E17). Then, the Act/Dact message generating unit 63-2 generates the reply request message 92 in response to the count holding.

That is, the Act/Dact message generating unit 63-2 creates a downstream PLOAM cell containing information of the individual PON-ID of the ONU 4-$i$ as a target of reply request which is to be mapped on the PON-ID field 113 (area of fortieth byte), information ($0\times78_H$) indicating that the message is a VSM which is to be mapped on the message ID field 112 (area of forty-first byte), and information (aa=01 or 10) indicating that the message is a reply request message 92 which is to be mapped on the lower two bits of the Act/Dact-ID field 120 (area of forty-second byte). Also, the message generating unit accesses the VGID holding unit 63 to acquire a VGID of the unit as the target of reply request as information to be mapped on the VGID field 121, and then outputs these information pieces to the downstream cell multiplexing unit 64 (step E18).

As will be described later on, the VGID of this case may be obviated by the following reason. That is, when the point-to-multipoint communication is carried out for two or more vendor groups (in a parallel manner), and the ONUs 4-$i$ of a particular one group of the groups are requested to return the monitoring result of the reply message to the OLT 2 by means of the monitoring cell, the VGID becomes valid. And in other cases except for that case, the VGID is neglected on the side of ONUs 4-$i$.

The information (reply request message 92) created by the Act/Dact message generating unit 63-2 is mapped in the downstream PLOAM cell by the downstream cell multiplexing unit 64 (step E19). Thereafter, on the side of OLT 2, when the monitoring message receiving unit 65 receives the PLOAM cell having a monitoring message 94 mapped therein (hereinafter sometimes denoted as monitoring cell 94) as a reply of the reply request message 92, then on the side of the alarming detecting unit 66-$i$, the received cell number extracting unit 67 extracts information of received cell number attached to the monitoring message 94 at the count number field 127. The comparing unit 69 compares the received cell number and the aforesaid sending cell number held in the sending cell number holding unit 68 with each other. If both of the cell numbers are not coincident with each other, an alarm is generated.

Figure 32:
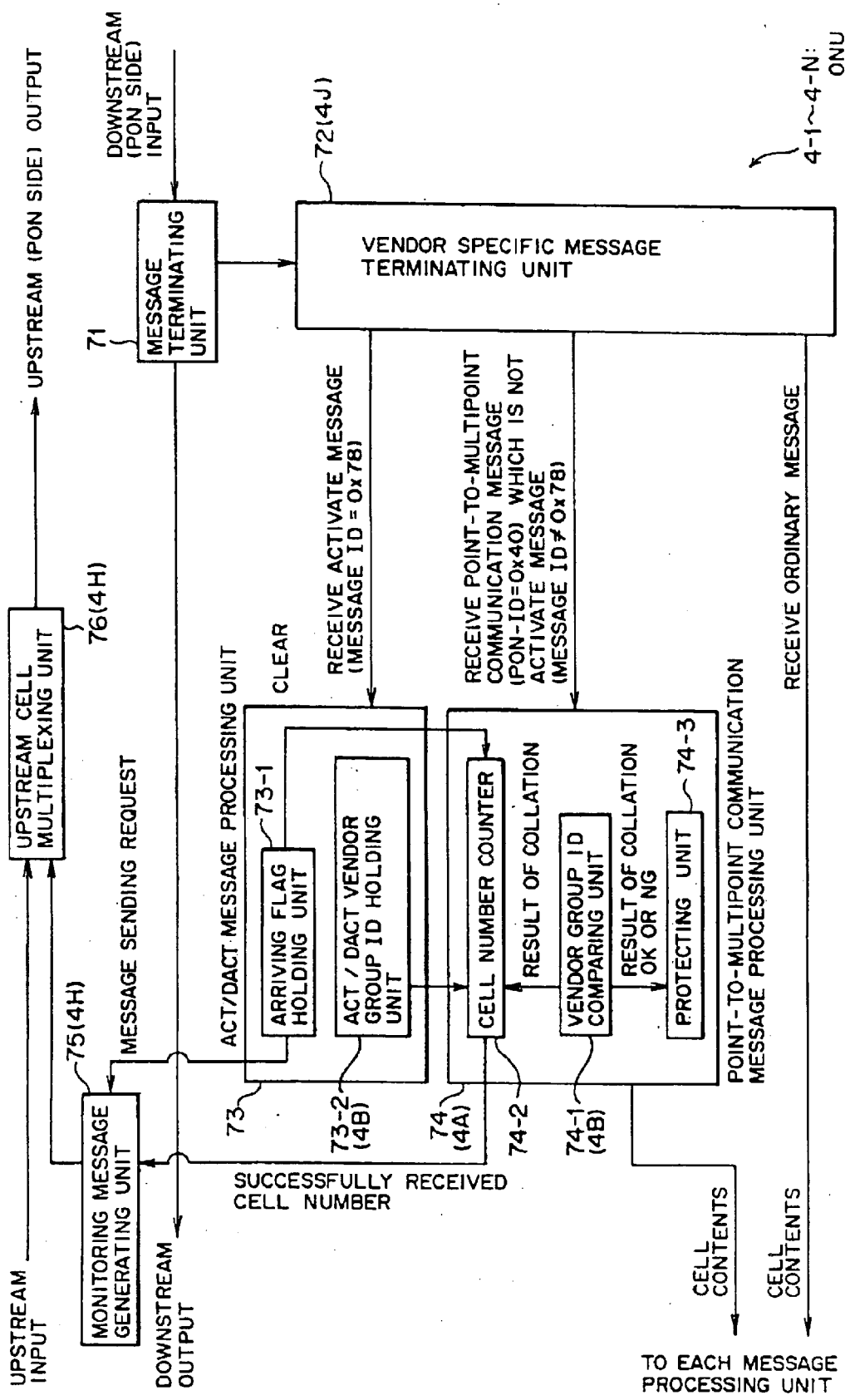
FIG. 32 is a block diagram showing an arrangement of an ONU as the second embodiment of the present invention.

Now, an arrangement and operation of an ONU 4-$i$ as a second modification will be hereinafter described. FIG. 32 is a block diagram showing an arrangement of the ONU 4-$i$ as the subject second embodiment. FIG. 32 intends to illustrate a function of the main portion of the ONU 4-$i$. That is, the main portion is arranged to include a message terminating unit 71, a VSM terminating unit 72, an activate (Act)/Deactivate (Dact) message processing unit 73, a point-to-multipoint message processing unit 74, a monitoring message generating unit 75 and an upstream cell multiplexing unit 76.

The message terminating unit 71 is a unit for terminating a downstream PLOAM cell received from the OLT 2 so as to extract the contents of the message. The VSM terminating unit 72 is a unit for terminating the message contents extracted by the message terminating unit 71 so as to determine whether the received message is a VSM addressed to the own unit or a message other than a VSM addressed to the own unit.

In more concretely, if an individual PON-ID of its own unit or a PON-ID of a broadcast type ($0\times40_H$) is attached to the message at the PON-ID field 113, the VSM terminating unit 72 determines that the received message is addressed to the own unit. If any value falling within a range of "$0\times78_H$ to $0\times7f_H$" is attached to the message at the message ID field 112, the terminating unit determines that the received message is an ordinary message. If it is determined that the received message is a VSM, then it is further examined whether the received VSM is an Act/Dact message 91 (reply request message 92), a point-to-multipoint message 93 or an ordinary message.

For example, if it is confirmed that the received message has an individual PON-ID of its own unit or a PON-ID of a broadcast type attached thereto at the PON-ID field 113 and a value of "0×78$_H$" is attached thereto at the message ID field 112, then it is determined that the received VSM is an Act/Dact message 91 (or reply request message 92) addressed to the unit itself. Thus, the received message is transferred to the Act/Dact message processing unit 73.

Further, if it is confirmed that the received message has any value falling within the range of "0×78$_H$ to 0×7f$_H$" except for the value of "0×78$_H$" attached thereto at the message ID field 112 and a PON-ID of a broadcast type (0×40$_H$) attached to the message at the PON-ID field 113, then it is determined that the received VSM is a point-to-multipoint message 93, and the received message is transferred to the point-to-multipoint message processing unit 74. A message identified as an ordinary message is transferred to other message processing unit (not shown) for the ordinary message. If the received message has any value other than the individual PON-ID of the unit itself or the PON-ID of a broadcast type attached thereto at the PON-ID field 113, then it is determined that such a message is not one addressed to the unit itself. Therefore, the message is discarded.

The Act/Dact message processing unit 73 is a unit for referring to the Act/Dact-ID field 120 of the VSM received from the VSM terminating unit 72 so as to determine whether the received VSM is the Act/Dact message 91 or the reply request message 92. This unit further carries out the following operations depending on the result of determination.

① In a case of Act message 91 (aforesaid aa=11): The VGID flag (H) indicative of Act message reception and the VGID attached to the message at the VGID field 121 are held in the Act/Dact-VGID holding unit (group identification information holding unit) 73-2. The Act/Dact-VGID holding unit 73-2 has the aforesaid specific VGID (specific value) stored therein in advance.

② In a case of Dact message 91 (aforesaid aa=00): The aforesaid VGID flag and the VGID held in the Act/Dact-VGID holding unit 73-2 are cleared.

③ In a case of reply request message 92: An arriving flag holding unit 73-1 is made to hold an arriving flag (H) so that the monitoring message generating unit 75 generates a monitoring message 94.

Also, the point-to-multipoint communication message processing unit 74 (4A) is a unit for sending the message contents 126 of the point-to-multipoint message to the message processing unit (not shown) only when it is determined that the point-to-multipoint VSM 93 received from the VSM terminating unit 72 is a message addressed to the unit itself (if the message is anyone other than the message addressed to the unit itself, the message is discarded). To this end, this unit is arranged to include a VGID comparing unit (group identification information comparing determining unit) 74-1 for comparing (collating) and determining whether or not the VGID attached to the received point-to-multipoint VSM at the VGID field 125 is coincident with the VGID held in the aforesaid Act/Dact-VGID holding unit 73-2 (VGID assigned by the OLT 2 or the aforesaid specific value).

In the point-to-multipoint message processing unit 74, the cell number counter unit (message counting unit) 74-2 is a unit in which the count thereof is incremented each time the VGID comparing unit 74-1 confirms that both the aforesaid VGIDs are coincident with each other. With this arrangement, the cell number counter unit counts the number of the point-to-multipoint VSM (point-to-multipoint communication cell) 93 attached with the same VGID as the VGID (or the aforesaid specific value) assigned by the OLT 2.

When the arriving flag (H) is held in the arriving flag holding unit 73-1, the cell number counter unit responds to the arriving flag so that the count thereof is sent to the monitoring message generating unit 75 as information to be attached to the monitoring message (monitoring cell) 94, which is to be sent to the OLT 2, at the count number field 127.

A protecting unit 74-3 is a unit for effecting protection on the point-to-multipoint message VSM 93 when this message undergoes the subsequent message processing. For example, the protecting unit outputs the message contents 126 of the received point-to-multipoint VSM 93 to the subsequent message processing units only when the aforesaid VGID comparing unit 74-2 confirms the coincidence between the VGIDs (result of OK) by a predetermined number of times (e.g., three to five times) continuously.

That is, in the subject embodiment, the Act/Dact-VGID holding unit 73-2 and the VGID comparing unit 74-1 function as a state control unit 4B in such a manner that when an Act message 91 is received from the OLT 2, the point-to-multipoint message processing unit 74 (4A) is brought into an effective mode (Act state) in which receiving and processing on the point-to-multipoint VSM 93 is effective. In more concretely, if the VGID comparing unit 74-1 determines that the aforesaid VGIDs are coincident with each other, the receiving and processing on the point-to-multipoint VSM 93 is controlled to be effective.

The monitoring message generating unit 75 is a unit in which when a VGID flag (H) indicating that an Act message 91 has been received is held in the arriving flag holding unit 73-1 of the Act/Dact message processing unit 73, the monitoring message generating unit responds to the flag holding by generating a monitoring message 94 (see FIG. 29) having a count (received cell number) outputted from the cell number counter unit 74-2 attached at the count number field 127.

At this time, this message is attached with information indicative of the source of the subject message (e.g., an individual PON-ID) at the PON-ID field 113 and information indicating that the subject message is a monitoring message 94 [e.g., 01111001 (0×79$_H$)] at the message ID field 112. Further, the range of the count number field 127 may be properly changed depending on the sending period of the reply request message 92 from the OLT 2 (regulated by the sending period timer 63-3). That is, as the sending period becomes longer, the received cell number counted within the period is increased, with the result that a large size of field (bytes) becomes necessary. Conversely, as the sending period becomes shorter, the received cell number counted within the period is decreased, with the result that a small size of field (bytes) can satisfy the necessary storage.

The upstream cell multiplexing unit 76 is a unit for multiplexing (mapping) the input information addressed to the OLT 2 on the upstream PLOAM cell and sending the resultant cell. In this case, the monitoring message 94 created by the monitoring message generating unit 75 is also mapped on the upstream PLOAM cell and sent as a monitoring cell 94 to the OLT 2.

That is, the monitoring message generating unit 75 and the upstream cell multiplexing unit 76 function as a received message number notifying unit 4H which responds to a confirmation request (reply request message 92) about the received number of the VSMs received from the OLT 2 in such a manner that the unit the notifies the OLT 2 of the count (result of counting) deriving from the cell number counter unit 74-2.

Now, description will be hereinafter made on operations of the ONU 4-$i$ as the subject second embodiment arranged as described above with reference to a flowchart shown in FIG. 33.

Initially, when the ONU 4-$i$ receives the downstream PLOAM cell (message) (step F0), the message terminating unit 71 terminates the PLOAM cell and the VSM terminating unit 72 makes reference to the PON-ID field 113 of the PLOAM cell so as to confirm whether a PON-ID of a broadcast type ($0 \times 40_H$) or an individual PON-ID of the unit itself is attached to the cell or not (step F1).

If it is confirmed as a result of confirmation that the information attached to the cell at the PON-ID field 113 is anyone other than the PON-ID of a broadcast type ($0 \times 40_H$) or the individual PON-ID of the unit itself, then the VSM terminating unit 72 determines that the received message is not addressed to the unit itself and discards the received message (NO route at step F1 to step F19). Conversely, if it is confirmed that the PON-ID of a broadcast type ($0 \times 40_H$) or the individual PON-ID of the unit itself is attached thereto, then processing proceeds to the next stage (YES route at step F1 to step F2) in which it is confirmed whether information ($0 \times 78_H$ to $0 \times 7f_H$) indicating that the message is a VSM is attached to the PLOAM cell at the message ID field 112 (area of forty-first byte).

If it is confirmed as a result of confirmation that the value attached at the message ID field 112 is any value other than the values falling within the range of $0 \times 78_H$ to $0 \times 7f_H$, then the VSM terminating unit 72 determines that the received message is an ordinary message. Thus, the received message is outputted to a message processing unit (not shown) for processing an ordinary message so that processing is carried out in accordance with the message contents (depending on a case, the message maybe discarded by the message processing unit: NO route at step F2 to step F3).

On the other hand, if it is confirmed that the value attached at the message ID field 112 is any value falling within the range of "$0 \times 78_H$ to $0 \times 7f_H$", then the VSM terminating unit 72 further confirms whether or not the value is of "$0 \times 78_H$", that is, the message is an Act/Dact message 91 (or a reply request message 92) (YES route at step F2 to step F4).

If it is confirmed as a result of confirmation that the value attached at the message ID field 112 is of "$0 \times 78_H$", that is, the message is an Act/Dact message 91 (or a reply request message 92), the VSM terminating unit 72 further refers to the area of forty-second (Act/Dact-ID field 120) so as to confirm whether the LSB thereof is "1" or not (YES route at step F4 to step F5).

If the aforesaid LSB has a digit of "1" entered therein, the VSM terminating unit 72 further confirms whether or not the second bit has a digit of "1" entered therein (from YES route at step F5 to step F6). If it is confirmed that a digit of "1" is entered (YES route is selected at step F6), which fact means that the lower two bits of the forty-second byte (aa) has a status of "11". Thus, the terminating unit determines that the received VSM is an Act message 91.

In this way, the VGID flag (H) and the VGID attached to the Act message 91 at the VGID field 121 are held in the Act/Dact-VGID holding unit 73-2 of the Act/Dact message processing unit 73. Thereafter, the point-to-multipoint message processing unit 74 is brought into a state in which the point-to-multipoint VSM 93 having the VGID attached thereto can be accepted and processed (step F7).

Conversely, at step F5, if the aforesaid LSB has a digit of "0" entered therein, the VSM terminating unit 72 further confirms whether or not the second bit has a digit of "0" entered therein (from NO route at step F5 to step F8). If it is confirmed that a digit of "0" is entered (YES route is selected at step F8), which fact means that the lower two bits of the forty-second byte (aa) has a status of "00". Thus, the terminating unit determines that the received VSM is a Dact message 91.

In this way, the VGID flag (H) and the VGID held in the Act/Dact-VGID holding unit 73-2 of the Act/Dact message processing unit 73 cleared. Thereafter, the point-to-multipoint message processing unit 74 is brought into a state in which the point-to-multipoint VSM 93 having the VGID attached thereto cannot be accepted and processed (step F9).

Further, if NO route is selected at step F6 or step F8, which fact means that the aforesaid lower tow bits (aa) of the forty-second byte has a pair of digits of "10" or "01". Thus, the VSM terminating unit 72 determines that the received VSM is a reply request message 92.

In this way, the arriving flag (H) is held in the arriving flag holding unit 73-1 of the Act/Dact message processing unit 73, the monitoring message generating unit 75 creates a monitoring cell 94 and returns the same (step F10), and the cell number counter unit 74-1 is reset so that the count thereof becomes its initial state (step F11).

Meanwhile, at step F4, if any value other than "$0 \times 78_H$" is attached to the received PLOAM cell at the message ID field 112, that is, the received PLOAM cell is not an Act/Dact cell 91 (nor reply request cell 92), the VSM terminating unit 72 refers to the PON-ID field 113 at the next step in which it is confirmed whether the broadcast type PON-ID ($0 \times 40_H$) is attached thereto or not (from NO route at step F4 to step F12).

If it is determined as a result of confirmation that the broadcast type PON-ID ($0 \times 40_H$) is attached to the cell at the PON-ID field 113 (YES route is selected at step F12), then the VSM terminating unit 72 determines that the received VSM is a point-to-multipoint VSM 93, and transfers the received VSM (point-to-multipoint VSM 93) to the point-to-multipoint message processing unit 74. When the point-to-multipoint message processing unit 74 receives the point-to-multipoint VSM 93, then the point-to-multipoint message processing unit 74 confirms whether or not the VGID flag (H) and the VGID are held (Act state) in the Act/Dact-VGID holding unit 73-2 of the Act/Dact message processing unit 73 (step F13). If it is confirmed that the Act state is taken place, then the VGID comparing unit 74-1 confirms whether or not the VGID attached to the point-to-multipoint VSM 93 is coincident with the VGID held in the Act/Dact-VGID holding unit 73-2 (from YES route at step F13 to step F14).

If it is confirmed that both of the VGIDs are coincident with each other, the cell number counter unit 74-2 starts counting of the received point-to-multipoint VSM 93 (from YES route at step F14 to step F15). The received point-to-multipoint VSM 93 is outputted to a message processing unit provided on the subsequent stage and processing is carried out in accordance with the contents of the message (step F16).

If it is confirmed that both of the VGIDs are not coincident with each other, the point-to-multipoint message processing unit 74 forces the VGID comparing unit 74-1 to confirm whether or not the VGID attached to the point-to-multipoint VSM 93 is coincident with the specific value held in the Act/Dact-VGID holding unit 73-2 (from NO route at step F14 to step F17). If coincidence is confirmed (YES route is selected at step F17), then it is determined that the point-to-multipoint VSM 93 is a message addressed to the unit itself. Thus processing after the aforesaid step F15 is carried out. If the coincidence is not confirmed, the point-to-multipoint VSM 93 is discarded (from NO route at step F17 to step F19).

At step F12, if the PON-ID attached to the received VSM at the PON-ID field 113 is not the PON-ID of a broadcast type ($0\times40_H$) (NO route is selected at step F12), the VSM terminating unit 72 further confirms whether the PON-ID is the individual PON-ID of the unit itself (ONU 4-$i$) or not (step F18). If it is confirmed that the attached information is the individual PON-ID of the unit itself (YES route is selected at step F18), then the processing after the aforesaid step F15 is carried out. If it is confirmed that the attached information is not the individual PON-ID of the unit itself (NO route is selected at step F18), then the received VSM is discarded (step F19).

Figure 34:
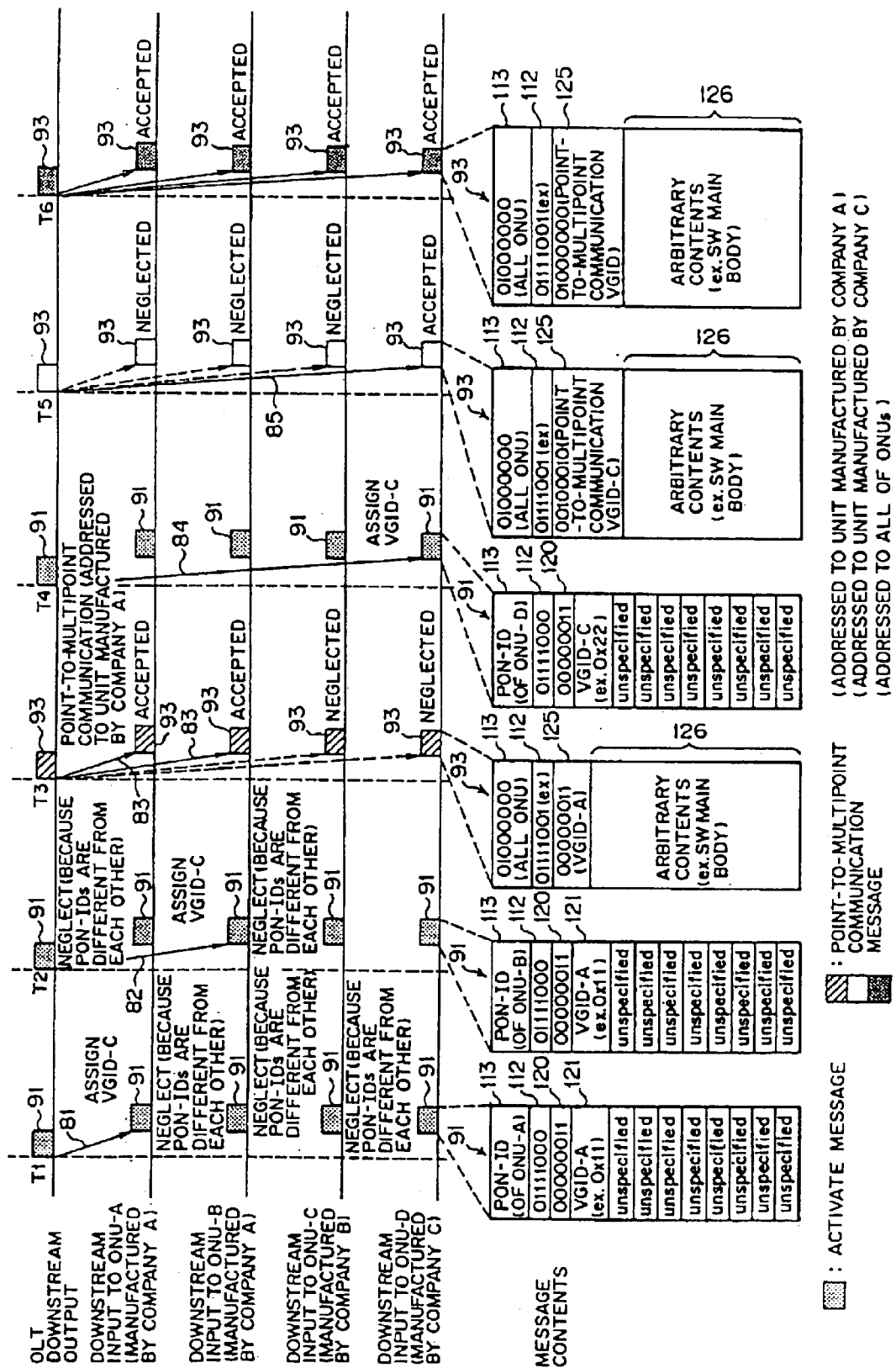
FIGS. 34 and 35 are each timing chart for explaining an operation of an ATM-PON in the second embodiment.

Now, description will be made on the overall operation of the ATM-PON 1 of the subject second embodiment on the basis of the above-described arrangements and operations of the OLT 2 and the ONU 4-$i$, with reference to FIGS. 34 and 35. In FIG. 34, the ONUs 4-1 and 4-2 are denoted as ONU-A and ONU-B, (manufactured by Company A), the ONU 4-3 is denoted as ONU-C (manufactured by Company B), and the ONU 4-4 is denoted as ONU-D (manufactured by Company C), respectively.

Also in the subject embodiment, discussion is made on a case in which the ONUs 4-1 and 4-2 are designated as a component constituting a group, and operation of SWDL (software download) is effected on each of the ONUs 4-1 and 4-2.

In this case, on the side of OLT 2, the Act/Dact message generating unit 63-2 of the VSM generating unit 63 repeats the processing of from step E2 to E4 described with reference to FIG. 30 twice, whereby Act messages (Act cell) 91 addressed to the couple of ONUs 4-1 and 4-2 (individual PON-IDs of respective units are attached to the PON-ID field 113 and an identical VGID (VGID-A: e.g., "$0\times11_H$") is attached to the VGID field 120) are successively created and transmitted, as shown at timing points T1 and T2 in FIG. 34.

All of the Act messages 91 are transmitted (inputted) to all of the ONUs 4-$i$ in a point-to-multipoint communication manner. However, these messages can be accepted only by the ONUs 4-$i$ that have an individual PON-ID identical to one attached to the message at the PON-ID field 113. That is, in the case shown in FIG. 34, the Act message 91 sent from the OLT 2 can be accepted only by the ONUs 4-1 and 4-2 (see arrows 81 and 82), and the Act message 91 cannot be accepted (discarded) by other ONUs 4-$i$ because of the disagreement between the PON-IDs.

Figure 33:
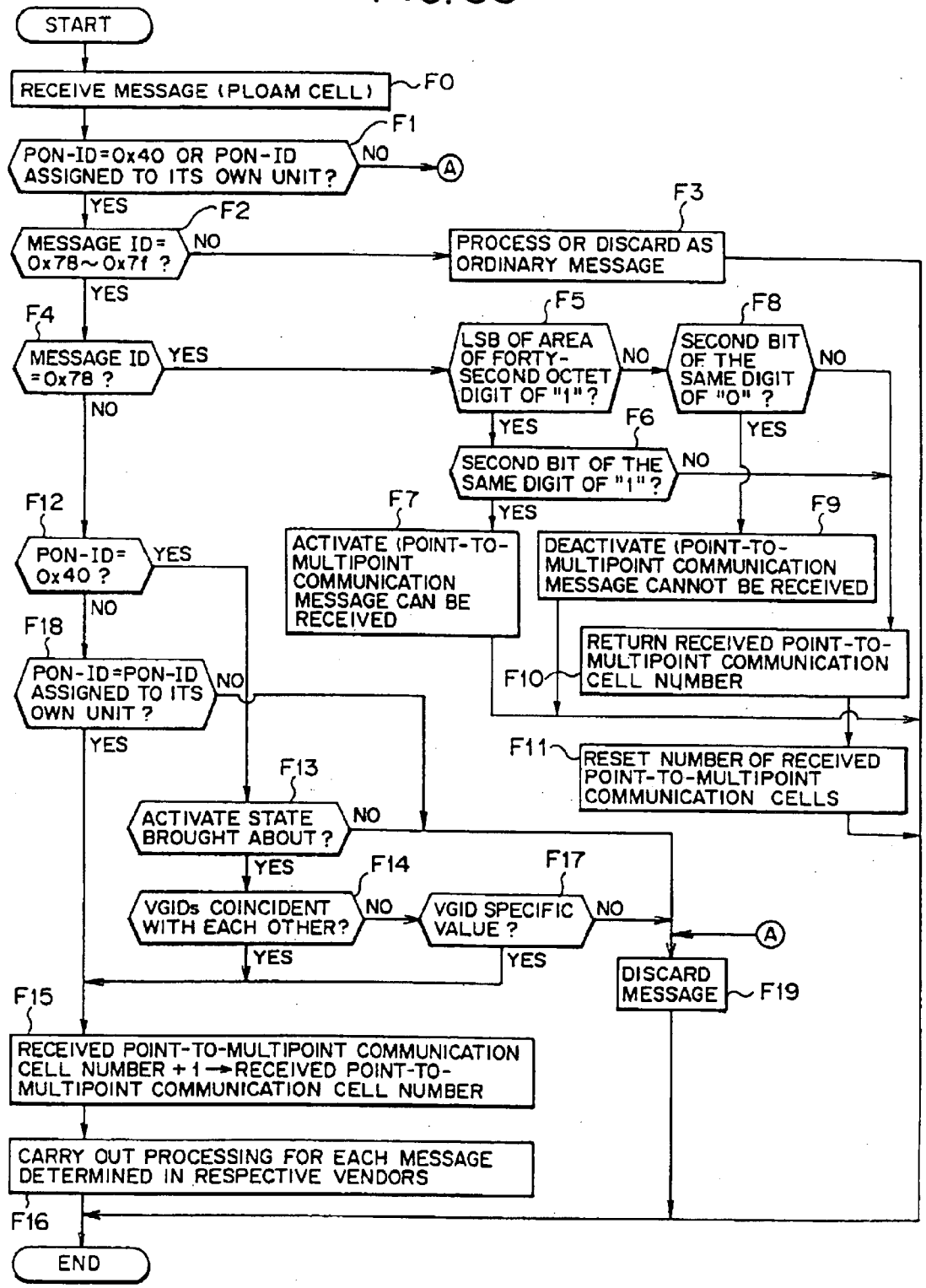
FIG. 33 is a flowchart for explaining an operation of the ONU shown in FIG. 32.

In this way, in the ONUs 4-1 and 4-2 manufactured by Company A, the VGID flag (H) and the VGID-A are held in the Act/Dact-VGID holding unit 73-2, and hence a mode of Act state is taken place (YES routes of respective steps of from F1 to F6 and step F7 shown in FIG. 33). In other ONUs 4-$i$, a mode of Dact state is taken place upon processing the point-to-multipoint VSM 93 attached with the VGID-A.

When each of the subscriber-side units is placed in the above-described mode, the OLT 2 maps a software (SW) to be received by the ONUs 4-1 and 4-2 manufactured by Company A on the field of message contents 126 and attaches the aforesaid VGID-A at the VGID field 125, thereby to create a point-to-multipoint VSM (point-to-multipoint communication cell) 93. Thereafter, the station-side unit transmits the resultant point-to-multipoint message 93 (see timing point T3 in FIG. 34).

The point-to-multipoint communication cell 93 attached with the VGID-A is delivered to all of the ONUs 4-$i$. However, since the ONUs 4-$i$ other than the ONUs 4-1 and 4-2 are placed in the mode of Dact state, the point-to-multipoint communication cell 93 is neglected (discarded) (see NO route at step F13 shown in FIG. 33 to step F19). Conversely, the point-to-multipoint communication cell 93 can be accepted only by the ONUs 4-1 and 4-2 (from YES routes at steps F13 and F14 to steps F15 and F16; see arrow 83 in FIG. 34).

Meanwhile, according to the arrangement of the OLT 2 of the subject embodiment, even when the ONUs 4-1 and 4-2 are designated (assigned with the VGID) as a component constituting a group of units, and thereafter point-to-multipoint communication is carried out by using the VGID, other ONUs 4-$i$ manufactured by a different vendor can be designated (i.e., assigned with the VGID) as a component constituting a group of units in a parallel fashion.

That is, as for example shown at timing point T4 in FIG. 34, the OLT 2 creates an Act message 91 (an individual PON-ID of PON-ID field 113=ONU 4-4) so as to assign an unused VGID [VGID-C ($\neq$VGID-A$\neq$a specific VGID: e.g., "$0\times22_H$")] to the ONU 4-4 manufactured by Company C, and transmits the created message.

This Act message 91 is accepted only by the ONU 4-4 having the PON-ID coincident to one attached to the message, with the result that the unit is brought into a mode of Act state. Similarly, the OLT 2 maps a software (SW) to be received by the ONU 4-4 manufactured by Company C on the field of message contents 126 and attaches the aforesaid VGID-C at the VGID field 125, thereby to create a point-to-multipoint communication VSM 93. Thereafter, the station-side unit transmits the resultant point-to-multipoint communication message (see timing point T5 in FIG. 34). This point-to-multipoint communication VSM 93 is accepted only by the ONU 4-4 having the VGID coincident to one attached to the message (see arrow 85 in FIG. 34).

At this time, although the ONUs 4-1 and 4-2 are placed in the mode of Act state, disagreement is brought about in VGID (see YES route at step F13 shown in FIG. 33, step F14 and NO route of F17). Therefore, the point-to-multipoint communication cell 93 is neglected (discarded). Also, the ONU 4-3 is placed in the mode of Dact state, the point-to-multipoint communication cell 93 is discarded in a similar manner.

As described above, if ONUs 4-$i$ other than ONUs 4-$i$ which have been already designated as a component constituting a group of units are additionally designated as a component constituting a group of units, an unused VGID is utilized. In other words, it is possible to designate the other ONUs 4-$i$ as a component constituting a group of units in a parallel manner only by changing the VGID without canceling the assignment on a VGID which has been already assigned, assigning a VGID again to the aforesaid ONU vendor group or without doing any similar operation.

Furthermore, even if the above-described VGID assignment has been done, as shown at timing point T6 in FIG. 34, the OLT 2 can attach the aforesaid specific VGID (e.g., "01000000") to the point-to-multipoint communication cell 93 at the VGID field 125 thereof so that the point-to-multipoint communication cell 93 is accepted by all of the ONUs 4-$i$. That is, in this case, each of the ONUs 4-$i$ selects NO route at step F17 shown in FIG. 33. Therefore, the point-to-multipoint communication cell 93 sent from the OLT 2 can be normally accepted by the respective units.

At this time, the OLT 2 also confirms whether or not the point-to-multipoint communication cell 93 is normally received by the ONUs 4-$i$ as a target of message delivery (collects information indicative of the receiving state).

That is, when the OLT 2 sends the point-to-multipoint communication cell 93, the station-side unit executes the aforesaid algorism (steps from E1 to E19). At this time, as shown in (A) and (B) of FIG.35, the station-side unit inserts a reply request cell 92 into the point-to-multipoint communication cell 93 at every sending period which is regulated by the sending period timer unit 63-3, and sends the resultant cell to each subscriber-side unit. Also, as shown in (C) and (D) of FIG. 35, the station-side unit forces the sending cell number holding unit 68 to hold the count of the sending cell number counter unit 63-6 each time the reply request cell 92 is outputted. Thereafter, the station-side unit resets the sending cell number counter unit 63-6 to its initial state (see timing points T7 and T8). In the above discussion on the case of FIG. 35, it is assumed that targets to which the point-to-multipoint communication cell 93 is transmitted are the same ONUs 4-$i$.

Figure 35:
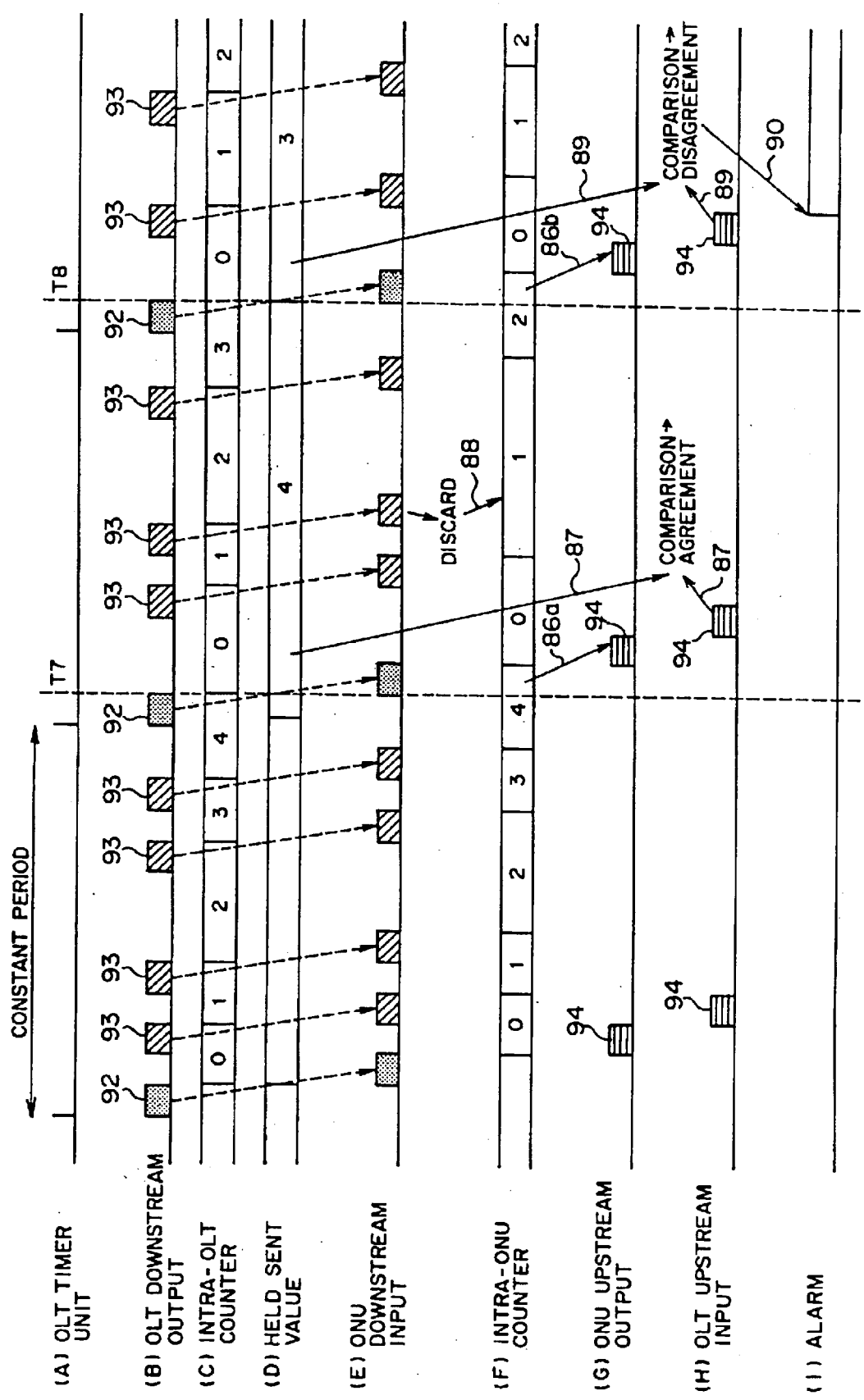

On the side of ONU 4-$i$, as shown in (E) and (G) of FIG. 35, the number of the point-to-multipoint communication cells 93 counted (normally accepted) by the cell number counter unit 74-2 so far is returned with the monitoring cell 94 to the OLT 2 each time the reply request cell 94 is received from the OLT 2 (see arrows 86$a$ and 86$b$).

For example, if all of the point-to-multipoint communication cells 93 (four cells) transmitted from the OLT 2 are normally accepted by the targeted ONUs 4-$i$ by timing point T7 of FIG. 35, the ONU 4-$i$ creates a monitoring cell 94 attached with the count (i.e., four) and returns the same to the OLT 2 at the timing point when the subscriber-side unit receives the next reply request cell 92 (see arrow 86$a$).

As shown in (H) of FIG. 35, when the OLT 2 receives the monitoring cell 94, the comparing unit 69 compares the count (four) attached to the cell with the count held in the sending cell number holding unit 68 (see arrow 87). In this case, both of the counts are four, i.e., they are coincident with each other. Therefore, the OLT 2 can recognize that all of the point-to-multipoint communication cells 93 sent from the unit itself have been normally received by the targeted ONU 4-$i$ (and hence the alarming detecting unit 66-$i$ does not generate an alarm message).

Conversely, if for example it is detected that one of the point-to-multipoint communication cell 93 (three cells) transmitted from the OLT 2 suffers from disagreement in VGID or an error in transmission path (CRC) during a time period between timing point T7 and timing point T8 in FIG. 35, with the result that the cell is discarded by the target ONU 4-$i$, then disagreement between the counts will be detected as the result of count comparison similar to that described above (see arrow 89). Therefore, as shown in (I) of FIG. 35, the alarming detecting unit 66-$i$ (comparing unit 69) generates an alarm message (see arrow 90).

As described above, according to the ATM-PON 1 of the subject second embodiment, if the ONUs 4-$i$ manufactured by the same vendor are assigned with the same VGID by delivering the Act message 91 so that the ONUs 4-$i$ manufactured by the same vendor are designated as a component constituting a group of units, and thereafter the OLT 2 sends the point-to-multipoint VSM 93 attached with the VGID to the subscriber-side units, then the point-to-multipoint VSM 93 will undergo receiving and processing only in the ONUs 4-$i$ that are designated as the component constituting the group of units. Accordingly, also in the subject embodiment, even if an ONU 4-$i$ manufactured by a vendor different from that of the OLT 2 receives the point-to-multipoint VSM 93, it is possible to keep the subscriber-side unit away from doing an unexpected erroneous operation which tends to bring about in a conventional arrangement.

Moreover, if the ONUs 4-$i$ are once made into a group of units, VSMs having the same contents can be delivered to each of the ONUs 4-$i$ by a single shot of transmission of the point-to-multipoint VSM 93. Therefore, information delivering operation such as SWDL can be carried out without sending the information to each of the ONUs 4-$i$ one by one as in the conventional arrangement. Accordingly, it becomes possible to remarkably suppress the processing load of the OLT 2 or the network traffic.

Furthermore, according to the subject embodiment, ONUs 4-$i$ manufactured by a different vendor can be designated as a component constituting a group of units by assigning an arbitrary unused VGID to each of the targeted units. Therefore, grouping operation can be effected in parallel on units which are bound into a plurality of groups depending on the vendor, and hence, information delivering operations can also be effected in parallel on a plurality of groups of units which are bound depending on the vendor. Accordingly, it becomes possible to effect information delivering operation on components of a specified vendor group in more flexible and swift manner.

After the VGID assignment is completed, if a specific VGID indicative of point-to-multipoint communication for all of the subscriber-side units is attached to the point-to-multipoint VSM 93, all of the ONUs 4-$i$ can be made to receive the point-to-multipoint VSM 93. Therefore, it becomes possible to effect information delivering operation in more flexible manner.

Since the reply request message 92 and the monitoring message 94 are exchanged between the station-side unit and each of the subscriber-side units, the OLT 2 can confirm (monitor) the state of the ONUs 4-$i$ in receiving the point-to-multipoint VSM 93 at any time. Therefore, it becomes possible to take a countermeasure against an event that the point-to-multipoint VSM 93 cannot be normally received. Accordingly, reliability of the information delivering operation for the ONUs 4-$i$ will be remarkably improved, and it becomes easier to manage (maintain) the OLT 2 and the ONUs 4-$i$.

While the above examples have been described based on an assumption that a single unit of ONU 4-$i$ is assigned with a single information piece of VGID, it is needless to say that a unit may be assigned with two or more information pieces of VGID. That is, a single unit of ONU 4-$i$ may be designated as components respectively constituting two or more groups of units. This fact can be applied to modifications which will be described later on.

(B1) Description of First Modification of Second Embodiment

In the above embodiment, when the VGID is assigned to the ONUs 4-$i$ manufactured by the same vendor, a number of Act messages 91 corresponding to the number of ONUs 4-$i$ as a target of grouping are prepared and designation as a component constituting the group of units is independently effected. However, this operation can be effected by a single shot of Act message-91 transmission.

When the above case is brought about, on the side of OLT 2, the Act/Dact message generating unit 63-2 creates the Act/Dact message 91$a$ (reply request message 92$a$) based on an arrangement shown in FIG. 36, for example. That is, a vendor ID field 122 (area of forty-fourth to forty-seventh bytes from the head portion of the PLOAM cell) is additionally defined. Then, a vendor ID assigned to each ONU 4-$i$ in advance is acquired from the vendor information holding unit 62 (see a dotted line in FIG. 26) and attached to the message at the field 122. In the example, an area of four bytes is allocated to one vendor ID.

Figure 37:
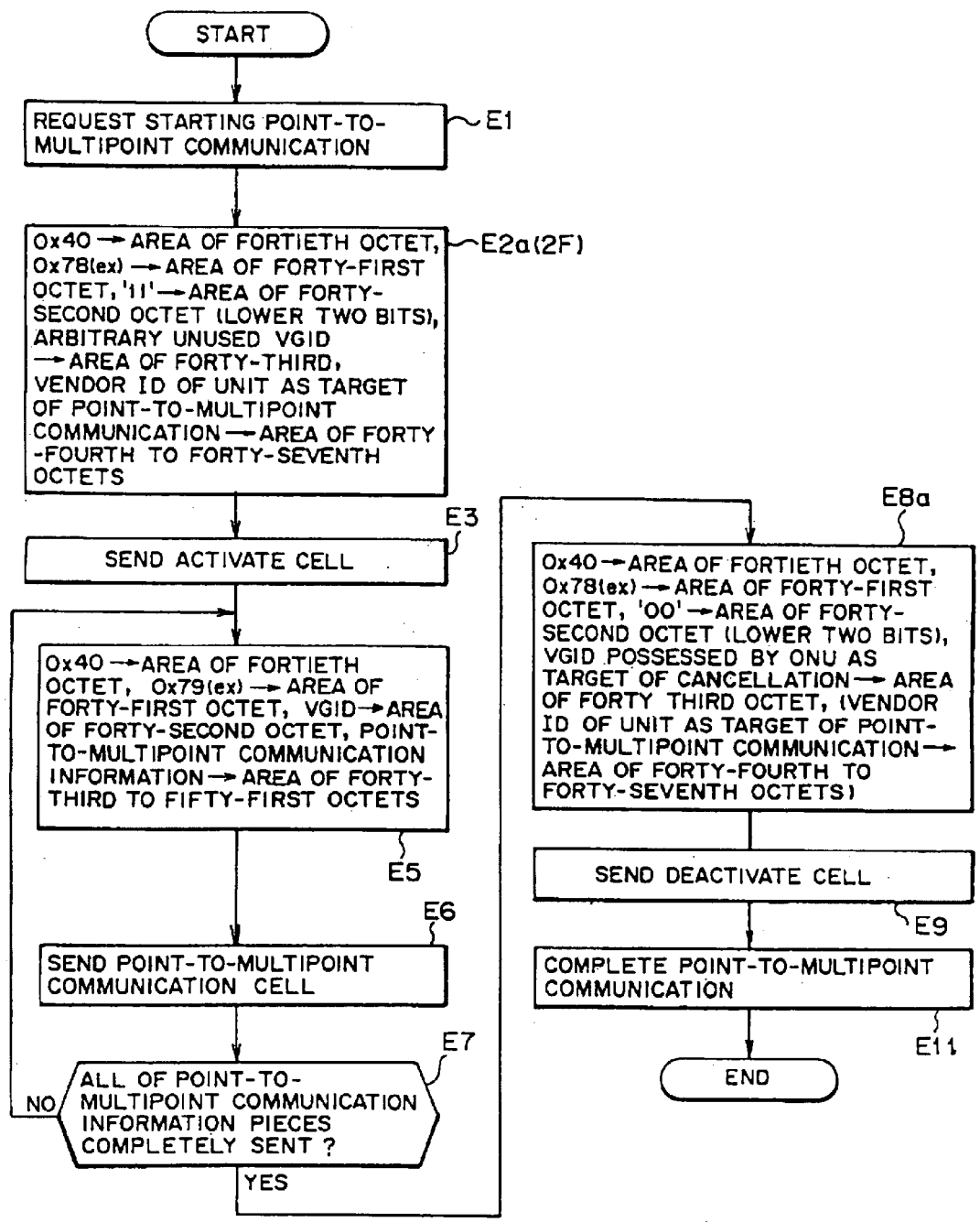
FIG. 37 is a flowchart for explaining an operation of an OLT utilized in the first modification of the second embodiment.

An operation of the OLT 2 in this case will be more concretely described with reference to a flowchart (algorism) shown in FIG. 37. When start of point-to-multipoint communication is requested by means of an input from the outside (step E1), the Act/Dact message generating unit 63-2 generates a PON-ID (0×40$_H$) of a broadcast type as information to be mapped on the PON-ID field 113 (area of fortieth byte) of the downstream PLOAM cell. Also, the message generating unit acquires a vendor ID of a vendor of units as a target of grouping from the vendor information holding unit 62, as information to be mapped on the vendor ID field 122. Then, the message generating unit outputs these information pieces to the downstream cell multiplexing unit 64 as an Act message 91a (step E2a). Information pieces attached to the message at the fields 112, 120 and 121 are handled in a manner similar to that of the Act message 91.

The downstream cell multiplexing unit 64 maps the information (Act message 91a) thus transferred from the Act/Dact message generating unit 63-2 on the downstream PLOAM cell and sends the resulting cell to the subscriber-side units as an Act cell 91a (step E3). Then, processing similar to that of steps from E5 to E7 shown in FIG. 30 is carried out in the subsequent stages, and the point-to-multipoint VSM (point-to-multipoint communication cell) 93 is delivered.

That is, the Act/Dact message generating unit 63-2 in this case has a function as a vendor identification information attaching unit 2F which executes the aforesaid step E2a to attach the inherent vendor ID of the ONU 4-i to the Act message 91a, whereby the ONUs 4-i manufactured by the same vendor can be designated as a component constituting a group of units.

Thereafter, when transmission of the point-to-multipoint communication cell 93 is completed, also the OLT 2 (Act/Dact message generating unit 63-2) effects automatic whole cancellation on the VGID. In this case, the message generating unit creates a Dact message 91a attached with a vendor ID of the ONU 4-i as a target of cancellation and sends the same (steps E8a and E9) so that the VGID assigned to the ONUs 4-i are canceled at a time.

Conversely, the side of ONU 4-i is arranged so that when the Act/Dact message 91a (reply request message 92a) is attached with a vendor ID of the unit itself at the vendor ID field 122, then the VSM terminating unit 72 recognizes that the message 91a (92a) is a message addressed to the unit itself.

Figure 38:
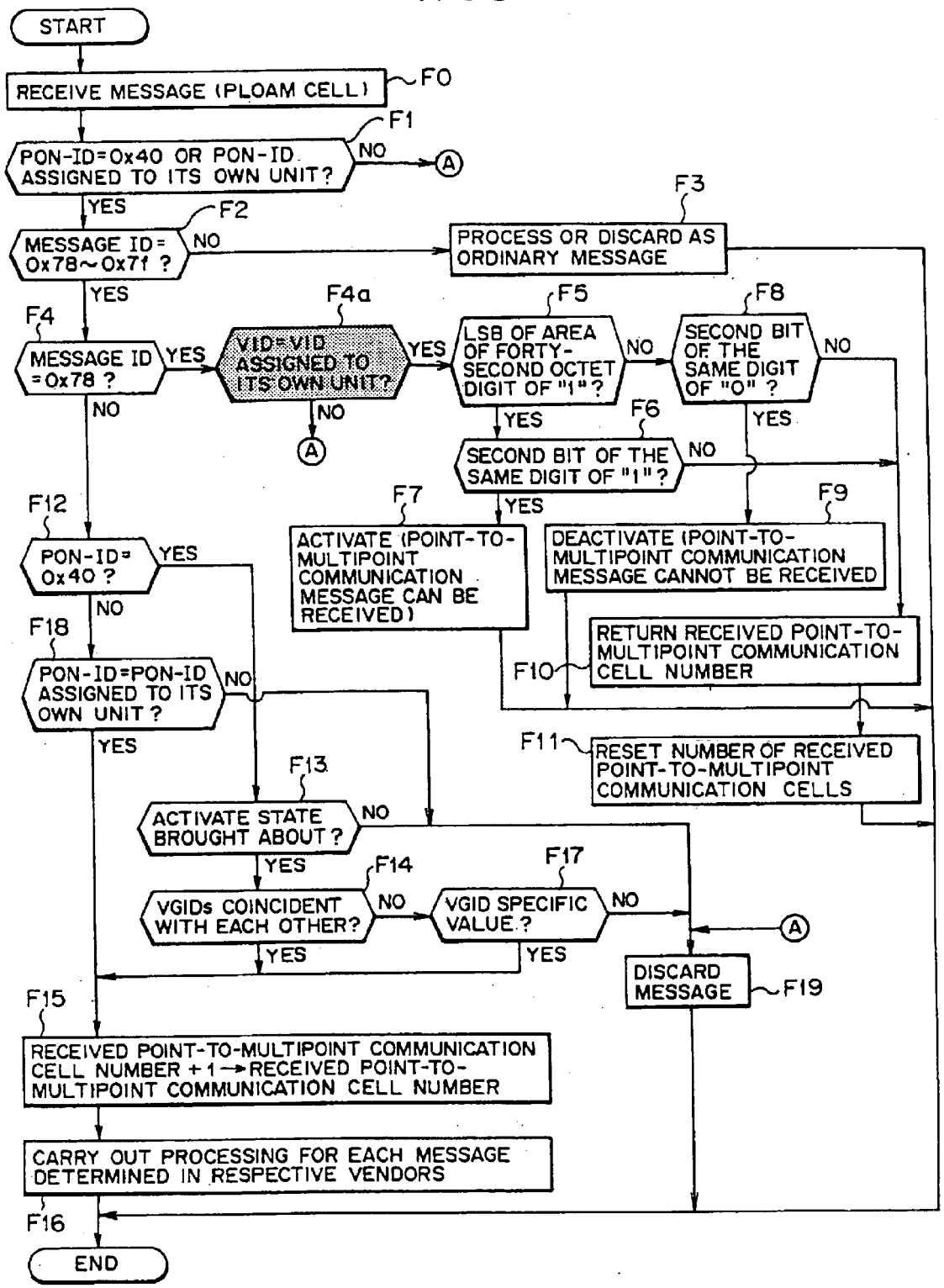
FIG. 38 is a flowchart for explaining an operation of an ONU utilized in the first modification of the second embodiment.

That is, as shown in FIG. 38, the ONU 4-i in this case operated in accordance with an algorism which is mainly composed of the aforesaid algorism described with reference to FIG. 33 and additionally provided with step F4a (see a portion applied with halftone notation) where it is examined whether or not the vendor ID attached to the Act/Dact message 91a (reply request message 92a) is coincident with the vendor ID assigned to the unit itself.

In this way, if it is determined that the vendor ID attached to the Act message 91a at the vendor ID field 122 is coincident with one assigned to the unit itself, the ONU 4-i accepts the Act message 91a (see YES route at step F4a), and the VGID attached to the VGID field 121 is held in the Act/Dact-VGID holding unit 73-2.

If the message sent from the station-side unit is a Dact message 91a, the VGID attached to the message at the VGID field 121 is deleted from the Act/Dact-VGID holding unit 73-2, and VGID assignment (grouping) is canceled. Further, if the vendor ID attached at the VGID field 121 is different from one assigned to the unit itself, the Act/Dact message 91a (reply request message 92a) is neglected (discarded) (from NO route at step F4a to step F19).

That is, the aforesaid VSM terminating unit 72 functions as a second vendor identification information comparing determining unit 4J for comparing the vendor ID attached to the Act/Dact message 91a with the vendor ID assigned to the unit itself, thereby to determine whether the two vendor IDs are coincident with each other or not. If the VSM terminating unit 72 determines that the two vendor IDs are coincident with each other, the VGID attached to the VGID field 121 is held in the Act/Dact-VGID holding unit 73-2.

Figure 39:
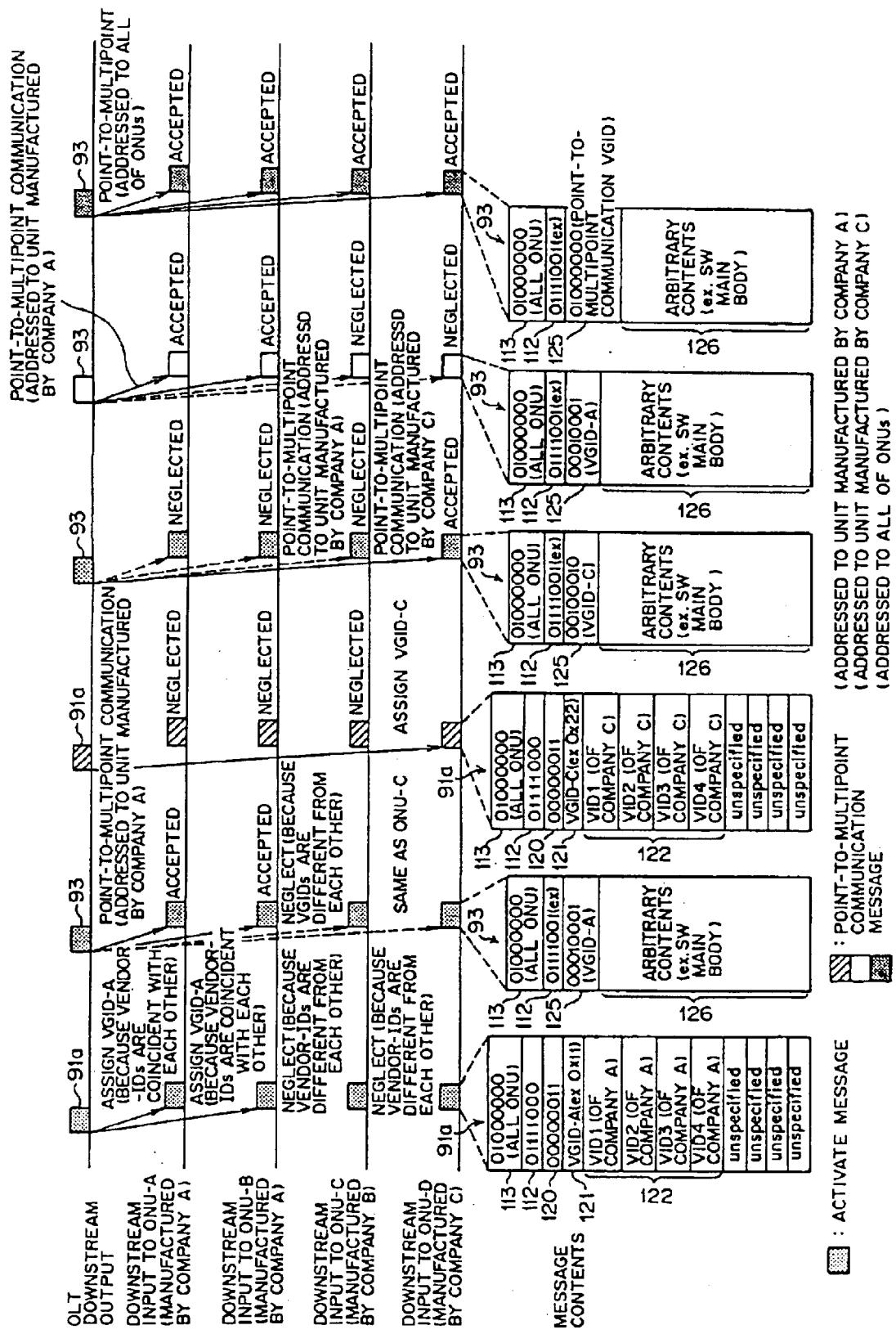
FIG. 39 is a timing chart for explaining an operation of an ATM-PON in the first modification of the second modification.

When the ATM-PON 1 as the subject first modification of the second embodiment having the above arrangement is operated as described above, as for example shown in FIG. 39, if an Act message 91a attached with the vendor ID of the ONU 4-1 and ONU 4-2 manufactured by the same vendor (e.g., Company A) is sent from the OLT 2 once, the ONUs 4-1 and 4-2 having the vendor ID coincident with one attached to the message can accept the Act message 91a and brought into a mode of Act state. Therefore, each of the ONUs 4-1 and 4-2 can be assigned with the VGID (VGID-A) by a single shot of the Act message 91a transmission.

Accordingly, the subject first modification also has the advantages similar to the above-described second modification. In addition to these advantages, it becomes possible to remarkably decrease the time it takes to assign the VGID to the ONU 4-i as a target of point-to-multipoint communication, the processing load imposed on the OLT 2, and the network traffic as compared with the second embodiment.

When it is requested to cancel the group designation, in FIG. 36, information (aa=00) indicating that the message itself is a Dact message 91a is attached at the lower two bits of the Act/Dact-ID field 120 (area of forty-second byte), the VGID of the unit as a target of cancellation is attached at the VGID field 121, and the vendor ID of a vendor as a target of grouping is attached at the vendor ID field 122.

When it is requested to confirm how many point-to-multipoint VSMs have been received so far by the ONU 4-i, in FIG. 36, information (aa=01 or 10) indicating that the message itself is a replay request message 92a is attached at the lower two bits of the Act/Dact-ID field 120 (area of forty-second byte), the VGID of the unit as a target of cancellation is attached at the VGID field 121, and the vendor ID of a vendor as a target of confirmation is attached at the vendor ID field 122.

(B2) Description of Second Modification of Second Embodiment

The assignment of the VGID in a simultaneous manner described with the first modification may have a variation as will be described below.

That is, on the side of OLT 2, as for example shown in FIG. 40, the Act/Dact message generating unit 63-2 may create an Act message 91b with a matrix (bit map) field 123 having eight bytes-information (=64 bits g0 to g63) mapped on the area of forty-fourth to fifty-first byte from the head portion of the POLAM cell so as to indicate which of the ONUs 4-i are selected from the maximum allowable number of units, or 64 units, as a target of grouping (or cancellation thereof).

Figure 41:
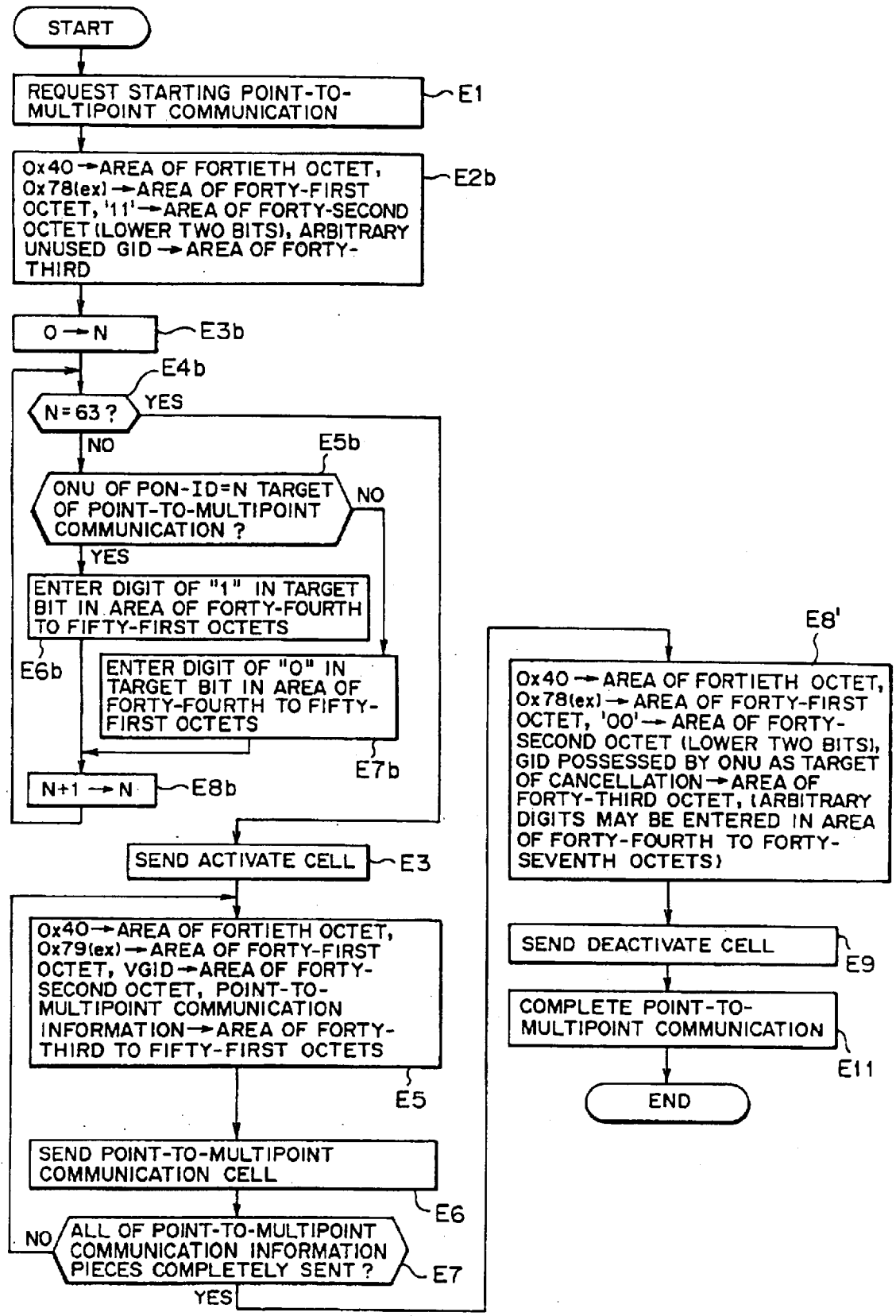
FIG. 41 is a flowchart for explaining an operation of an OLT utilized in the second modification of the second embodiment.

In more concretely, the Act message 91b is created in such a manner that the Act/Dact message generating unit 63-2 is operated in accordance with an algorism composed of steps E2b to E8b shown in FIG. 41. That is, when the Act/Dact message generating unit 63-2 receives a request of starting point-to-multipoint communication (step E1), initially, the message generating unit creates a PON-ID (0×40$_H$) of a broadcast type as information to be mapped on the PON-ID field 113 (area of fortieth byte) of the downstream PLOAM cell, information ($0 \times 78_H$) indicating that the message itself is a VSM as information to be mapped on the message ID field 112 (area of forty-first byte), and information (aa=11) indicating that the message itself is an Act message 91 as information to be mapped on the lower two bits of the Act/Dact-ID field 120 (area of forty-second byte). Further, the message generating unit accesses the VGID holding unit 63 to acquire an arbitrary unused VGID as information to be mapped on the VGID ID field 121 (step E2b).

Further, the Act/Dact message generating unit 63-2 initializes a parameter n for bit (g0 to g63) counting (n←0) (step E3b). Thereafter, the message generating unit generates a bit gn (grouping="1") as information to be mapped on the area of forty-fourth to fifty-first byte (matrix field 123) from the head portion of the PLOAM cell while incrementing the parameter n by one (step E8b) until the parameter becomes n=63 (until YES route is selected at step E4b).

That is, the Act/Dact message generating unit 63-2 confirms whether or not the ONU 4-i corresponding to PON-ID=n is an ONU 4-i as a target of point-to-multipoint communication (grouping) (step E5b). If it is determined that the unit is a target of grouping, the message generating unit generates a digit of "1" as the target bit gn to be mapped on the area of forty-fourth to fifty-first byte (from YES route at step E5b to step E6b). If it is determined that the unit is not a target of grouping, the message generating unit generates a digit of "0" as the target bit gn to be mapped on the area of forty-fourth to fifty-first byte (from NO route at step E5b to step E7b).

If the aforesaid parameter reaches n=63 (YES route is selected at step E4b), the message generating unit creates an Act message 91b which contains the respective information pieces generated at the aforesaid step E2b and in which, of the bits of g0 to g63 of the area of forty-fourth to fifty-first byte (matrix field 123), a digit of "1" is entered in the bit gn of the ONU 4-i as a target of grouping.

Figure 30:
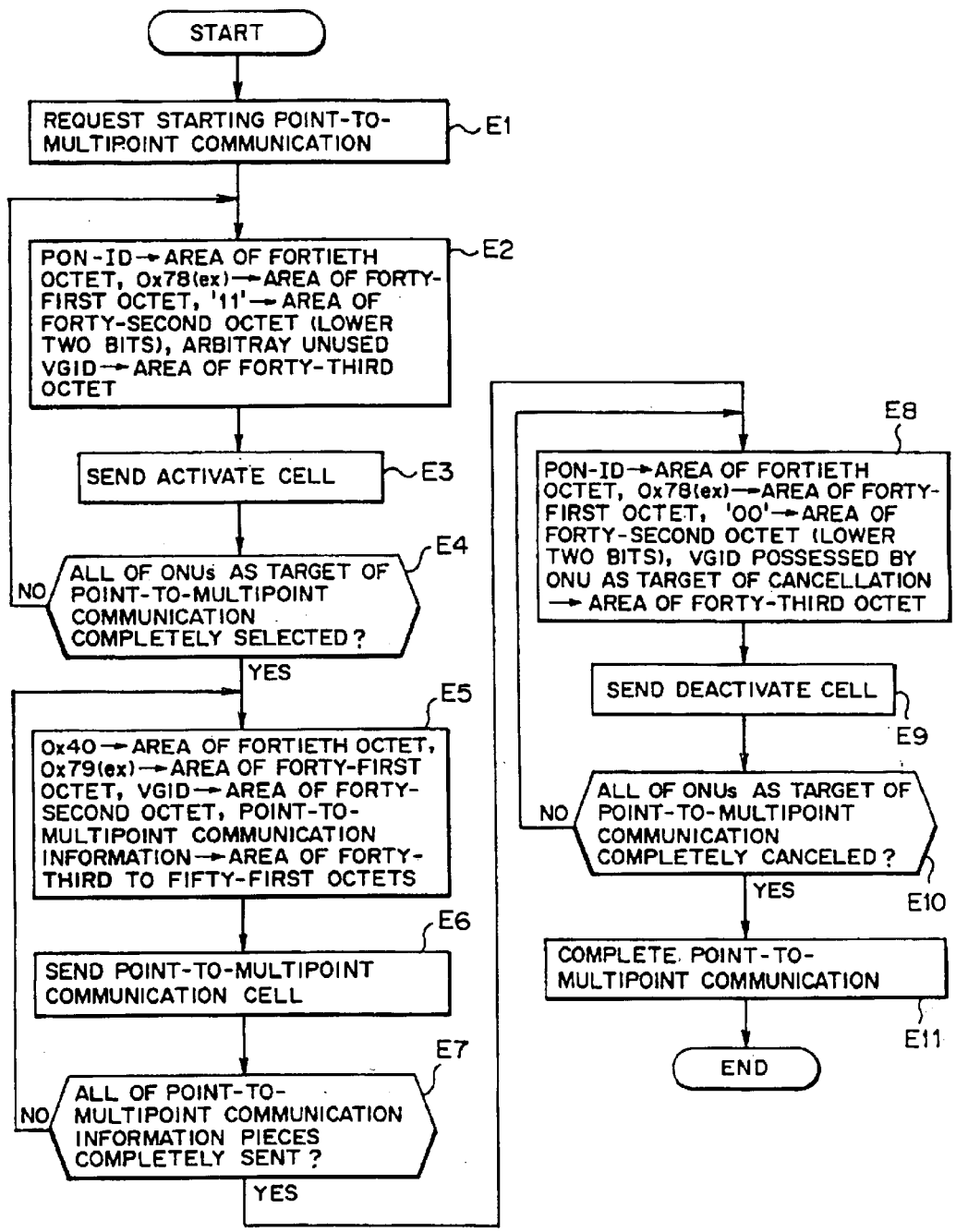
FIGS. 30 and 31 are each flowchart for explaining an operation of the OLT shown in FIG. 26.

In the subsequent steps, similarly to the algorism shown in FIG. 30, the downstream cell multiplexing unit 64 maps the Act message 91b created as described above on the PLOAM cell, and sends the resulting cell to the ONU 4-i to the Act cell 91b. If a message to be created is a Dact message 91b, a VGID of a unit as a target of cancellation can be attached at the VGID field 121 so as to bring the targeted ONU 4-i into the mode of Dact state. Therefore, the matrix field 123 may have any arbitrary value (see step E8' in FIG. 41).

Figure 42:
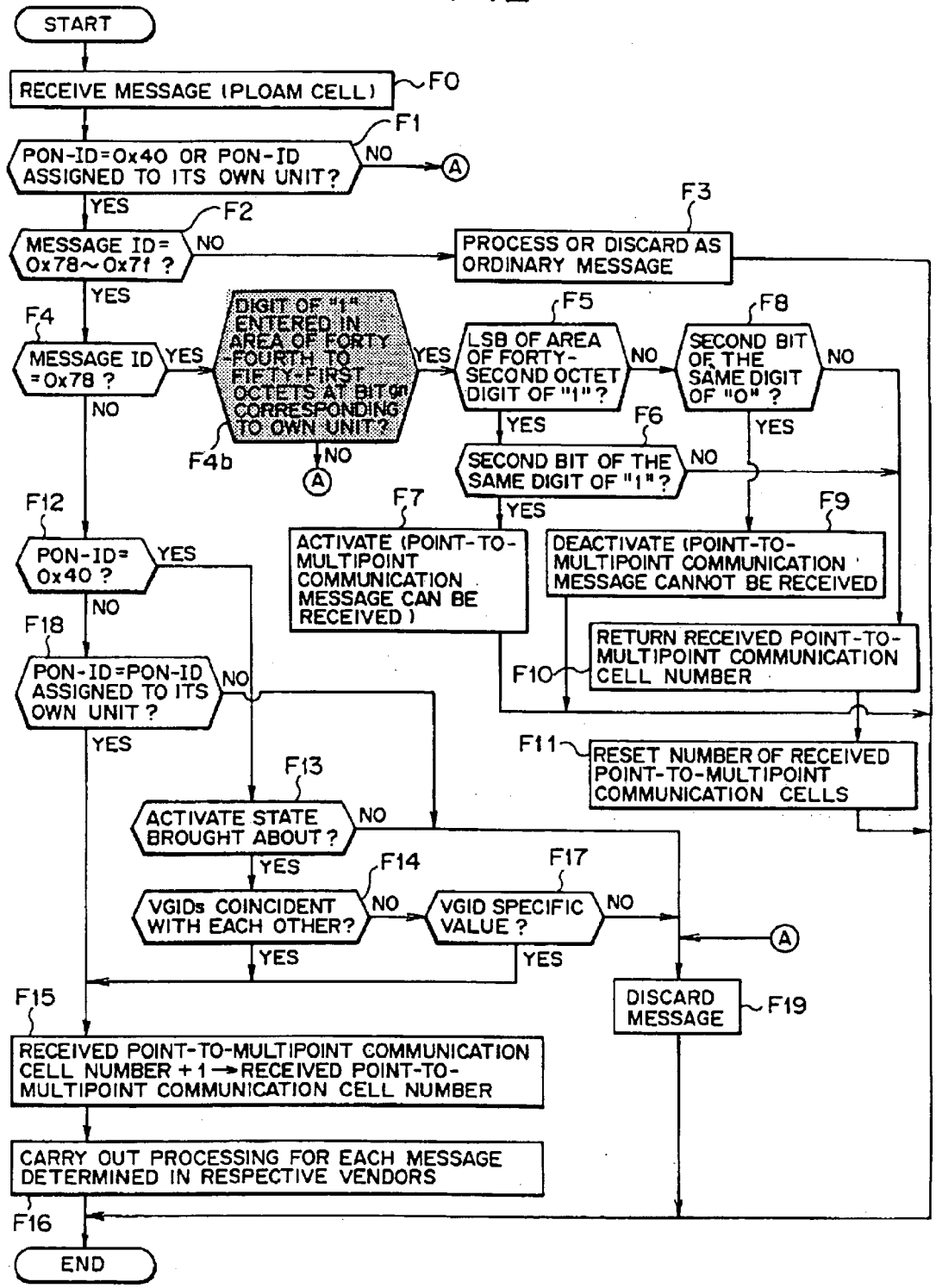
FIG. 42 is a flowchart for explaining an operation of an ONU utilized in the second modification of the second embodiment.

On the side of ONU 4-i, as shown in FIG. 42, the VSM terminating unit 72 refers to the matrix field 123 (area of forty-fourth to fifty-first byte) of the received message (downstream PLOAM cell) so as to confirm whether the bit of gn corresponding to the individual PON-ID of the unit itself is a digit of "1" or not (step F4b: see a portion applied with halftone notation). Thus, it is determined whether the received message (Act message 91b) is addressed to the unit itself or not. Other processing steps (algorism) of the flow-chart of FIG. 42 is similar to those described with reference to FIG. 33.

As described above, if it is determined that the bit of gn corresponding to the individual PON-ID of the unit itself of the matrix field 123 is a digit of "1", the ONU 4-i accepts the Act message 91b (YES route of step F4b) and the VGID attached to the Act message 91b at the VGID field 121 is held in the Act/Dact-VGID holding unit 73-2 (Act state). Conversely, if the bit of gn corresponding to the individual PON-ID of the unit itself of the matrix field 123 is a digit of "0", the Act message 91b is neglected (discarded) (from NO route at step F4b to step F19).

Now discussion is made on a concrete case in which the ONUs 4-1 and 4-2 are manufactured by Company A and numerals of "4" and "10" are assigned to the units as an individual PON-ID, respectively. Further, it is requested that the same VGID (VGID-A) is assigned to these units simultaneously. In this case, the OLT 2 creates an Act message 91b of a broadcast type in which a digit of "1" is entered in bit g4 and bit g10 and a digit of "0" is entered in all of the remaining bits gn of the matrix field 123 shown in FIG. 40, and thereafter sends the resultant message to the subscriber-side units.

When the ONU 4-i receives the Act message 91b, the unit refers to the matrix field 123 of the message so as to examine whether a digit of "1" is entered in the bit of gn corresponding to the individual PON-ID of the unit itself. Thus, only the ONUs 4-1 and 4-2 that have the individual PON-ID corresponding to bit g4 and bit g10 can accept the Act message 91b, with the result that the units are brought into the mode of Act state.

As described above, also in the subject second modification, the VGID can be assigned to the units simultaneously. Therefore, in addition to the advantages similar to those of the above-described second embodiment, processing load imposed on the OLT 2 and the network traffic can be more remarkably suppressed as compared with the second embodiment.

Also in this case, when it is requested to confirm the number of VSMs received by the ONU 4-i in a point-to-multipoint communication fashion, as shown in FIG. 36, the message is created in such a manner that information (aa=01 or 10) indicating that the message is a reply request message 92b is entered in the lower two bits of the Act/Dact-ID field 120 (area of forty-second byte), a VGID of a unit as a target of confirmation is attached to the VGID field 121, and the matrix field 123 is made to have a digit of "1" entered in bit gn corresponding to the individual PON-ID of the ONU 4-i as a target of confirmation.

Meanwhile, the above-described scheme of assigning the VGID in a simultaneous fashion effected on the subject second modification is not limitedly applied to a case in which all of the targeted ONUs 4-i are manufactured by the same vendor. That is, this scheme can be applied to a case in which the ONUs 4-i manufactured by different vendors are to be designated as a component constituting a group of units. In other words, if there is any ONU 4-i which is manufactured by a vendor different from that of the OLT 2 but supports the same VSM processing function as that of an ONU 4-i manufactured by the same vendor as that of the OLT 2, that ONU 4-i can be designated as a component constituting the group of units.

For example, if the ONU 4-3 manufactured by Company B supports a function similar to that of the ONU 4-1 manufactured by Company A, both of the ONU 4-1 and ONU 4-3 can be designated a component constituting the same group [i.e., the same group ID (GID) may be assigned to both of the units].

Figure 43:
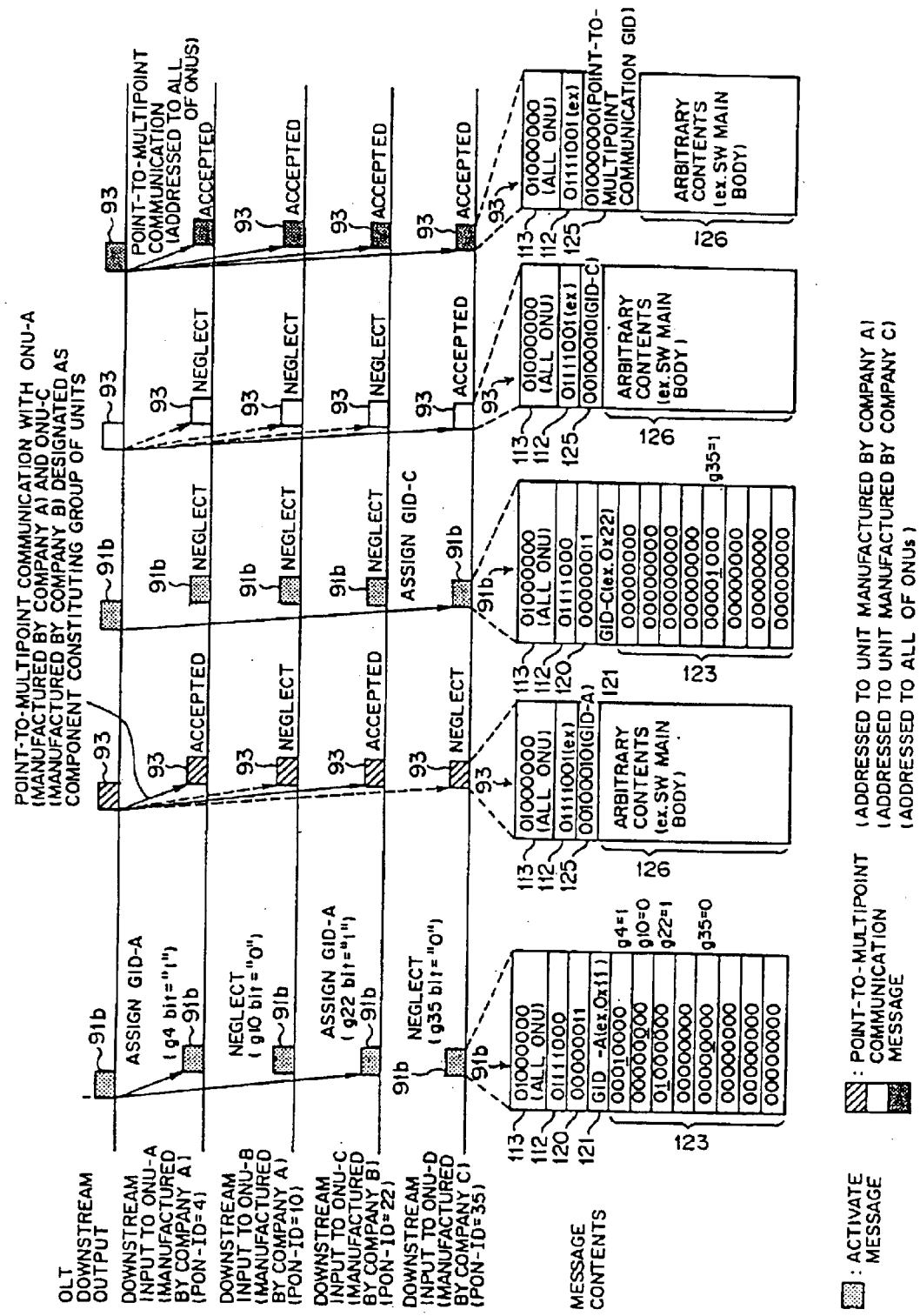
FIG. 43 is a timing chart for explaining an operation of an ATM-PON in the second modification of the second embodiment.

Now an assumption is introduced such that, as shown in FIG. 43, the individual PON-ID of the ONUs 4-1 and 4-2 manufactured by Company A are "4" and "10", respectively, the individual PON-ID of the ONU 4-3 manufactured by Company B is "22", and the individual PON-ID of the ONU 4-4 manufactured by Company D is "35". In this case, the OLT 2 creates an Act message 91b of a broadcast type in which a digit of "1" is entered in bit g4 and bit g22 and a digit of "0" is entered in all of the remaining bits gn of the matrix field 123 shown in FIG. 40, and thereafter sends the resultant message to the subscriber-side units.

Also in this case, when each of the ONUs 4-*i* receives the Act message 91*b*, the unit refers to the matrix field 123 of the Act message 91*b* so as to examine whether a digit of "1" is entered in the bit of gn corresponding to the individual PON-ID of the unit itself. Thus, only the ONUs 4-1 and 4-3 that have the individual PON-ID corresponding to bit g4 and bit g22 can accept the Act message 91*b*, with the result that the units are brought into the mode of Act state. Processing steps executed thereafter are similar to those described with reference to FIGS. 34, 39 and so on.

As described above, even if there is an ONU 4-*i* which is manufactured by a vendor different from that of the OLT 2 but supports the same VSM processing function as that of an ONU 4-*i* manufactured by the same vendor as that of the OLT 2, the restriction of the same vendor is not applied. That is, an ONU 4-*i* manufactured by a different vendor can be designated as a component constituting the same group. Accordingly, information delivery operation such as SWDL to the ONUs 4-*i* can be carried out in a more flexible manner.

If the grouping of units is to be cancelled or the number of point-to-multipoint VSM 93 received at the ONU 4-1 is to be confirmed (see step E18 in FIG. 31), the processing therefor can be carried out in a manner similar to that described above.

(B3) Description of Third Modification of Second Embodiment

Figure 44:
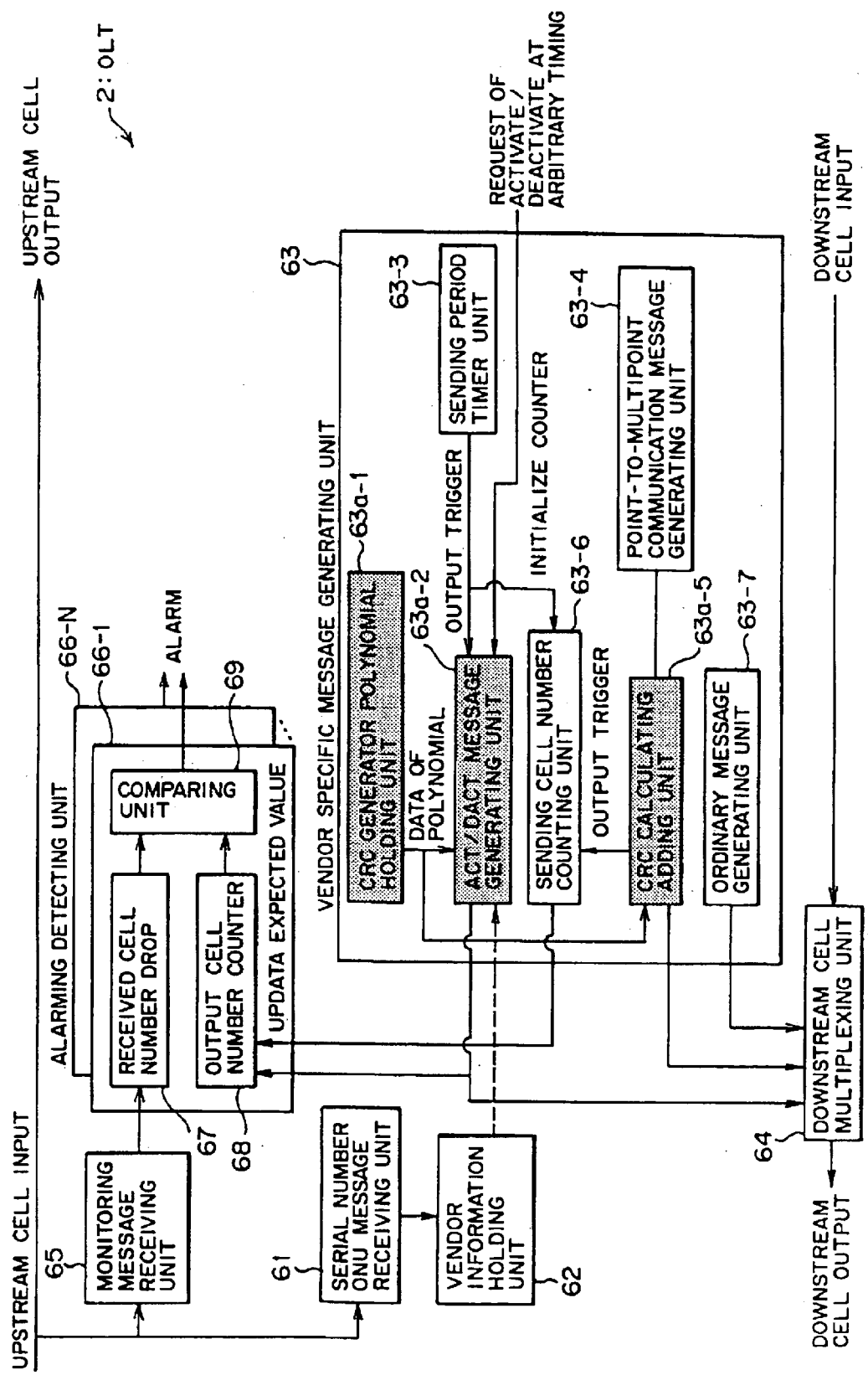
FIG. 44 is a block diagram showing an arrangement of an OLT as a third modification of the second embodiment.

FIG. 44 is a block diagram showing a third modification of the OLT 2 described above with reference to FIG. 26. The arrangement of the OLT 2 shown in FIG. 44 is different from that shown in FIG. 26 in the following points. That is, the VGID holding unit 63-1, the Act/Dact message generating unit 63-2 and VGID adding unit 63-5 are replaced with a CRC generator polynomial holding unit 63*a*-1, an Act/Dact message generating unit 63*a*-2, and a CRC calculating adding unit 63*a*-5 (see portions applied with halftone).

The CRC generator polynomial holding unit 63*a*-1 is a unit for holding information about an inherent CRC generator polynomial (hereinafter sometimes referred to as "polynomial") of each vendor instead of the VGID. For example, it is assumed that a CRC generator polynomial to be assigned to a certain ONU 4-*i* is $X^8+X^7+X^4+X^3+1$. In this case, this generator polynomial holding unit can hold several kinds (64 kinds at maximum) of information pieces each of which is formed into a set of nine-bit digits like "110011001 (0×CD$_H$)" in which coefficients of respective terms are put in an descending order. In this case, since the coefficient of term $X^0$ is always 1, one bit can be obviated and remaining eight bits (i.e., one octet) may be held.

The Act/Dact message generating unit 63*a*-2 is a unit which attaches an arbitrary unused polynomial (the aforesaid eight-bit numerical information) held in the CRC generator polynomial holding unit 63*a*-1 to the cell at the field 121 having the aforesaid VGID entered therein (area of forty-third byte from the head portion of the PLOAM cell: see FIG. 27A), as shown in FIG. 45 (hereinafter the field attached with the generator polynomial is referred to as a CRC generator polynomial field 124), whereby an Act/Dact message 91*c* (reply request message 92*c*) is created. Other functions of the Act/Dact message generating unit 63*a*-2 except for that described above are similar to those of the Act/Dact message generating unit 63-2.

In other words, according to the arrangement of the subject third embodiment, the ONUs 4-*i* as a target of point-to-multipoint communication (grouping) are assigned with information about the CRC generator polynomial instead of the VGID. In FIG. 45, the remaining portions of the message, or the field 113, 112, and 120 are attached with information pieces similar to those of the aforesaid Act/Dact message 91 (see 27A and 27B). Further, if the abbreviated representation in which one bit amount is obviated is not utilized for expressing the polynomial, an area of a couple of octets (e.g., an area of forty-third and forty-fourth bytes from the head portion of the PLOAM cell) may be prepared for storing the polynomial.

Further, the CRC calculating adding unit 63*a*-5 is a unit for attaching information specified by the polynomial instead of the VGID to the point-to-multipoint VSM 93 which is created by the point-to-multipoint message generating unit 63-4. As for example shown in FIG. 46, in addition to the existing CRC byte, an area of fifty-first byte from the head portion of the PLOAM cell is defined as a CRC field 125*a*, and this field 125*a* is attached with a result (remainder) deriving from the CRC arithmetic operation on the message contents 126 with a polynomial which is held in the CRC generator polynomial holding unit 63*a*-1 and is assigned to the ONU 4-*i* as a target of point-to-multipoint communication. Thus, the point-to-multipoint communication VSM 93*a* is created.

In more concretely, it is assumed that the polynomial is the above-introduced one, or $X^8+X^7+X^4+X^3+1$. In this case, the information bits (72 bits) of the message contents 126 is multiplied with $X^8$ and the resultant product is divided by the polynomial, or $X^8+X^7+X^4+X^3+1$. Then, the remainder thereof is attached to the message at the CRC field 125. In FIG. 46, the remaining portions of the message, or the field 113, 112, and 126 are attached with information pieces similar to those of the aforesaid point-to-multipoint VSM 93 (see 28).

In this way, as will be described later on, the unit on the receiving side (ONU 4-*i*) effects the CRC arithmetic operation on the information stored in the area between the message contents 126 of the point-to-multipoint VSM 93*a* and the CRC field 125*a* (area of from forty-second to fifty-first byte from the head portion of the PLOAM cell) which is received by using the CRC generator polynomial assigned to the unit itself (ONU 4-*i*). If the result of the arithmetic operation (remainder) becomes "0", then the unit on the receiving side can determine that the point-to-multipoint VSM 93*a* is a message addressed to the unit itself.

Figure 47:
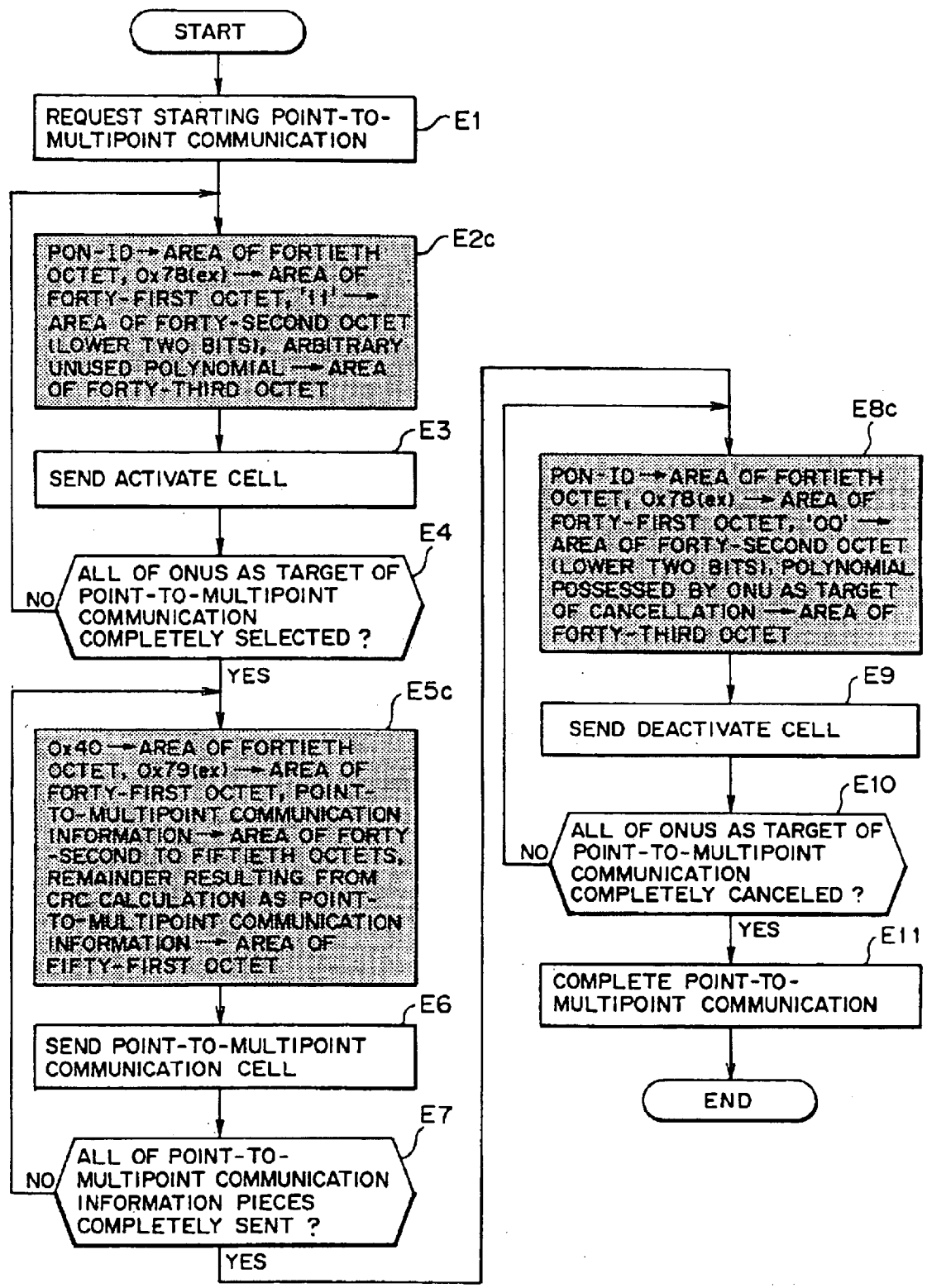
FIG. 47 is a flowchart for explaining an operation of the OLT shown in FIG. 44.

The OLT 2 as the subject third modification arranged as described above is operated in accordance with a flowchart (algorism) shown in FIG. 47, for example. That is, steps E2, E5 and E8 of the algorism described with reference to FIG. 30 are replaced with steps E2*c*, E5*c* and E8*c* which are identified by halftone notation, and these steps are executed. Thus, as described above, an Act/Dact message 91*c* (reply request message 92*c*) attached with the CRC generator polynomial instead of the VGID and a point-to-multipoint VSM 93*a* attached with the result of arithmetic operation (remainder) of the message contents 126 are created and transmitted. Other operations except for those of steps E2*c*, E5*c* and E8*c* are similar to the operations of the second embodiment described above.

Figure 48:
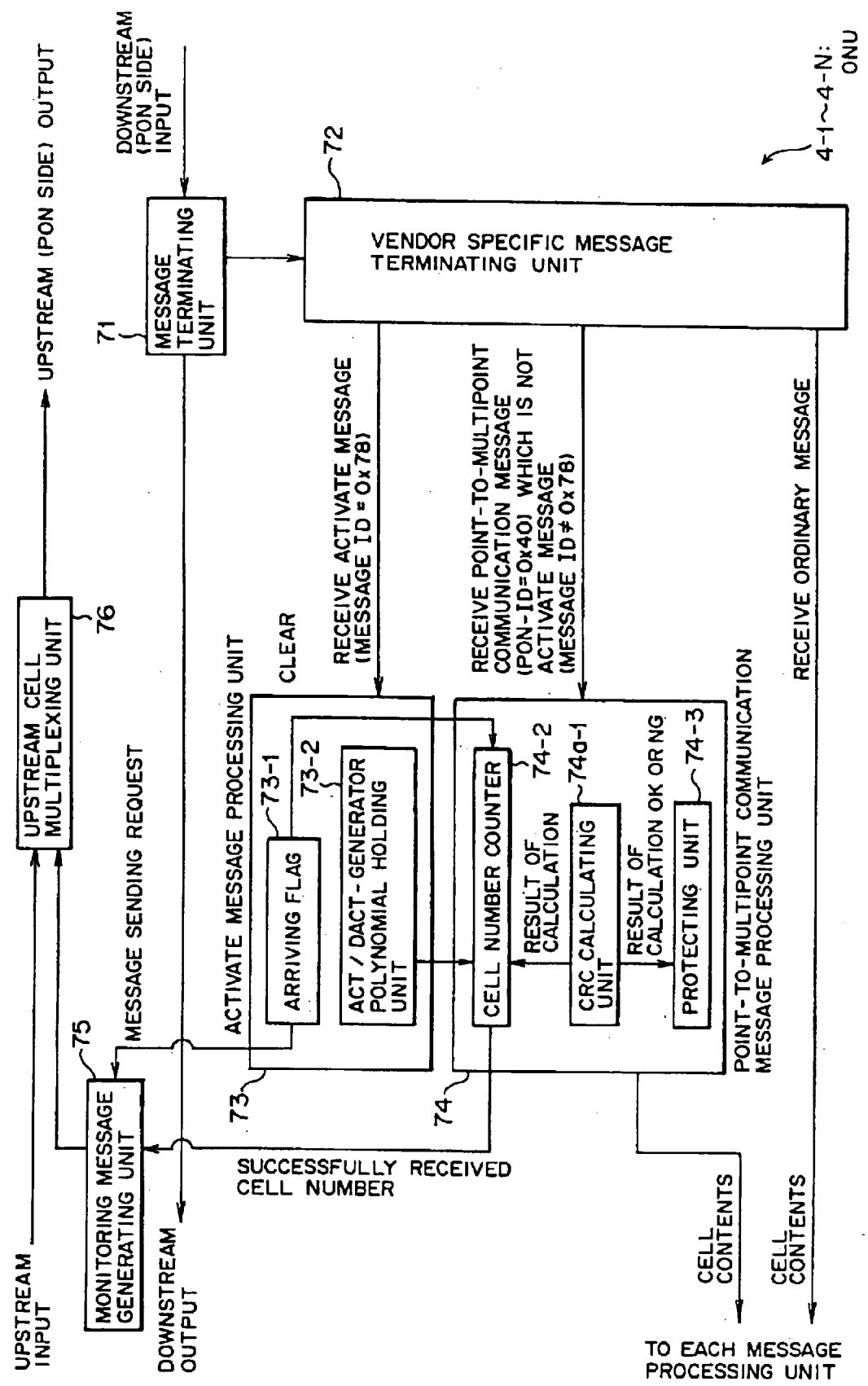
FIG. 48 is a block diagram showing an arrangement of an ONU as the third modification of the second embodiment.

Now description will be hereinafter made on an ONU 4-*i* as the third modification corresponding to the OLT 2. FIG. 48 is a block diagram showing the third modification of the ONU 4-*i* which has been described with reference to FIG. 32. As shown in FIG. 48, in order to realize a function for determining whether the point-to-multipoint VSM 93*a* using the CRC arithmetic operation is a message addressed to the unit itself or not in a manner described above, the arrangement of the ONU 4-$i$ is different from the arrangement shown in FIG. 32 in the following points. That is, as shown at blocks with halftone notation, the Act/Dact message processing unit 73 has an Act/Dact-generator polynomial holding unit 73$a$-2 instead of the Act/Dact-VGID holding unit 73-2. Also, the point-to-multipoint message processing unit 74 has a CRC calculating unit 74$a$-1 instead of the VGID comparing unit 74-1.

The Act/Dact-generator polynomial holding unit 73$a$-2 is a unit for holding a CRC generator polynomial attached to the Act message 91$a$. The CRC calculating unit 74$a$-1 is a unit for dividing the information stored in the range between the message contents 126 of the point-to-multipoint VSM 93$a$ and the CRC field 125$a$ by the CRC generator polynomial held in the Act/Dact-generator polynomial holding unit 73$a$-2 so as to effect a CRC arithmetic operation. This arithmetic operating unit also determines whether the result of the arithmetic operation becomes "0" or not.

If the CRC calculating unit 74$a$-1 yields a result of arithmetic operation of "0", then it is determined that the point-to-multipoint VSM 93$a$ is addressed to the unit itself, and the message contents 126 thereof is transferred to a message processing block on the subsequent stage (the message contents shall be subjected to protection processing before it is transferred to the subsequent stage). Conversely, if the arithmetic operating unit yields any result other than "0", then it is determined that the point-to-multipoint VSM 93$a$ is not addressed to the unit itself and discarded.

However, if the result of arithmetic operation is any value other than "0" but a specific value (fixed value) indicative of a point-to-multipoint communication for all of the subscriber-side units is attached to the CRC field 125$a$, the received VSM 93$a$ is handled as a message addressed to the unit itself. That is, also in this case, if it is requested that the point-to-multipoint VSM 93$a$ is to be delivered to all of the ONUs 4-$i$ regardless of the assigned CRC generator polynomial, the OLT 2 (Act/Dact message generating unit 63$a$-2) attaches the specific value that is determined in advance between the OLT 2 and the ONUs 4-$i$ to the CRC field 125$a$.

Figure 49:
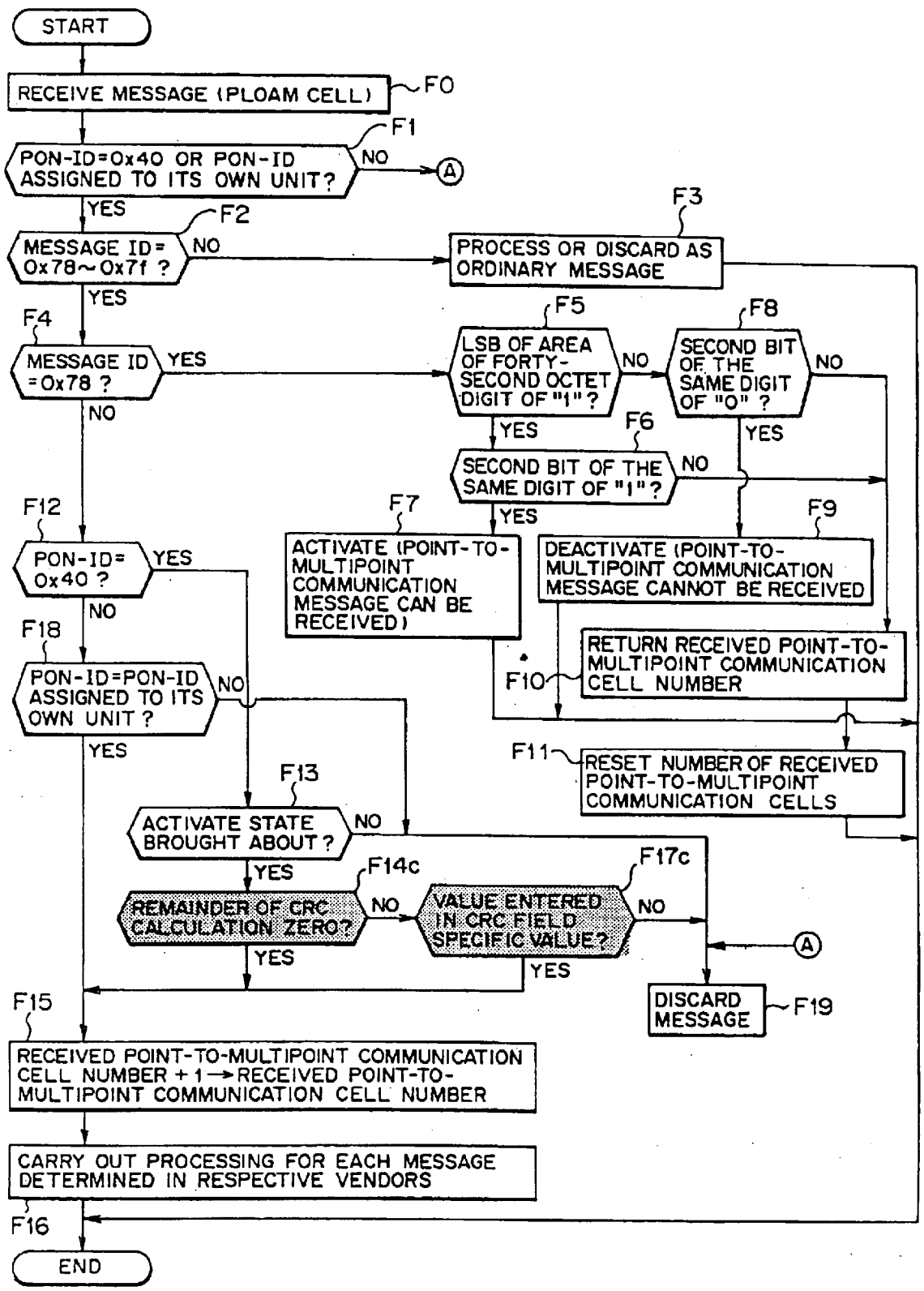
FIG. 49 is a flowchart for explaining an operation of the ONU shown in FIG. 48.

The ONU 4-$i$ as the subject third modification arranged as described above is operated in accordance with an algorism shown in FIG. 49, for example. That is, steps E14 and E17 of the algorism described with reference to FIG. 33 are replaced with steps F14$c$ and F17$c$ which are identified by halftone notation, and these steps are executed. Thus, it is determined whether the received point-to-multipoint VSM (point-to-multipoint communication cell) 93$a$ is a message addressed to the unit itself or not. Other operations except for those of steps F14$c$ and F17$c$ are similar to the operations of the second embodiment described above.

An example of concrete numeral arrangement of the CRC arithmetic operation will be hereinafter described. Initially, an assumption is introduced such that the OLT 2 assigns a CRC generator polynomial of $X^8+X^7+X^4+X^3+1$ (POLY–A=0×CD$_H$) to the ONUs 4-1 and 4-2 (see timing points T1 and T2 in FIG. 52, for example) and a CRC generator polynomial of $X^8+X^7+X^4+1$ (POLY=0×C8$_H$) to the ONU 4-4 (see timing point T4 in FIG. 52, for example). In this case, it is also assumed that the ONU 4-3 has been already assigned with a polynomial different from the aforesaid polynomials.

Figure 50:
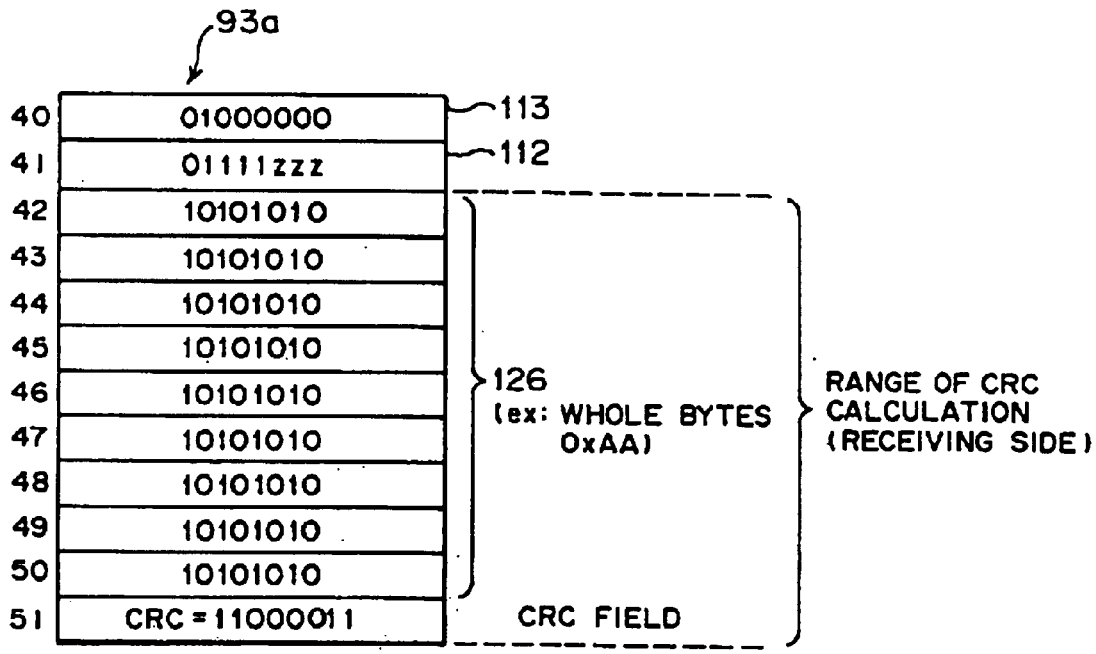
FIGS. 50 and 51 are each diagram showing an example of a format of a point-to-multipoint VSM for explaining an example of a CRC operation carried out in the third modification of the second embodiment.
Figure 51:
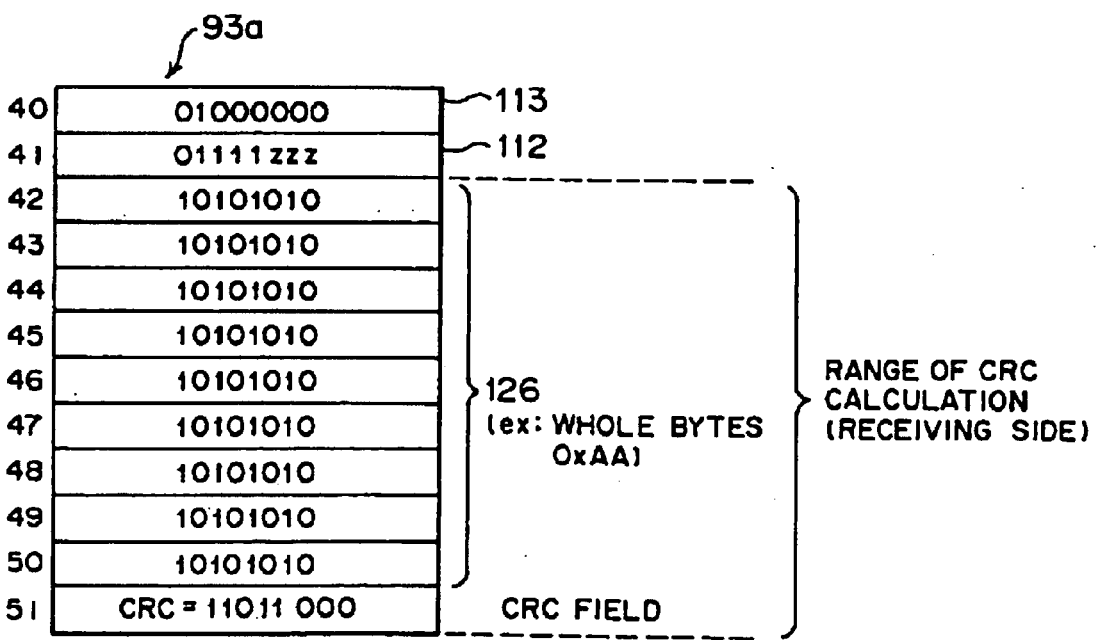

Under this condition, as for example shown in FIG. 50, it is requested that the ONUs 4-1 and 4-2 receive a point-to-multipoint VSM 93$a$ attached with information of whole bytes="10101010 (0×AA$_H$)" as a message contents 126. To this end, the OLT 2 effects the CRC arithmetic operation on the message contents 126 with the polynomial of $X^8+X^7+X^4+X^3+1$ assigned to the ONUs 4-1 and 4-2, attaches the result of the arithmetic operation (remainder)="11000011" to the point-to-multipoint VSM 93$a$ at the CRC field 125$a$ thereof and sends the resulting message (see timing point T3 in FIG. 52).

On the side of ONUs 4-1 and 4-2, the CRC arithmetic operation (division) is effected on the range between the message contents 126 and the CRC field 125$a$ of the received point-to-multipoint VSM 93$a$ by using the polynomial of $X^8+X^7+X^4+X^3+1$ assigned to the units. In these units, since the remainder will become "0", it is determined that the received point-to-multipoint VSM 93$a$ is a message addressed to the unit itself and hence the message is accepted by the units (see arrow 130 in FIG. 52).

Conversely, in the ONU 4-4, if the similar CRC arithmetic operation is effected by using the polynomial of $X^8+X^7+X^4+1$ assigned to the unit, a remainder will be "0×1B$_H$" and not "0". Therefore, the point-to-multipoint VSM 93$a$ is neglected (discarded) (see arrow 131 in FIG. 52). In the ONU 4-3, a remainder will be yielded as a result of similar CRC arithmetic operation. Therefore, the point-to-multipoint VSM 93$a$ is also neglected (discarded) (see arrow 132 in FIG. 52).

Figure 52:
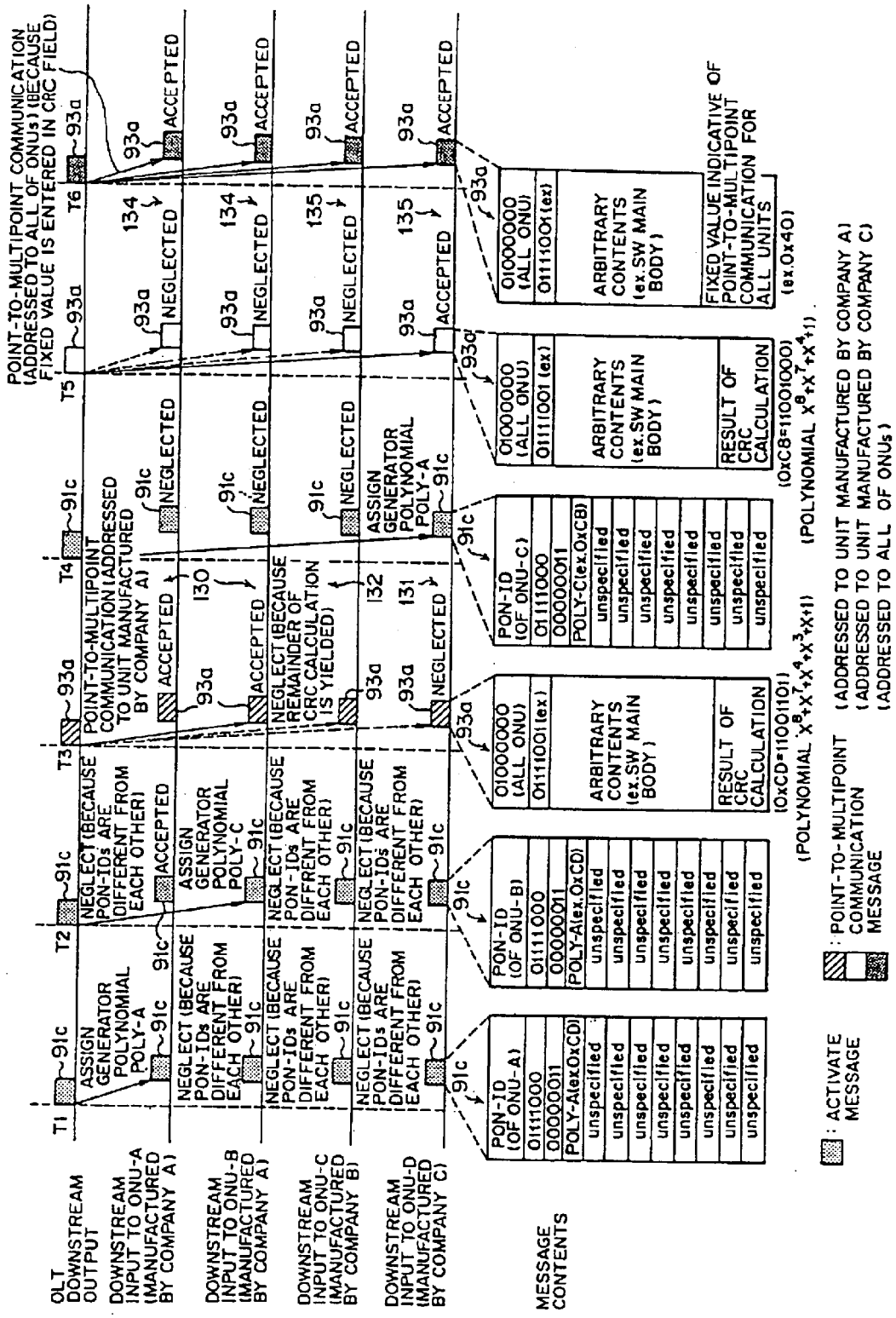
FIG. 52 is a timing chart for explaining an operation of an ATM-PON in the third modification of the second embodiment.

On the other hand, as for example shown in FIG. 50, if the ONU 4-4 is to receive a point-to-multipoint VSM 93$a$ attached with information of whole bytes="10101010 (0×AA$_H$)" as a message contents 126, then the OLT 2 effects the CRC arithmetic operation on the message contents 126 with the polynomial of $X^8+X^7+X^4+1$ assigned to the unit, attaches the result of the arithmetic operation (remainder)= "11011000" to the point-to-multipoint VSM 93$a$ at the CRC field 125$a$ thereof and sends the resulting message (see timing point T5 in FIG. 52).

On the side of ONU 4-4, the CRC arithmetic operation is effected on the range between the message contents 126 and the CRC field 125$a$ of the received point-to-multipoint VSM 93$a$ by using the polynomial of $X^8+X^7+X^4+1$ assigned to the unit. In the unit, since the remainder will become "0", it is determined that the received point-to-multipoint VSM 93$a$ is a message addressed to the unit itself and hence the message is accepted by the unit (see arrow 133 in FIG. 52).

Conversely, in the ONUs 4-1 and 4-2, if the similar CRC arithmetic operation is effected by using the polynomial Of $X^8+X^7+X^4+X^3+1$ assigned to the units, a remainder will be "0×1B$_H$" and not "0". Therefore, the point-to-multipoint VSM 93$a$ is neglected (discarded) (see arrow 134 in FIG. 52). Also in the ONU 4-3, a remainder will not be "0" as a result of similar CRC arithmetic operation. Therefore, the point-to-multipoint VSM 93$a$ is also neglected (discarded) (see arrow 135 in FIG. 52).

Also in the present modification, after the OLT 2 carried out the grouping on the ONUs 4-1 and 4-2 (assignment of polynomial) as described above, the station-side unit can execute the grouping on other ONUs 4-$i$ manufactured by a different vendor [by assigning a different (unused) polynomial] in a parallel manner even though the point-to-multipoint communication is being effected by using the result of the CRC arithmetic operation with that polynomial (see timing point T4 in FIG. 52, for example).

Furthermore, after the CRC generator polynomial is assigned as described above, if it is requested that the point-to-multipoint VSM 93$a$ is received by all of the ONUs 4-$i$, the OLT 2 may attach a specific value (e.g., 0×40$_H$) indicating the point-to-multipoint communication for all of the subscriber-side units to the point-to-multipoint VSM 93$a$ at the CRC field 125$a$ thereof and send the resulting message to the units (see timing point T6 in FIG. 52). With this operation, it is expected that a remainder is created by the aforesaid CRC arithmetic operation in the ONUs 4-1, 4-2, and 4-4. However, since the message is attached with the specific value ($0\times40_H$) indicating the point-to-multipoint communication for all of the subscriber-side units at the CRC field 125a thereof, the received point-to-multipoint communication VSM 93a may be accepted and processed.

As described above, also in the ATM-PON 1 arranged to include the OLT 2 and the ONUs 4-i as the subject third modification, some of the ONUs 4-i manufactured by the same vendor can be designated as a component constituting a group of units by assigning the CRC generator polynomial to the ONUs 4-i by means of the Act message 91c. Therefore, a desired point-to-multipoint VSM 93a can be accepted and processed only by ONUs 4-i that are assigned with the same CRC generator polynomial. Accordingly, advantages similar to those of the aforesaid second embodiment can be obtained.

While in the above-described embodiment description has been intensively made on grouping operation on the ONUs 4-i, it is needless to say that the grouping may be cancelled, how the point-to-multipoint VSMs 93a are received on the side of each ONU 4-i can be confirmed (see step E18 in FIG. 31), and other operations can be carried out in a manner similar to those of the second embodiment, and hence advantages similar to those of the second embodiment can be obtained.

Meanwhile, similarly to the above-described first and second modifications, the CRC generator polynomial assignment can be carried out in a simultaneous fashion by a single transmission shot of Act message. That is, the message for simultaneous assignment is arranged based on the format of Act/Dact message 91c (reply request message 92c) shown in FIG. 45. Further, as for example shown in FIG. 53, the message for simultaneous assignment is arranged like an Act/Dact message 91d (reply request message 92c) having the aforesaid vendor ID field 122. Alternatively, as for example shown in FIG. 54, the message for simultaneous assignment is further arranged like an Act/Dact message 91e (reply request message 92e). Thus, the polynomial assignment can be carried out in a simultaneous fashion in a manner similar to that of the aforesaid VGID assignment in a simultaneous fashion.

Figure 55:
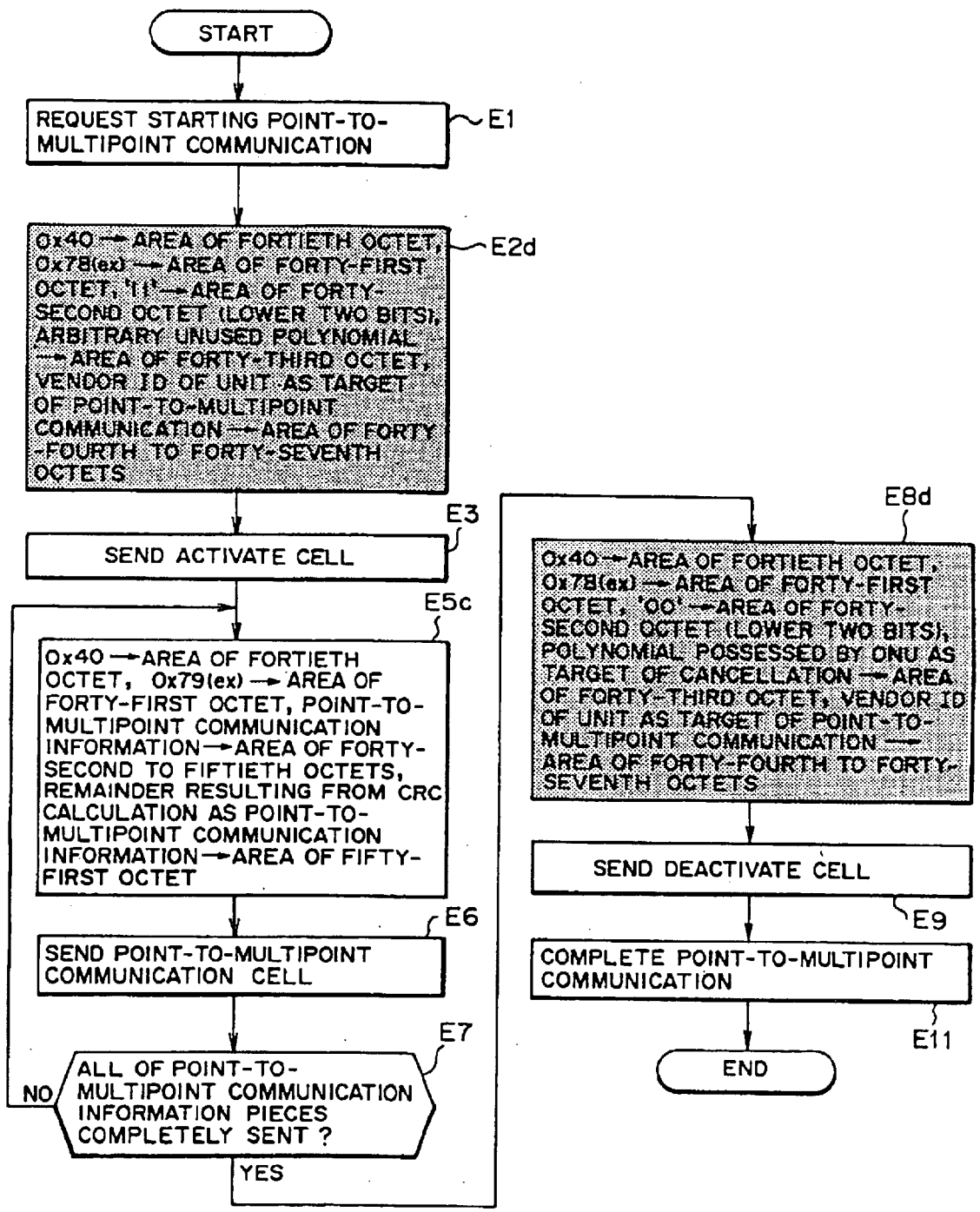
FIG. 55 is a flowchart for explaining an operation of the OLT when the Act/Dact message (monitoring reply requesting message) shown in FIG. 53 is utilized.

If the Act/Dact message 91d (reply request message 92d) shown in FIG. 53 is utilized, the OLT 2 is operated in accordance with an algorism shown in FIG. 55 (this algorism is mainly different from the fundamental algorism shown in FIG. 47 in portions with halftone notation). Further, the ONU 4-i is operated in accordance with an algorism shown in FIG. 56 (this algorism is different from the fundamental algorism shown in FIG. 49 in portions with halftone notation).

That is, as shown in FIG. 55, when a start request of a point-to-multipoint communication is inputted from the outside (step E1), the Act/Dact message generating unit 63a-2 creates a PON-ID ($0\times40_H$) of a broadcast type as information to be mapped on the PON-ID field 113 (area of fortieth byte) of a downstream PLOAM cell. Further, the message generating unit accesses the vendor information holding unit 62 to acquire a vendor ID of a vendor of a grouping target as information to be mapped on the vendor ID field 122. Then, the information pieces are outputted to the downstream cell multiplexing unit 64 as the Act message 91d (step E2d). Information pieces attached at the other fields, or the fields 112, 120, and 124 are similar to those of the aforesaid Act message 91c, respectively (see FIG. 45).

The downstream cell multiplexing unit 64 maps the information (Act message 91a) transferred from the Act/Dact message generating unit 63a-2 on the downstream PLOAM cell and sends the resultant cell as an Act cell 91a (step E3). Thereafter, processing similar to that of steps E5c, E6, E7 shown in FIG. 47 is executed, whereby the point-to-multipoint VSM (point-to-multipoint communication cell) 93a is transmitted.

Thereafter, when the point-to-multipoint communication cell 93a has been completely transmitted, the OLT 2 (Act/Dact message generating unit 63a-2) creates a Dact message 91d having a vendor ID of the ONU 4-i which is a target of canceling the designation by the polynomial, and sends the created message (step E8d, E9). Thus, the polynomial assigned to the ONUs 4-i can be canceled simultaneously.

Figure 56:
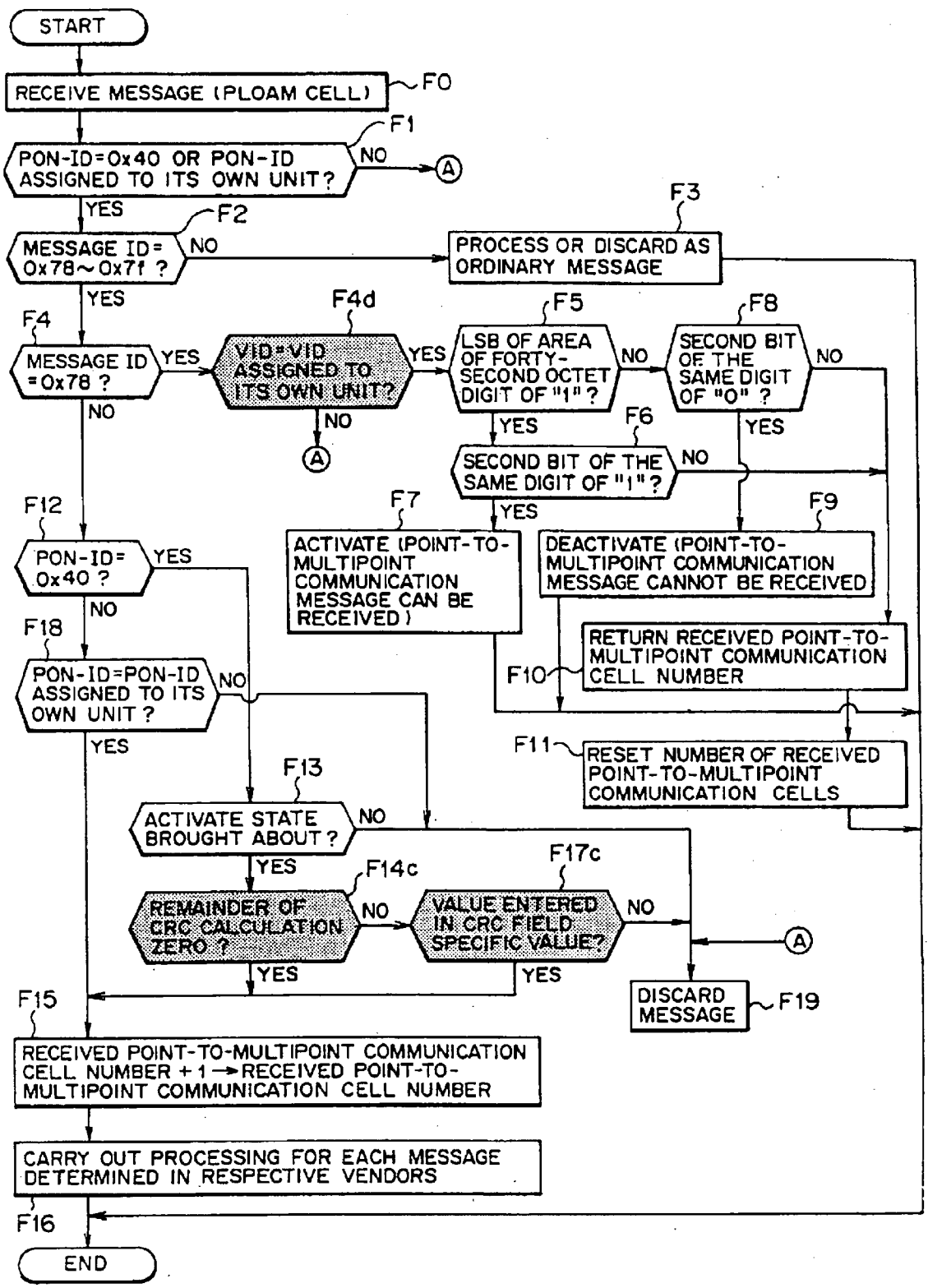
FIG. 56 is a flowchart for explaining an operation of the ONU when the Act/Dact message (monitoring reply requesting message) shown in FIG. 53 is utilized.

On the other side, as shown in FIG. 56, the ONU 4-i is operated in accordance with an algorism which derives from the algorism described with reference to FIG. 49 added with step F4d (see potions with halftone notation) in which it is determined whether the vendor ID attached to the Act message 91d (reply request message 92d) and the vendor ID assigned to the unit itself are coincident with each other or not.

In this way, if it is determined that the vendor ID attached to the Act Message 91d at the vendor ID field 122 is the same as one assigned to the unit itself, the ONU 4-i accepts the Act Message 91d (see YES route at step F4d). Then, the polynomial attached at the CRC generator polynomial field 124 is held in the Act/Dact-generator polynomial holding unit 73a-2.

If the message sent from the station-side unit is a Dact message 91d, the Act/Dact-generator polynomial holding unit 73a-2 deletes the data of the polynomial corresponding to one attached to the message at the CRC generator polynomial field 124 from the storage thereof, whereby the assignment of the polynomial (grouping) is canceled. Further, if the vendor ID attached at the vendor ID field 122 is not one assigned to the unit itself, it is determined that the Act/Dact message 91d (reply request message 92d) is not a message addressed to the unit itself. Thus, this message is neglected (discarded) (from NO route at step F4d to step F19).

Figure 57:
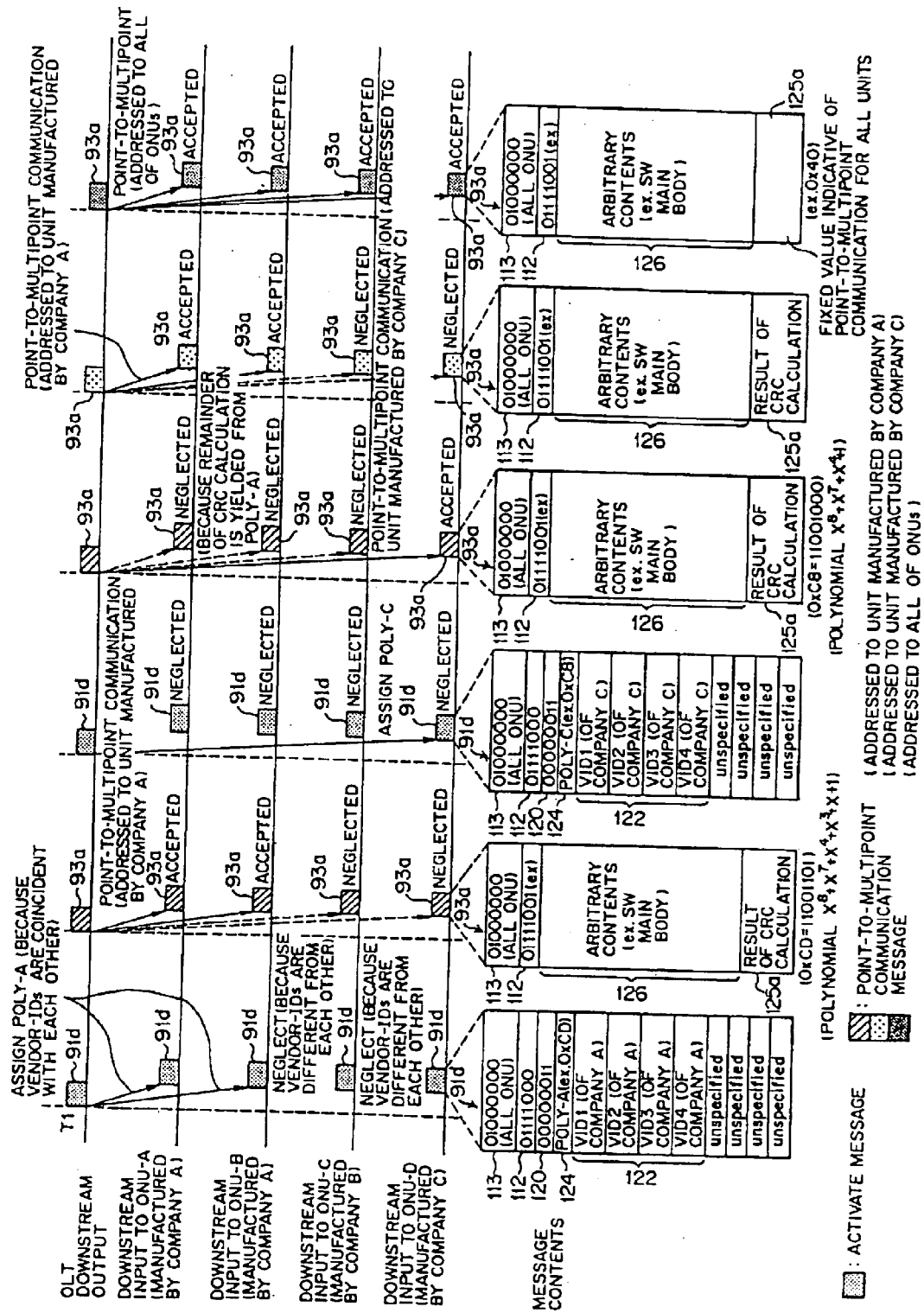
FIG. 57 is a timing chart for explaining an operation of the ATM-PON when the Act/Dact message (monitoring reply requesting message) shown in FIG. 53 is utilized.

With the operations of the OLT 2 and the NOU 4-i described above, as for example shown at timing point T1 in FIG. 57, if the Act message 91d attached with the vendor ID of the ONUs 4-1 and 4-2 manufactured by the same vendor (e.g., Company A) is sent from the OLT 2 by a single shot of transmission, only the ONUs 4-1 and 4-2 having the same vendor ID as one attached to the message can accept the Act message 91d, with the result that these units are brought into a mode of Act state. In this way, each of the ONUs 4-1 and 4-2 can be assigned with the CRC generator polynomial (POLY-A) by transmitting the Act message 91d at one time.

Processing to which the point-to-multipoint communication cell 93a [including a point-to-multipoint communication cell 93a attached with a fixed value (e.g., $0\times40_H$) indicating that the cell is one to be delivered to all of the subscriber-side units in a point-to-multipoint communication manner] is subjected in the subsequent stages, is similar to that described with reference to FIG. 52.

Figure 58:
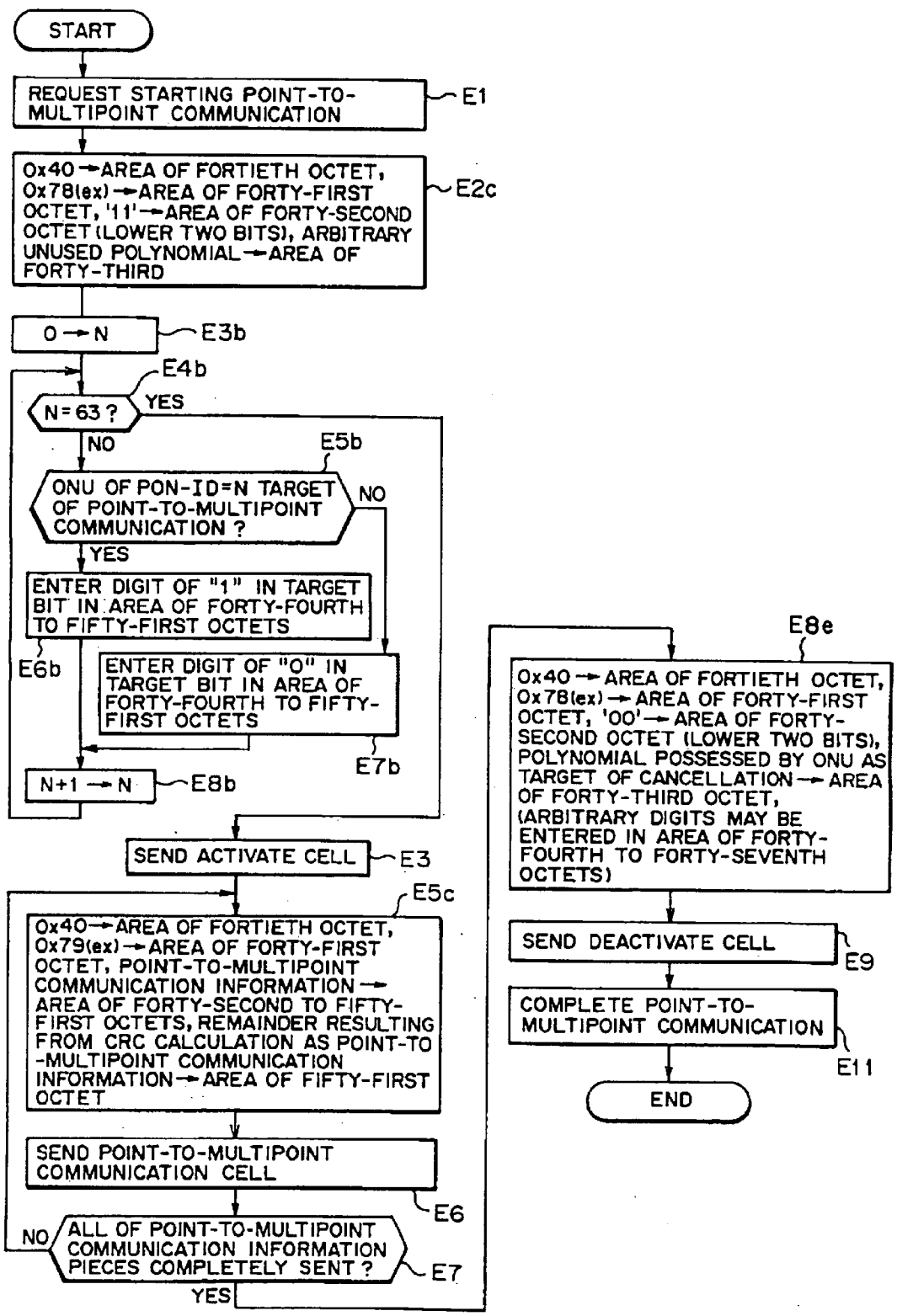
FIG. 58 is a flowchart for explaining an operation of the OLT when the Act/Dact message (monitoring reply requesting message) shown in FIG. 54 is utilized.
Figure 59:
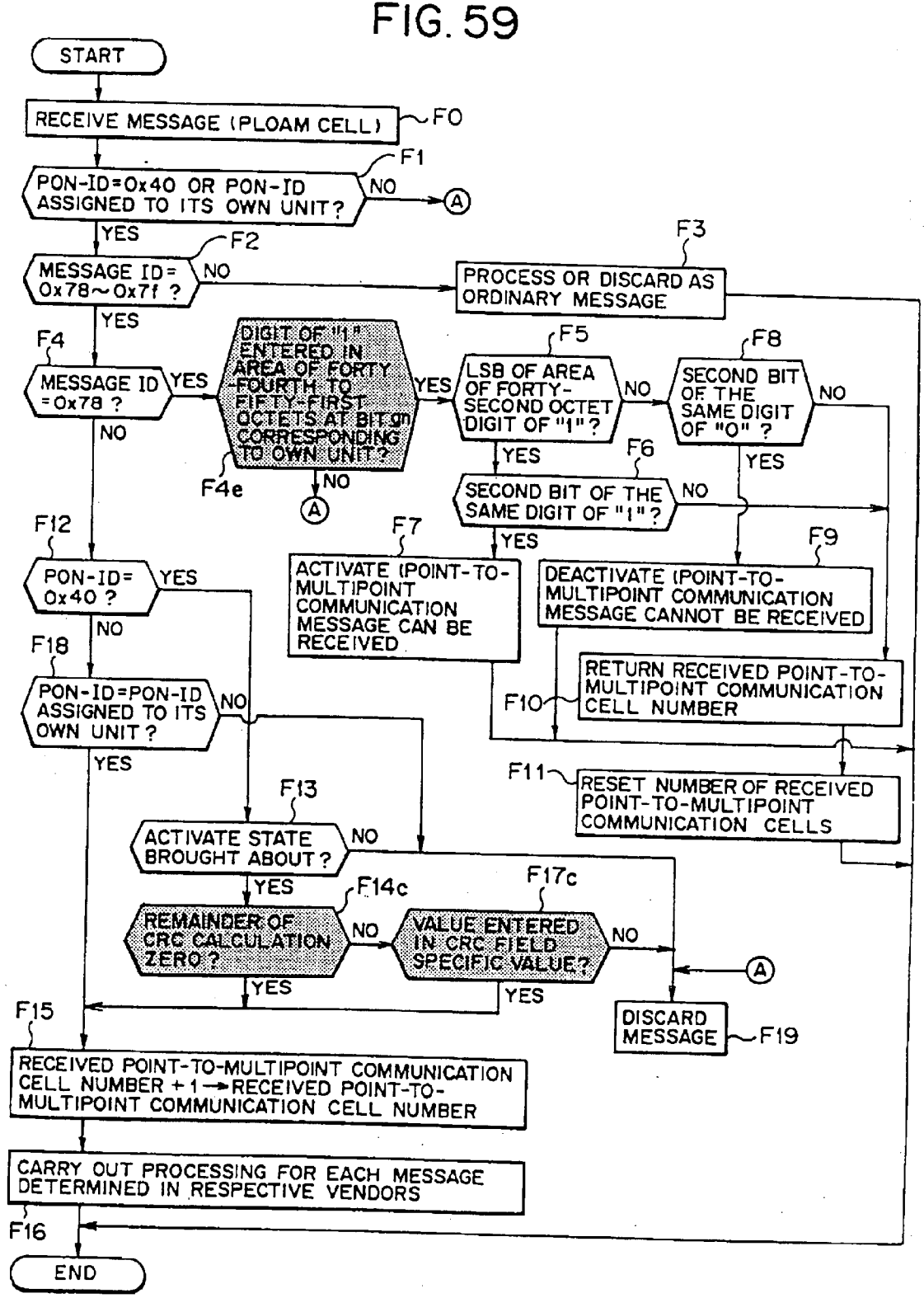
FIG. 59 is a flowchart for explaining an operation of the ONU when the Act/Dact message (monitoring reply requesting message) shown in FIG. 54 is utilized.

When the Act/Dact message 91e (reply request message) having the matrix field 123 shown in FIG. 54 is utilized, the OLT 2 is operated in accordance with an algorithm shown in FIG. 58, and the ONU 4-i is operated in accordance with an algorism shown in FIG. 59.

As shown in FIG. 59, the OLT 2 (Act/Dact message generating unit 63a-2) is operated in accordance with the algorism described with reference to FIG. 41 so as to create an Act message 91e having a matrix field 123 composed of bits of g0 to g63 in which a digit of "1" is entered in a bit gn corresponding to the ONU 4-i as a target of grouping.

Thereafter, similarly to the algorism shown in FIG. 47, the downstream cell multiplexing unit 64 maps the Act message 91e on the PLOAM cell and the resultant cell is sent to the ONU 4-i as an Act cell 91e. Thereafter, the CRC arithmetic operation is effected on the message contents 126 by using the polynomial assigned to the ONU 4-i as a target of point-to-multipoint communication, and the point-to-multipoint communication cell 93a having the result of the arithmetic operation attached thereto is transmitted. As for the Dact message 91e, the matrix field 123 may have any arbitrary values entered (see step E8e).

As shown in FIG. 59, the ONU 4-i is operated in accordance with an algorism which derives from the algorism described with reference to FIG. 49 added with a determining step (step F4e: see a portion with halftone notation) in which reference is made to the matrix field 123 (area of forty-fourth to fifty-first byte) of the received message (downstream PLOAM cell) so as to determine whether or not a digit of "1" is entered in the bit gn corresponding to the individual PON-ID of the unit itself.

In this way, if it is determined as a result of reference to the matrix field 123 of the received Act message 91e that a digit of "1" is entered in the bit gn corresponding to the individual PON-ID of the unit itself, then the Act message 91e is accepted (see YES route at step F4e). Then, the polynomial attached at the CRC generator polynomial field 124 is held in the Act/Dact-generator polynomial holding unit 73a-2.

If the message sent from the station-side unit is a Dact message 91e, the Act/Dact-generator polynomial holding unit 73a-2 deletes the data of the polynomial corresponding to one attached to the message at the CRC generator polynomial field 124 from the storage thereof, whereby the assignment of the polynomial (grouping) is canceled. Further, if a digit of "0" is entered in the bit gn corresponding to the individual PON-ID of the unit itself in the matrix field 123, it is determined that the Act/Dact message 91e (reply request message 92e) is not a message addressed to the unit itself. Thus, this message is neglected (discarded) (from NO route at step F4e to step F19).

Figure 60:
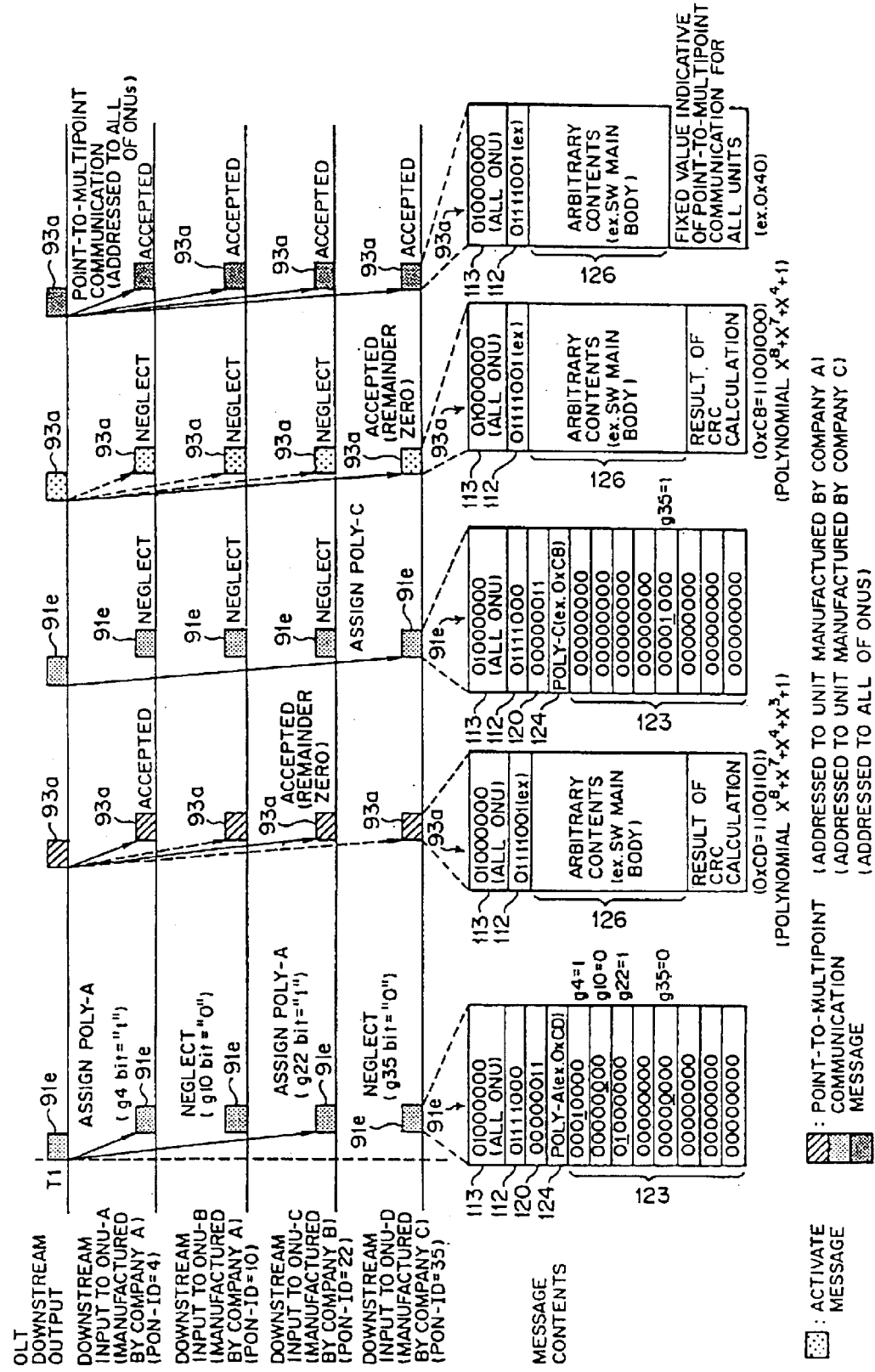
FIG. 60 is a timing chart for explaining an operation of the ATM-PON when the Act/Dact message (monitoring reply requesting message) shown in FIG. 54 is utilized.

With the operations of the OLT 2 and the NOU 4-i described above, as for example shown at timing point T1 in FIG. 60, if the Act message 91e having the matrix field 123 in which a digit of "1" is entered in bits of g4 and g22 corresponding to the individual PON-ID (4, 22) of the ONUs 4-1 and 4-3 is created and sent from the OLT 2 by a single shot of transmission, only the ONUs 4-1 and 4-3 having the individual PON-ID=4 or 22 can accept the Act message 91e, with the result that these units are brought into a mode of Act state. Accordingly, also in this case, each of the ONUs 4-1 and 4-3 can be assigned with the CRC generator polynomial (POLY-A) by transmitting the Act message 91e at one time.

Processing to which the point-to-multipoint communication cell 93a [including a point-to-multipoint communication cell 93a attached with a fixed value (e.g., 0×40$_H$) indicating that the cell is one to be delivered to all of the subscriber-side units in a point-to-multipoint communication manner] is subjected in the subsequent stages, is similar to that described with reference to FIG. 52. Further, when the subscriber-side units are designated as a component constituting a group of units, the targeted unit is not limited to ONUs 4-i manufactured by the same vendor, but any arbitrary ONUs 4-i can be designated as a component constituting a group of units.

As described above, when the CRC generator polynomial is assigned to the ONUs 4-i, similarly to the aforesaid case in which the VGID is assigned at one time, the assignment can be achieved by sending the Act message 91d (91e) by a single shot of transmission. Therefore, it becomes possible to remarkably shorten the time it takes to assign the CRC generator polynomial to the ONUs 4-i as a target of point-to-multipoint communication. Also, processing load imposed on the OLT 2 and the network traffic can be decreased.

(C) Other Disclosure

The present invention may be implemented in such a manner that the function described with the first embodiment and the function described with the second embodiment are properly combined. For example, the processing function for confirming the number of received point-to-multipoint communication cells described with the second embodiment may be applied to the ATM-PON 1 of the first embodiment. Conversely, the processing function for replying to the grouping designation or the processing function for grouping or canceling the group designation in response to the network cut request or connection request from the ONU 4-i, described with the first embodiment may be applied to the ATM-PON 1 of the second embodiment.

Further, various kinds of messages such as the above-described VG control message, the reply message, the release request message, the connection request message, the Act/Dact message, the reply request message, the monitoring message and so on may not be limited to the respective formats which have been described with reference to corresponding diagrams. That is, any modification may be properly effected so long as at least the above-described respective functions can be implemented.

Furthermore, the aforesaid OLT 2 and ONU 4-i need not employ the above-described function block arrangements so long as the above-described group designating function can be implemented. While in the respective embodiments descriptions have been made on the state control of the ONUs 4-i in response to the point-to-multipoint VSM, the present invention is not limited thereto. That is, similar control can be applied to any desired point-to-multipoint message other than the VSM-type messages.

The present invention is not limited to the above-described respective embodiments and the modifications thereof but various changes and modifications can be effected without departing from the gist of the present invention.

Industrial Applicability

As described above, in a conventional communication system such as an ATM-PON, the station-side unit can carry out communication with a single unit of subscriber-side unit independently or communication with all of the subscriber-side units in a point-to-multipoint communication manner. However, according to the present invention, it becomes possible to carry out point-to-multipoint communication with a plurality of subscriber-side units which are partly selected from the all subscriber-side units. Therefore, for example, if information specific to any vendor is transmitted to the all subscriber-side units in a point-to-multipoint communication manner, the subscriber-side unit can be free from unexpected erroneous operation due to the information transmission. Moreover, the information supply to the plurality of subscriber-side units which are partly selected from the all subscriber-side units can be carried out in a short period of time. Accordingly, the utility of the present invention would be extremely high.

What is claimed is:

1. A communication system including a plurality of subscriber-side units manufactured by respective desired vendors and a station-side unit manufactured by a desired vendor accommodating the subscriber-side units, the station-side unit being capable of carrying out a broadcast communication with all of the subscriber-side units by sending a broadcast message in a manner of broadcast communication, the station-side unit comprising:

a broadcast message generating unit generating a broadcast message; and a group designating message generating unit for generating a group designating message to be broadcast to all of the subscriber-side units and having designation information to designate some of the subscriber-side units as a component constituting a group of units which are to receive the broadcast message, and the subscriber-side unit comprising:

a broadcast message processing unit receiving and processing the broadcast message from the station-side unit; and a state control unit controlling, in response to a reception of the group designating message having the designation information designating the subscriber-side unit broadcast from the station-side unit, a status of the reception and the processing for the broadcast message in the broadcast message processing unit to a valid status;

whereby only subscriber-side units having a valid status are allowed to receive and process the broadcast message generated by the station-side unit, and wherein the station-side unit designates some of the subscriber-side units manufactured by an identical vendor as a component constituting the group of units.

2. A method of processing a message for use in a communication system including a plurality of subscriber-side units manufactured by respective desired vendors and a station-side unit manufactured by a desired vendor accommodating the subscriber-side units, the station-side unit being capable of carrying out a broadcast communication with all of the subscriber-side units by sending a broadcast message in a manner of broadcast communication, wherein the station-side unit broadcasts to all of the subscriber-side units a group designating message with designation information to designate some of the subscriber-side units as a component constituting a group of units which are to receive a broadcast message, only the subscriber-side units designated by the designation information of the group designating message as the component constituting the group of units are allowed to receive and process the broadcast message sent from the station-side unit in the manner of broadcast communication, and the station-side unit designates some of the subscriber-side units manufactured by an identical vendor as a component constituting the group of units.

3. A method of processing a message for use in a communication system according to claim 2, wherein the station-side unit designates the subscriber-side units manufactured by an identical vendor as a component constituting the group of units.

4. A station-side unit accommodating a plurality of subscriber-side units manufactured by respective desired vendors, the station-side unit being capable of carrying out a broadcast communication with all of the subscriber-side units by sending a message in a manner of broadcast communication, the station-side unit comprising:

a broadcast message generating unit generating a broadcast message in a manner of broadcast communication; and a group designating message generating unit generating a group designating message to be broadcast to all of the subscriber-side units and having designation information to designate some of the subscriber-side units as a component constituting a group of units which are to receive the broadcast communication message;

whereby only subscriber-side units designated by the designation information of the group designating message as components of the group of units are allowed to receive and process the broadcast message generated by the station-side unit, and wherein the station-side unit designates some of the subscriber-side units manufactured by an identical vendor as a component constituting the group of units.

5. A station-side unit according to claim 4 in which each of the subscriber-side units is assigned with vendor identification information, wherein the group designating message generating unit comprises a first vendor group designating message generating unit for generating a vendor group designating message having the vendor identification information addressed to the subscriber-side units manufactured by an identical vendor as the group designating message, whereby the subscriber-side units are designated as a component constituting the group of units.

6. A station-side unit according to claim 4 in which each of the subscriber-side units is assigned with unit identification information specific to each vendor, wherein the group designating message generating unit comprises a second vendor group designating message generating unit for generating a vendor group designating message having the unit identification information addressed to specific ones of the subscriber-side units manufactured by an identical vendor as the group designating message, so that some of the subscriber-side units are designated as a component constituting the group of units.

7. A station-side unit according to claim 4, comprising a group designation canceling unit for generating a group canceling message which cancels the designation of the grouping effected on arbitrary subscriber-side units.

8. A station-side unit according to claim 7, wherein the group designation canceling unit is arranged so that, after the group of units is designated, if the station-side unit receives no reply message on the designation from the subscriber-side unit for a predetermined period of time, then the group canceling message addressed to at least the subscriber-side unit is generated.

9. A station-side unit according to claim 7, wherein the group designation canceling unit is arranged so that, when a group designation canceling request is received from the subscriber-side unit, then the group canceling message is sent to at least the subscriber-side unit which has requested the group designation canceling.

10. A station-side unit according to claim 4, wherein the group designation message generating unit is arranged in such a manner that, when a group designation request is received from the subscriber-side unit, then the group designation message generating unit generates the group designating message so that at least the subscriber-side unit having requested the group designation is designated as a component constituting the group of units.

11. A station-side unit according to claim 4, wherein the group designation message generating unit comprises a group identification information assignment message generating unit for generating an assignment message to the subscriber-side units to be designated as a component constituting the group of units as a group designating message, whereby the subscriber-side units are assigned with the same group identification information, and the point-to-multipoint message generating unit is arranged as a group identification information attaching type point-to-multipoint message generating unit which sends a point-to-multipoint message having the group identification information to the component constituting the group of units.

12. A station-side unit according to claim 11, wherein the group identification information message generating unit comprises a vendor identification information giving unit for giving vendor identification information specific to the subscriber-side unit to the assignment message, so that the subscriber-side units manufactured by an identical vendor can be designated as a component constituting the group of units.

13. A station-side unit according to claim 4, comprising a point-to-multipoint message number confirmation requesting unit for requesting from the subscriber-side unit so as to confirm the number of received point-to-multipoint communication messages.

14. A subscriber-side unit accommodated together with other subscriber-side units in a broadcast communication network handled by a station-side unit which is manufactured by a desired vendor and capable of carrying out broadcast communication with all subscriber-side units, the subscriber-side unit comprising:

a broadcast message processing unit receiving and processing the broadcast message from the station-side unit, and a state control unit controlling, in response to a reception of a group designating message having the designation information designating the subscriber-side unit broadcast from the station-side unit as a component of a group of units which is to receive the broadcast message, a status of the reception and the processing for the broadcast message in the broadcast message processing unit to a valid status;

wherein the state control unit comprises a first vendor identification information comparing determining unit for comparing vendor identification information given to a vendor group designating message that is attached to the group designating message sent from the station-side unit with vendor identification information assigned to its own subscriber-side unit, thereby to determine whether or not the two pieces of vendor identification information are coincident with each other;

wherein if the first vendor identification information comparing determining unit determines that the two pieces of vendor identification information are coincident with each other, then the reception and the processing for the broadcast message in the broadcast message processing unit are brought to a valid status; and whereby only subscriber-side units designated by the designation information of the group designating message as components of the group of units are allowed to receive and process the broadcast message generated by the station-side unit.

15. A subscriber-side unit for use with other subscriber-side units according to claim 14, each of which is assigned with unit identification information specific to each vendor and accommodated in the network handled by the station-side unit which is arranged to send e the vendor group designating message having a plurality of the unit identification information to the subscriber-side units so that specific ones of the subscriber-side units manufactured by an identical vendor are designated as a component constituting the group of units, wherein the state control unit comprises a unit identification information determining unit for determining whether or not the unit identification information given to the vendor group designating message sent from the station-side unit contains the unit identification information assigned to its own subscriber-side unit, and if the unit identification information determining unit determines that the unit identification information assigned to its own subscriber-side unit is contained, then the reception and the processing for the point-to-multipoint message handled by the point-to-multipoint message processing unit are brought to a valid status.

16. A subscriber-side unit according to claim 14, wherein the state control unit comprises a canceling control unit arranged in such a manner that when the subscriber-side unit receives a group canceling message for canceling the designation on the subscriber-side unit itself as a component constituting a group of units from the station-side unit, then the reception and the processing for the point-to-multipoint message in the point-to-multipoint message processing unit are brought to an invalid status.

17. A subscriber-side unit according to claim 14, wherein the state control unit comprises a reply message returning unit which returns a reply message to the station-side unit when the state control unit controls the point-to-multipoint message processing unit so as to bring the reception and the processing on the point-to-multipoint message to a valid status.

18. A subscriber-side unit according to claim 14, comprising a group designation cancellation requesting unit for requesting cancellation of the designation on the subscriber-side unit itself as a component constituting a group of units from the station-side unit.

19. A subscriber-side unit according to claim 14, comprising a group designation requesting unit for requesting the designation on the subscriber-side unit itself as a component constituting a group of units from the station-side unit.

20. A subscriber-side unit according to claim 14, for use with a station-side unit which is arranged to generate an assigning message for assigning identical group identification information to subscriber-side units to be designated as a component constituting a group of units, and also generates a point-to-multipoint message which is given the group identification information and addressed to the group of units, wherein the state control unit comprises a group identification information holding unit for holding the group identification information assigned by the assigning message sent from the station-side unit, and a group identification information comparing determining unit for comparing the group identification information given to the point-to-multipoint message sent from the station-side unit with group identification information held in the group identification information holding unit, thereby to determine whether or not the two pieces of information are coincident with each other, and the state control unit is arranged to carry out control in such a manner that, if the group identification information comparing determining unit determines that the two pieces of information are coincident with each other, then the reception and the processing for the point-to-multipoint message in the point-to-multipoint message processing unit are brought to a valid status.

21. A subscriber-side unit according to claim 20 for use with a station-side unit which is arranged to give vendor identification information specific to the subscriber-side unit to the assignment message so that the subscriber-side units manufactured by an identical vendor can be designated as a component constituting the group of units, the subscriber-side unit comprising:

a second vendor identification information comparing determining unit for comparing the vendor identification information given to the assignment message with the vendor identification information assigned to its own subscriber-side unit, thereby to determine whether the two pieces of vendor identification information are coincident with each other or not, wherein if the second vendor identification information comparing determining unit determines that the two pieces of vendor identification information are coincident with each other, then the group identification information holding unit holds the group identification information.

22. A subscriber-side unit according to claim 14, comprising:

a message counting unit for counting a number of point-to-multipoint messages received by the point-to-multipoint message processing unit; and a received message number notifying unit for notifying the station-side unit of the counting result yielded by the message counting unit when a confirmation request on the received number of the point-to-multipoint messages is received from the station-side unit.

23. A communication system including a plurality of subscriber-side units and a station-side unit accommodating the subscriber-side units, the station-side unit being capable of carrying out a broadcast communication with all of the subscriber-side units by sending a broadcast message in a manner of broadcast communication, the station-side unit comprising:

a broadcast message generating unit generating a broadcast message; and a group designating message generating unit generating a group designating message to be broadcast to all of the subscriber-side units and having designation information to designate some of the subscriber-side units as a component constituting a group of units which are to receive the broadcast message, and the subscriber-side unit comprising:

a broadcast message processing unit receiving and processing the broadcast message from the station-side unit; and a state control unit controlling, in response to a reception of the group designating message having the designation information designating the subscriber-side unit broadcast from the station-side unit, a status of the reception and the processing for the broadcast message in the broadcast message processing unit to a valid status;

wherein the station-side unit designates some of the subscriber-side units manufactured by an identical vendor as a component constituting the group of units.

24. A method of processing a message for use in a communication system including a plurality of subscriber-side units and a station-side unit accommodating the subscriber-side units, the station-side unit being capable of carrying out a broadcast communication with all of the subscriber side units by sending a broadcast message in a manner of broadcast communication, wherein:

the station-side unit broadcasts to all of the subscriber-side units a group designating message with designation information to designate some of the subscriber-side units as a component constituting a group of units which are to receive a broadcast message; and the subscriber-side units designated by the designation information of the group designating message as the component constituting the group of units are allowed to receive and process the broadcast message sent from the station-side unit in the manner of broadcast communication;

wherein the station-side unit designates some of the subscriber-side units manufactured by an identical vendor as a component constituting the group of units.

25. A station-side unit accommodating a plurality of subscriber-side units, the station-side unit being capable of carrying out a broadcast communication with all of the subscriber-side units by sending a message in a manner of broadcast communication, the station-side unit comprising:

a broadcast message generating unit generating a broadcast message in a manner of broadcast communication; and a group designating message generating unit generating a group designating message to be broadcast to all of the subscriber-side units and having designation information to designate some of the subscriber-side units as a component constituting a group of units which are to receive and process the broadcast communication messages wherein the station-side unit designates some of the subscriber-side units manufactured by an identical vendor as a component constituting the group of units.

26. A subscriber-side unit accommodated together with other subscriber-side units in a broadcast communication network handled by a station side unit which is capable of carrying out broadcast communication with all subscriber-side units, the subscriber-side unit comprising:

a broadcast message processing unit receiving and processing the broadcast message from the station-side unit; and a state control unit controlling, in response to a reception of a group designating message having the designation information designating the subscriber-side unit broadcast from the station-side unit as a component constituting a group of units which is to receive the broadcast message, a status of the reception and the processing for the broadcast message in the broadcast message processing unit to a valid status;

wherein the state control unit further comprises a first vendor identification information comparing determining unit for comparing vendor identification information given to a vendor group designating message that is attached to the group designating message sent from the station-side unit with vendor identification information assigned to its own subscriber-side unit, thereby to determine whether or not the two nieces of vendor identification information are coincident with each other; and wherein if the first vendor identification information comparing determining unit determines that the two pieces of vendor identification information are coincident with each other, then the reception and the processing for the broadcast message in the broadcast message processing unit are brought to a valid status.

* * * * *